US008249071B2

(12) United States Patent
Kreifeldt et al.

(10) Patent No.: US 8,249,071 B2
(45) Date of Patent: Aug. 21, 2012

(54) AUDIO RELATED SYSTEM COMMUNICATION PROTOCOL

(75) Inventors: Richard Allen Kreifeldt, South Jordan, UT (US); John Lee, Salt Lake City, UT (US); William A. Plunkett, Granger, IN (US); Timothy J. Shuttleworth, Woodland Hills, CA (US); Andrew Stevenson, Hemel Hempstead (GB); Bruce Vander Werf, Elkhart, IN (US); Howard Scott Zollinger, Lehi, UT (US)

(73) Assignee: Harman International Industries, Incorporated, Northridge, CA (US)

( * ) Notice: Subject to any disclaimer, the term of this patent is extended or adjusted under 35 U.S.C. 154(b) by 1254 days.

(21) Appl. No.: 11/089,889

(22) Filed: Mar. 25, 2005

(65) Prior Publication Data

US 2005/0246041 A1 Nov. 3, 2005

Related U.S. Application Data

(60) Provisional application No. 60/557,117, filed on Mar. 26, 2004, provisional application No. 60/644,967, filed on Jan. 18, 2005.

(51) Int. Cl.
*H04L 12/56* (2006.01)

(52) U.S. Cl. .......... 370/392; 700/94; 709/220; 709/223; 715/716; 715/734; 715/771

(58) Field of Classification Search ........................ None
See application file for complete search history.

(56) References Cited

U.S. PATENT DOCUMENTS

| | | | |
|---|---|---|---|
| 4,839,891 A * | 6/1989 | Kobayashi et al. | 370/231 |
| 4,922,536 A | 5/1990 | Hoque | |
| 5,245,604 A | 9/1993 | Lacas et al. | |
| 5,457,478 A | 10/1995 | Frank | 345/158 |
| 5,475,835 A | 12/1995 | Hickey | 707/104.1 |
| 5,500,626 A | 3/1996 | Barclay, Jr. | |
| 5,519,457 A | 5/1996 | Nishigaki et al. | 348/734 |
| 5,657,221 A | 8/1997 | Warman et al. | 364/188 |
| 5,673,401 A | 9/1997 | Volk et al. | 725/139 |
| 5,687,334 A * | 11/1997 | Davis et al. | 715/764 |
| 5,751,713 A | 5/1998 | Lacas et al. | |
| 5,761,430 A | 6/1998 | Gross et al. | |

(Continued)

FOREIGN PATENT DOCUMENTS

EP          0 637 157 B1      2/1995

(Continued)

OTHER PUBLICATIONS

Lacas, M., "VNOS: The Visual Network Operating System, How rock-and-roll changed the Internet," Dr. Dobb's Journal, Dec. 2001, Developer Pipeline, pp. 1-6.
Berryman, J., "QSC24 Application Protocol," Version 1, Rev. 7, pp. i-ii and 1-19; Jun. 12, 1995.
"CobraNet, Programmer's Reference," Digital Audio Networking Processor, Preliminary Product Information, pp. 1-31, Aug. 2004, © 2004 Cirrus Logic, Inc., DS651PM20.
"DriveRack, Complete Equalization & Loudspeaker Management System User Manual," pp. 1-128, dbx Professional Products, a Harman International Company; Jun. 12, 2000.

(Continued)

*Primary Examiner* — Brian Roberts
(74) *Attorney, Agent, or Firm* — Brinks Hofer Gilson & Lione

(57) ABSTRACT

A system for management and control of audio related equipment. The system provides an architecture to manage, monitor, and control all of the audio related equipment in an audio system. A communication protocol used within the system allows standardized communication between the performance equipment mangers and the audio related devices, as well as device-to-device communication. The protocol allows users to add audio related devices to an audio system without performing a setup to configure communication between the devices.

24 Claims, 29 Drawing Sheets

U.S. PATENT DOCUMENTS

| | | | |
|---|---|---|---|
| 5,761,431 A | 6/1998 | Gross et al. | |
| 5,790,398 A * | 8/1998 | Horie | 700/4 |
| 5,793,366 A | 8/1998 | Mano et al. | 715/839 |
| 5,838,384 A * | 11/1998 | Schindler et al. | 348/563 |
| 5,862,401 A | 1/1999 | Barclay, Jr. | |
| 5,892,938 A | 4/1999 | Eastty et al. | 395/500 |
| 5,908,997 A * | 6/1999 | Arnold et al. | 84/615 |
| 5,920,705 A * | 7/1999 | Lyon et al. | 709/240 |
| 5,935,220 A * | 8/1999 | Lumpkin et al. | 710/5 |
| 5,956,025 A | 9/1999 | Goulden et al. | 345/327 |
| 6,020,881 A | 2/2000 | Naughton et al. | 715/140 |
| 6,154,209 A | 11/2000 | Naughton et al. | 715/764 |
| 6,161,138 A | 12/2000 | Gross et al. | |
| 6,198,479 B1 | 3/2001 | Humpleman et al. | 715/733 |
| 6,272,540 B1 * | 8/2001 | Yadav et al. | 709/223 |
| 6,288,716 B1 | 9/2001 | Humpleman et al. | 715/733 |
| 6,339,584 B1 | 1/2002 | Gross et al. | |
| 6,344,861 B1 | 2/2002 | Naughton et al. | 715/769 |
| 6,353,169 B1 * | 3/2002 | Juszkiewicz et al. | 84/600 |
| 6,359,632 B1 * | 3/2002 | Eastty et al. | 715/716 |
| 6,363,417 B1 | 3/2002 | Howard et al. | |
| 6,370,436 B1 | 4/2002 | Howard et al. | |
| 6,421,069 B1 | 7/2002 | Ludtke et al. | 715/762 |
| 6,421,692 B1 * | 7/2002 | Milne et al. | 715/202 |
| 6,456,892 B1 | 9/2002 | Dara-Abrams et al. | 700/83 |
| 6,466,971 B1 | 10/2002 | Humpleman et al. | 709/220 |
| 6,492,999 B1 | 12/2002 | Fado et al. | 345/727 |
| 6,501,717 B1 | 12/2002 | Yamazaki | 369/47.16 |
| 6,502,000 B1 | 12/2002 | Arnold et al. | 700/83 |
| 6,556,219 B1 | 4/2003 | Wugofski | 715/762 |
| 6,577,326 B1 | 6/2003 | Heuvelman et al. | 345/717 |
| 6,600,958 B1 * | 7/2003 | Zondag | 700/3 |
| 6,603,488 B2 | 8/2003 | Humpleman et al. | 345/771 |
| 6,684,110 B1 | 1/2004 | Kutsuno et al. | 700/17 |
| 6,700,592 B1 | 3/2004 | Kou et al. | 715/771 |
| 6,738,835 B1 | 5/2004 | Kato et al. | 710/10 |
| 6,747,678 B1 * | 6/2004 | Katayama et al. | 715/773 |
| 6,802,058 B2 | 10/2004 | Banavar et al. | 717/138 |
| 6,834,374 B1 * | 12/2004 | Sameshima | 715/736 |
| 6,885,362 B2 | 4/2005 | Suomela | 345/156 |
| 6,892,350 B1 | 5/2005 | Oba et al. | 715/716 |
| 6,930,730 B2 | 8/2005 | Maxon et al. | 348/734 |
| 6,931,574 B1 * | 8/2005 | Coupal et al. | 714/39 |
| 6,963,784 B1 * | 11/2005 | Gibbs | 700/94 |
| 6,966,063 B1 | 11/2005 | Meric et al. | 719/321 |
| 6,967,276 B2 * | 11/2005 | Futamase et al. | 84/622 |
| 7,006,642 B1 | 2/2006 | Kumai | 381/119 |
| 7,016,800 B1 * | 3/2006 | Nguyen | 702/108 |
| 7,020,881 B2 | 3/2006 | Takahashi et al. | 719/322 |
| 7,047,495 B1 | 5/2006 | Pang | 715/736 |
| 7,124,367 B2 | 10/2006 | Anderson et al. | 715/735 |
| 7,127,305 B1 | 10/2006 | Palmon | 700/83 |
| 7,134,085 B2 | 11/2006 | Austin | 715/63 |
| 7,167,476 B1 * | 1/2007 | Kritayakirana et al. | 370/394 |
| 7,181,299 B2 * | 2/2007 | Osakabe et al. | 700/94 |
| 7,240,289 B2 | 7/2007 | Naughton et al. | 715/740 |
| 7,245,727 B2 * | 7/2007 | Cresci et al. | 381/119 |
| 7,287,230 B2 | 10/2007 | Austin et al. | 715/763 |
| 7,305,504 B2 | 12/2007 | Hong et al. | 710/104 |
| 7,571,014 B1 * | 8/2009 | Lambourne et al. | 700/94 |
| 7,689,305 B2 | 3/2010 | Kreifeldt et al. | 700/94 |
| 7,725,826 B2 | 5/2010 | Kreifeldt et al. | 715/716 |
| 7,742,606 B2 | 6/2010 | Kreifeldt et al. | |
| 7,742,609 B2 * | 6/2010 | Yeakel et al. | 381/119 |
| 8,078,298 B2 | 12/2011 | Kreifeldt et al. | 700/94 |
| 2002/0054588 A1 * | 5/2002 | Mehta et al. | 370/352 |
| 2002/0072816 A1 | 6/2002 | Shdema et al. | 700/94 |
| 2002/0193894 A1 | 12/2002 | Tereda et al. | 700/94 |
| 2003/0063760 A1 | 4/2003 | Cresci et al. | 381/103 |
| 2003/0103075 A1 | 6/2003 | Rosselot | 345/717 |
| 2003/0122866 A1 | 7/2003 | Yook | 345/738 |
| 2003/0225924 A1 | 12/2003 | Jung et al. | |
| 2003/0231625 A1 * | 12/2003 | Calvignac et al. | 370/389 |
| 2004/0034703 A1 | 2/2004 | Phadke | 709/224 |
| 2004/0066783 A1 * | 4/2004 | Ayyagari | 370/395.3 |
| 2004/0128402 A1 | 7/2004 | Weaver et al. | 710/1 |
| 2004/0133291 A1 * | 7/2004 | Nakayama et al. | 700/94 |
| 2004/0267490 A1 | 12/2004 | Opsal et al. | 709/228 |
| 2005/0177256 A1 * | 8/2005 | Shintani et al. | 700/94 |
| 2005/0220054 A1 * | 10/2005 | Meier et al. | 370/331 |
| 2005/0226430 A1 | 10/2005 | Kreifeldt et al. | 381/58 |
| 2005/0226595 A1 | 10/2005 | Kreifeldt et al. | 386/46 |
| 2005/0232602 A1 | 10/2005 | Kreifeldt et al. | 386/96 |
| 2005/0239396 A1 | 10/2005 | Kreifeldt et al. | 455/3.01 |
| 2005/0239397 A1 | 10/2005 | Kreifeldt et al. | 455/3.01 |

FOREIGN PATENT DOCUMENTS

| | | |
|---|---|---|
| EP | 0 718 994 A2 | 6/1996 |
| EP | 0 917 046 A2 | 5/1999 |
| EP | 0955740 A1 | 11/1999 |
| EP | 1 020 858 A1 | 7/2000 |
| GB | 2 301 002 A | 11/1996 |
| GB | 2 302 742 A | 1/1997 |
| JP | 62-204638 | 9/1987 |
| JP | 63-019934 | 1/1988 |
| JP | 03-135130 | 6/1991 |
| JP | 04-242340 | 8/1992 |
| JP | 05-037535 | 2/1993 |
| JP | 07-022429 | 1/1995 |
| JP | 07-023473 | 1/1995 |
| JP | 07-044477 | 2/1995 |
| JP | 07-744291 | 2/1995 |
| JP | 07-079249 | 3/1995 |
| JP | 08-019060 | 1/1996 |
| JP | 8-237767 | 9/1996 |
| JP | 10-040090 | 2/1998 |
| JP | 10-508711 | 8/1998 |
| JP | 11-317990 | 11/1999 |
| JP | 2000-224179 | 8/2000 |
| JP | 2001-511558 | 8/2001 |
| JP | 2002-142272 | 5/2002 |
| JP | 2002-157867 | 5/2002 |
| JP | 2003-044386 | 2/2003 |
| JP | 2003-087889 | 3/2003 |
| JP | 2003-223377 | 8/2003 |
| JP | 2004-015787 | 1/2004 |
| WO | WO 96/14618 | 5/1996 |
| WO | WO 01/53957 A1 | 7/2001 |

OTHER PUBLICATIONS

"IQwic SNMP Support," IQNET Server SNMP Support Documentation, pp. 1-7, Last Updated Jul. 26, 2005; First Created: Oct. 28, 2003.

"Controlling DriveRack™ products with RS-232: A quick start guide," 4 pgs., 2001.

"AES standard—for sound system control—Application protocol for controlling and monitoring audio devices via digital data networks—Part 1: Principles, formats, and basic procedures," AES24-1-1999 (Revision of AES24-1-1995) (withdrawn 2004), pp. 1-43, Audio Engineering Society, Inc., © 1999 Audio Engineering Society.

"Draft AES standard for sound system control—Application protocol for controlling and monitoring audio devices via digital data networks—Part 2: Data types, constants, and class structure (Publication for trial use only) (Withdrawn 2004)," Standards and Information Documents, AES24-2tu-1999 (withdrawn 2004), pp. 1-52, Feb. 27, 1999.

Hase, T, et al., "A New Audio-Visual Control Using Message Object Transmission," IEEE Transactions on Consumer Electronics, vol. 40, No. 4, Nov. 1994, pp. 920-926.

Rodgers, Robert L., The PA-422 Communications Interface and Device Control Language, Journal of the Audio Engineering Society, Audio Engineering Scoiety, Sep. 1, 1990, pp. 619-639, vol. 38, No. 9, New York, NY.

European Search Report dated May 30, 2008.

European Examination Report, dated Oct. 25, 2010, pp. 1-3, European Patent Application No. 05006786.7-1224, European Patent Office, The Netherlands.

Notice of Allowance, dated Aug. 4, 2011, pp. 1-7, U.S. Appl. No. 11/090,665, U.S. Patent and Trademark Office, Virginia.

\* cited by examiner

| | | |
|---|---|---|
| MultiSVSet | 0x0100 | Set State Variable(s) value |
| MultiObjectSVSet | 0x0101 | Set State Variable(s) value in multiple Objects |
| MultiSVSetPercent | 0x0102 | Set State Variable(s) value as a percentage of law |
| MultiSVGet | 0x0103 | Get State Variable(s) value |
| MultiSVGetPercent | 0x0104 | Get State Variable(s) value as a percentage of law |
| MultiSVGetValueString | 0x0105 | Get State Variable(s) value as a Unicode string |
| MultiSVBump | 0x0106 | Change State Variable(s) value by N |
| MultiSVBumpPercent | 0x0107 | As above but by percentage of law |
| RequestAddress | 0x0108 | Requests a Node ID |
| AddressUsed | 0x0109 | Indicates Node ID is in use |
| SetAddress | 0x010A | Sets a Network Address and a Node ID |
| MultiSVGetAttributes | 0x010B | Gets 'n' attribute values from State Variable(s) |
| MultiSVSetAttributes | 0x010C | Sets 'n' attribute values in State Variable(s) |
| GetAttributes | 0x010D | Gets 'n' attribute values from Object or VD |
| SetAttributes | 0x010E | Sets 'n' attribute values in Object or VD |
| MultiSVSubscribe | 0x010F | Subscribe to State Variable(s) native value |
| MultiSVSubscribeString | 0x0110 | Subscribe to State Variable(s) Value String |
| MultiSVSubscribePercent | 0x0111 | Subscribe to State Variable(s) percentage value |
| MultiSVUnsubscribe | 0x0112 | Unsubscribe from State Variable(s) |
| SVSubcribeAll | 0x0113 | Subscribe to a Virtual Device and contents |
| SVUnsubscribeAll | 0x0114 | Unsubscribe from Virtual Device and contents |
| SubscribeErrors | 0x0115 | Subscribe to errors |
| ErrorSubscriptionData | 0x0116 | Message holding an error report |
| CreateVD | 0x0117 | Start of messages instantiating a Virtual Device |
| EndCreateVD | 0x0118 | End of messages instantiating a Virtual Device |
| DescribeVD | 0x0119 | Requests full description of a Virtual Device |
| GetVDList | 0x011A | Gets list of Virtual Devices in a Node |
| SetSVList | 0x011B | Sets the State Variables in a VD or Object |
| GetSVList | 0x011C | Gets the State Variables in a VD or Object |
| SetObjectList | 0x011D | Sets the Objects in a Virtual Device or Object |
| GetObjectList | 0x011E | Gets the Objects within a Virtual Device or Object |
| GetVDIOList | 0x011F | Set audio routings between Virtual Devices |
| SetVDIOList | 0x0120 | Get audio routings between Virtual Devices |
| GetObjIOList | 0x0121 | Get audio routings between Objects |
| SetObjIOList | 0x0122 | Set audio routings between Objects |
| GetControlTable | 0x0123 | Gets a control table |
| Store | 0x0124 | Stores Information |
| Recall | 0x0125 | Recalls Information |
| SetVenueTable | 0x0126 | Sets a Venue Table |
| GetVenueTable | 0x0127 | Gets a Venue Table |

FIG. 15

| | | |
|---|---|---|
| DiscoInfo | 0x0000 | Locates nodes and exchanges routing information |
| DiscoFailsafe | 0x0001 | Detects new nodes that were 'missed'. |
| GetNetworkInfo | 0x0002 | Gets information on network interfaces |
| SetProxy | 0x0003 | Tells a node to work as a proxy |
| RequestAddress | 0x0004 | Requests the use of a specific Node ID |
| AddressUsed | 0x0005 | Notifies that a Node ID is in use |
| SetAddress | 0x0006 | Sets a Network address and a Node ID |

FIG. 16

AUDIO RELATED SYSTEM COMMUNICATION PROTOCOL

PRIORITY CLAIM

This application claims the benefit of U.S. Provisional Application No. 60/557,117, filed Mar. 26, 2004 and U.S. Provisional Application No. 60/644,967, filed Jan. 18, 2005. The disclosure of the above-identified applications are both incorporated herein by reference. In addition, the following commonly owned patent applications are related to this application: U.S. patent application Ser. No. 11/090,569, filed Mar. 25, 2005, entitled AUDIO-RELATED SYSTEM NODE INSTANTIATION; U.S. patent application Ser. No. 11/090,542, filed Mar. 25, 2005, entitled AUDIO-RELATED SYSTEM LINK MANAGEMENT; U.S. patent application Ser. No. 11/090,665, filed Mar. 25, 2005, entitled SYSTEM FOR NODE STRUCTURE DISCOVERY IN AN AUDIO-RELATED SYSTEM; U.S. patent application Ser. No. 11/090,518, FILED Mar. 25, 2005, entitled SYSTEM FOR AUDIO-RELATED EQUIPMENT MANAGEMENT; and U.S. patent application Ser. No. 11/089,741, filed Mar. 25, 2005, entitled SYSTEM FOR AUDIO-RELATED DEVICE COMMUNICATION.

BACKGROUND OF THE INVENTION

1. Technical Field

This invention relates to audio systems, and more particularly, to a system for management of audio related equipment.

2. Related Art

Use of an audio system to amplify audio signals is well known. Typically, an audio system operates to amplify an audio signal with an amplifier and drive one or more loudspeakers. Such audio systems can range from relatively simple configurations having only a few components, such as in a retail clothing store, to large complex systems, such as those used in a concert hall performance.

Configuration of an audio system usually involves the physical placement and interconnection of the devices that make up the audio system. In addition, some of the devices, such as an amplifier, typically include user configurable settings. The settings may be configured at the preference of the user to achieve the desired audio system performance. In addition, the devices in the audio system may become more geographically dispersed. Accordingly, operation, maintenance and troubleshooting of the system may become more challenging.

As the size and complexity of an audio system increases, the amount of interconnections and settings may also increase. Additionally, the audio related devices in the system may have different communication interfaces. For example, an amplifier on the system may have a RS232 port while a microphone may communicate via a USB port. The mixture of communication interfaces and variety of settings increase the difficulty of configuring an audio system. This is especially true in audio systems that are repeatedly disassembled and re-assembled in various configurations, such as in the case of a touring musical group.

SUMMARY

This invention provides a system for management and control of audio related equipment. The system is a common architecture that provides the capability to manage, monitor and control all of the audio related equipment in an audio system. Accordingly, everything from microphones, to amplifiers, to mixers to lighting systems is accessible and controllable with the system.

The system provides a network independent protocol to seamlessly integrate across a plurality of different audio related devices of varying complexity using any of a variety of physical networks and communication platforms. In addition, the system allows for upgrades, changes and additions of audio related devices within the system by providing messaging functionality to discover those aspects of a particular audio related device that are not already known. The messaging functionality also allows audio data and related information to be transmitted between selected audio related devices efficiently and with minimized network traffic.

One or more performance equipment managers are included in the system. The performance equipment managers retrieve and/or generate control panel views of the entire audio system. In addition, the performance equipment manager(s) may retrieve and/or generate control panel views for each specific device within the audio system. The control panel views allow the coordinated management, control and monitoring of the audio related devices within the audio system. A communication protocol used within the system allows standardized communication between the performance equipment mangers and the audio related devices, as well as device-to-device communication.

The standardized protocol also allows a user to add an audio related component to an audio system without performing any setup. Even though the physical communication link may be different for each audio related device in the system in some examples, the protocol allows each type of communication platform to seamlessly communicate. This greatly reduces the time for setting up the audio system, which may be particularly important for systems that are repeatedly disassembled and re-assembled.

A common packet structure may be used in the protocol. In the packet structure, a source address and destination address may be used in the packet to route the message to the appropriate audio related device. In some examples, the source address and destination address may be a unique node ID associated with an audio-related device. The node ID may be an independent identification of the audio-related device that is independent of addressing used in conjunction with the audio-related device's network interface. This enables messages between audio-related devices that have different network interfaces, for example.

Other systems, methods, features and advantages of the invention will be, or will become, apparent to one with skill in the art upon examination of the following figures and detailed description. It is intended that all such additional systems, methods, features and advantages be included within this description and be within the scope of the invention.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 15 is a table of example application layer messages and address layer message identifications ("IDs") that may be communicated among the audio-related devices in the protocol illustrated in FIG. 14.

FIG. 16 is a table of example routing layer messages and routing layer message IDs that may be communicated among the audio-related devices in the protocol illustrated in FIG. 14.

DETAILED DESCRIPTION OF THE PREFERRED EMBODIMENTS

I. System

Figure 1:
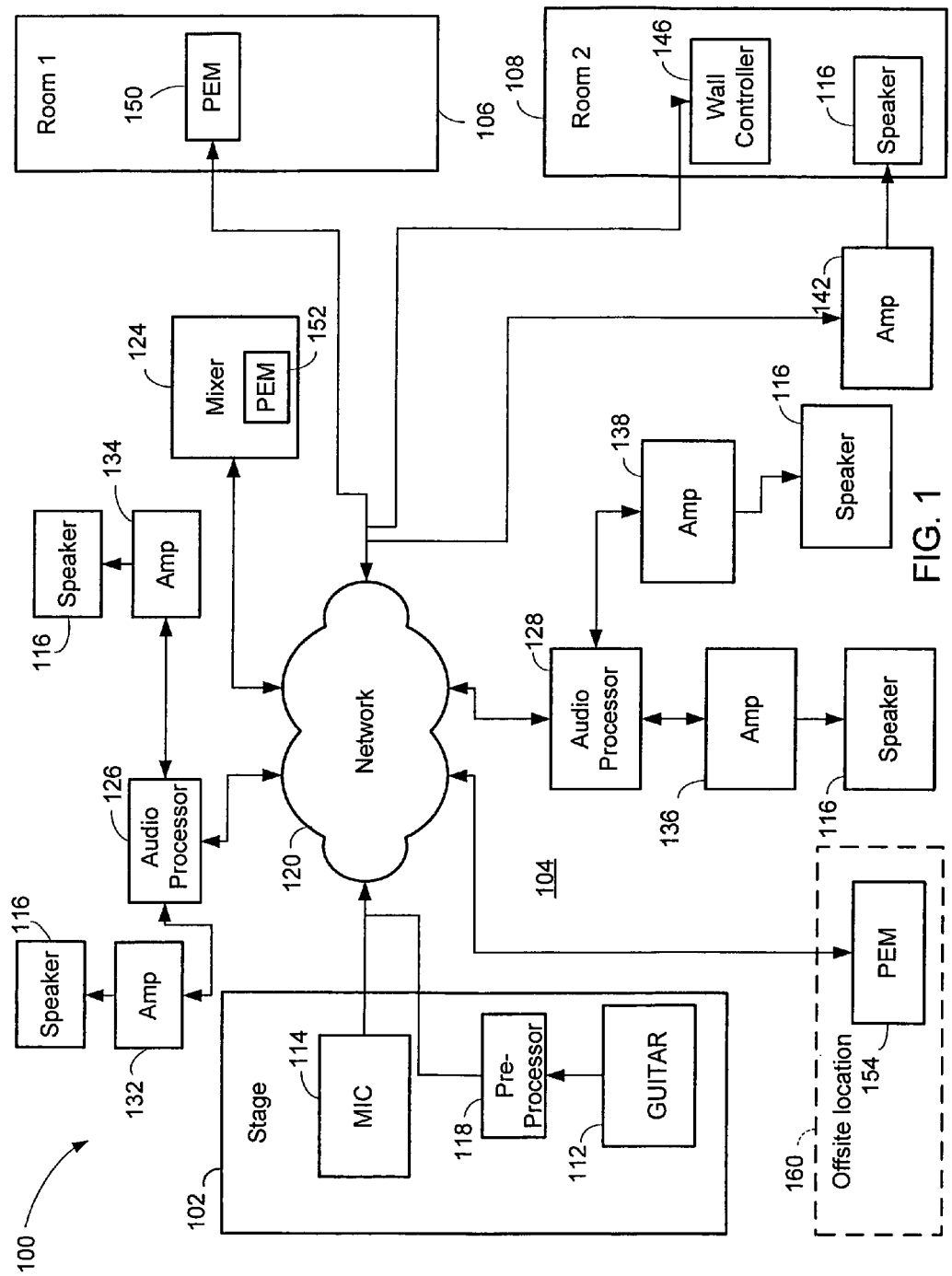
FIG. 1 is block diagram of an example audio system.

FIG. 1 is an example of an audio system 100 having a plurality of audio-related devices configured for a performance such as a music concert in a venue such as a concert hall. In other examples, the audio system 100 may be configured for any other type of performance in any other type of venue, to include permanently installed sound systems, such as in an amusement park, and temporarily installed sound systems such as for a rock concert in a stadium. The audio-related devices included in the example audio system 100 are depicted as installed in a venue that includes a stage 102, an audience area 104, a first room 106, and a second room 108.

The audio system 100 includes a guitar 112 and a microphone 114 providing audio signals that are processed to produce audible sound from a plurality of loudspeakers 116. In other examples, the audio signals may be produced by any other type of device. The audio signal produced by the guitar 112 may be processed by an audio signal preprocessor 118 and provided to an audio network 120 also included in the audio system 100. The audio network 120 may be any form of communication highway capable of carrying audio signals and any other signals related to the audio system. The audio network 120 may include fiber optic, wired, and/or wireless communication capability in any of a plurality of protocols, such as Ethernet, USB, RS232, RS485, Firewire, or any other protocol.

Audio signals from the microphone 114 also may be provided to the audio network 120. In the illustrated example, the audio signals may be received and processed by a mixer 124. Processing by the mixer 124 may be based on configurable settings such as filters, compressors, equalizers, effects, gains, or any other settings that are included in the mixer 124. Following processing by the mixer 124, the processed audio signals may be received by a first and a second audio processor 126 and 128 for further processing using configurable settings included in the first and second audio processors 126 and 128. The first and second audio processors 126 and 128 may provide further effects in the audio signals. Audio signals processed by the first and second audio processors 126 and 128 may be received by a first, second, third, and fourth amplifier 132, 134, 136, and 138. Additional configurable settings in the amplifiers 132, 134, 136, and 138, such as gain and equalizer ("EQ") settings may be applied in further processing and amplification of the audio signals. The amplified and processed audio signals may drive the respective loudspeakers 116.

The audio signals also may be received by a fifth amplifier 142, processed and used to drive the respective loudspeaker 116 included in the second room 108. A wall controller 146 may be used to control the fifth amplifier 142 over the audio network 120. In addition, the wall controller 146 may include a display capable of displaying one or more parameters related to the operation of the audio system 100 that are received over the audio network 120.

A first PEM 150 also may be included in the audio system 100. The first PEM 150 may be stored in a memory device and executed in any form of computing device, such as an audio related device. In the example audio system, the first PEM 150 is being executed in a personal computer ("PC"), having a GUI. In other examples, operation of the first PEM 150 may be distributed among the memory devices of a plurality of computing devices having one or more GUI's. The first PEM 150 may include the capability to selectively display the various audio-related devices and aspects of the audio system 100 in one or more control panel views using the GUI. Alternatively, a plurality of parallel operating PEMs may be used to selectively display the control panel views of the various audio-related devices and the functionality present in a predetermined portion of the audio system 100. Accordingly, in large and complex audio systems, the audio system 100 may be divided so that multiple PEMs may be employed as different subsystems within the audio system 100.

As used herein, the term "control panel view" or "control panel views" is defined as graphically generated user interfaces on a display, hardware based user interfaces, such as a control surface, and/or a combination of graphically generated user interfaces and hardware based user interfaces.

Control panel views that are a system venue view display(s) in the form of a GUI may be generated by the first PEM 150. The system venue view display(s) may be a system specific depiction of the configuration, identity and operational parameters of audio-related devices in the audio system 100. The audio-related devices in the audio system 100 may be discovered by the first PEM 150 and included in the system venue view display(s). In addition, the first PEM 150 may individually manage, monitor, and control the audio-related devices in the audio system 100 using the audio network 120. Individual management of the audio-related devices may be performed from a plurality of control panel views that are GUI control panel views.

Each of the audio-related devices may be managed using one or more GUI control panel views that correspond to a respective audio-related device. The one or more GUI control panel views may be generated by the PEM 150 and displayed in the display. The control panel views also may be a control surface included with the PEM 150. As used herein, the term "control surface" refers to hardware, such as buttons, knobs, meters, LEDs, sliders, indicators, numeric displays, or any other hardware-based user interface associated with an audio-related device.

The PEM 150 may identify and use stored, predefined control panel views that are for a corresponding audio-related device based on information provided by the audio-related device over the audio network 120. Such information may include an audio node structure of the audio-related device. Alternatively, the PEM 150 may use generated control panel view(s) that include stored, predefined control panel view(s), stored, predefined aspects of a control panel view, and/or aspects of a control panel view that are generated by the PEM 150 to generate the control panel views. The generated control panel view(s) may be formed based on information, such as an audio node structure, provided by the corresponding audio-related device over the audio network 120.

Stored, predefined GUI control panel views corresponding to the audio node structure of an audio-related device similarly may be identified and used to display the functionality of an audio-related device. In addition, generated GUI control panel view(s) that include stored, predefined GUI control panel view(s), stored, predefined GUI aspects, and/or GUI aspects that are generated by the PEM 150 may be used to form the GUI control panel views. The generated GUI control panel view(s) may similarly be formed based on information, such as an audio node structure, provided by the corresponding audio-related device over the audio network 120. As used herein, the term "GUI aspect" is defined as each of the features that are displayable in a GUI to provide monitoring, configuration, and/or control of an audio-related device. In addition, the term "component" refers to the various affiliated user interfaces included in a control panel view, while the term "aspect" refers to a stand alone user interface that can be integrated into a control panel view.

Accordingly, a stored, predefined GUI control panel view may include a plurality of GUI components that previously have been developed, visually placed, and interrelated in the GUI control panel view. The GUI components may be representative of at least a portion of the functionality of an associated audio-related device. An example of components of a stored, predefined GUI control panel view is a depiction of each of a number of audio channels in a mixer. Each of the audio channels represented may include a slider to control volume, a volume indicator to indicate the position of the slider (in dB), and an audio signal indicator to indicate the incoming signal (in dB). In this example, the slider and the volume indicator could be interrelated such that when the slider is moved the volume indicator reflects the changing magnitude of the volume.

Stored, predefined GUI aspects that are not included in a stored, predefined GUI control panel view include visual/control features that may be added by the PEM 150 to an existing stored, predefined GUI control panel view. These visual/control features may be added to form a GUI control panel view representative of the functionality of a corresponding audio-related device. Such added predefined GUI aspects also may be interrelated with the GUI components included in the stored, predefined GUI control panel view. The PEM 150 also may form a GUI control panel view from one or more of the stored, predefined GUI aspects based on information, such as the audio node structure, provided by an audio-related device. A GUI control panel view may be formed when an audio-related device does not have an associated stored, predefined GUI control panel view(s). In this case, the predefined GUI aspects also may be interrelated within the GUI control panel view that is formed.

If there are no stored, predefined GUI control panel views or stored, predefined GUI aspects of GUI control panel views for a particular audio-related device, the PEM 150 may generate the GUI aspects and the entire GUI control panel view(s) based on information provided over the audio network by the corresponding audio-related device(s). The GUI aspects may similarly be interrelated.

Accordingly, due to the networked configuration, the PEM 150 may be configured to manage the end-to-end operation of the entire audio system 100 and the individual audio-related devices. Troubleshooting, storage of audio system and audio-related device settings, network management, and network communication management also may be performed with the first PEM 150.

The mixer 124 may include a second PEM 152. Operation of the second PEM 152 may be configured similarly to the first PEM 150 to include monitoring, control, and storage functionality. In addition, a third PEM 154 also having similar functionality may be positioned in an offsite location 160 such as an office building.

The functionality of the PEMs 150, 152, and 154 may be configured based on the processing power of the respective devices in which the PEMs 150, 152, and 154 operate. In addition, the PEMs 150, 152, and 154 may be configured to provide the desired level of functionality and features. For example, the third PEM 154 located in the offsite location 160, may operate in a computing device, such as a computer with a GUI, to perform an oversight role. Accordingly, error logging, alarming, and system operation may be monitored with the third PEM 154. GUI control panel views displayed with the third PEM 154 to support performance of the oversight role may be accessed from the library and/or generated based on communication with the audio-related devices as previously discussed for the first PEM 150. The third PEM 154 also may be configured with the capability to view and adjust individual audio-related device settings to provide remote technical and troubleshooting assistance within the audio system 100.

The second PEM 152 may share the user interface and processing capability of the mixer 124 with the functionality of the mixer 124. Accordingly, the second PEM 152 may have reduced functionality if less computing power, such as processing, data storage and/or display capabilities are present in the mixer 124. The second PEM 152 may be configured to determine the operational capability of the audio-related device in which the second PEM 152 is operating.

Functionality of the second PEM 152 may be conformed to the determined operational capability of the mixer 124. Accordingly, if the mixer 124 has a communication port and/or memory capability that limits communication and/or display of operating parameters and settings of itself, or other audio-related devices in the audio system 100, the second PEM 152 may use relatively smaller less complex control panel views. In addition, the second PEM 152 may request a smaller portion of the operational parameters and settings of the audio-related device. For example, if the audio-related device is a two channel audio amplifier, the second PEM 152 may display only one channel and obtain operational parameters and settings associated with the displayed channel. When the second channel is requested, the second PEM 152 may display only the second channel and associated operational parameters and settings.

II. Audio-Related Device

Figure 2:
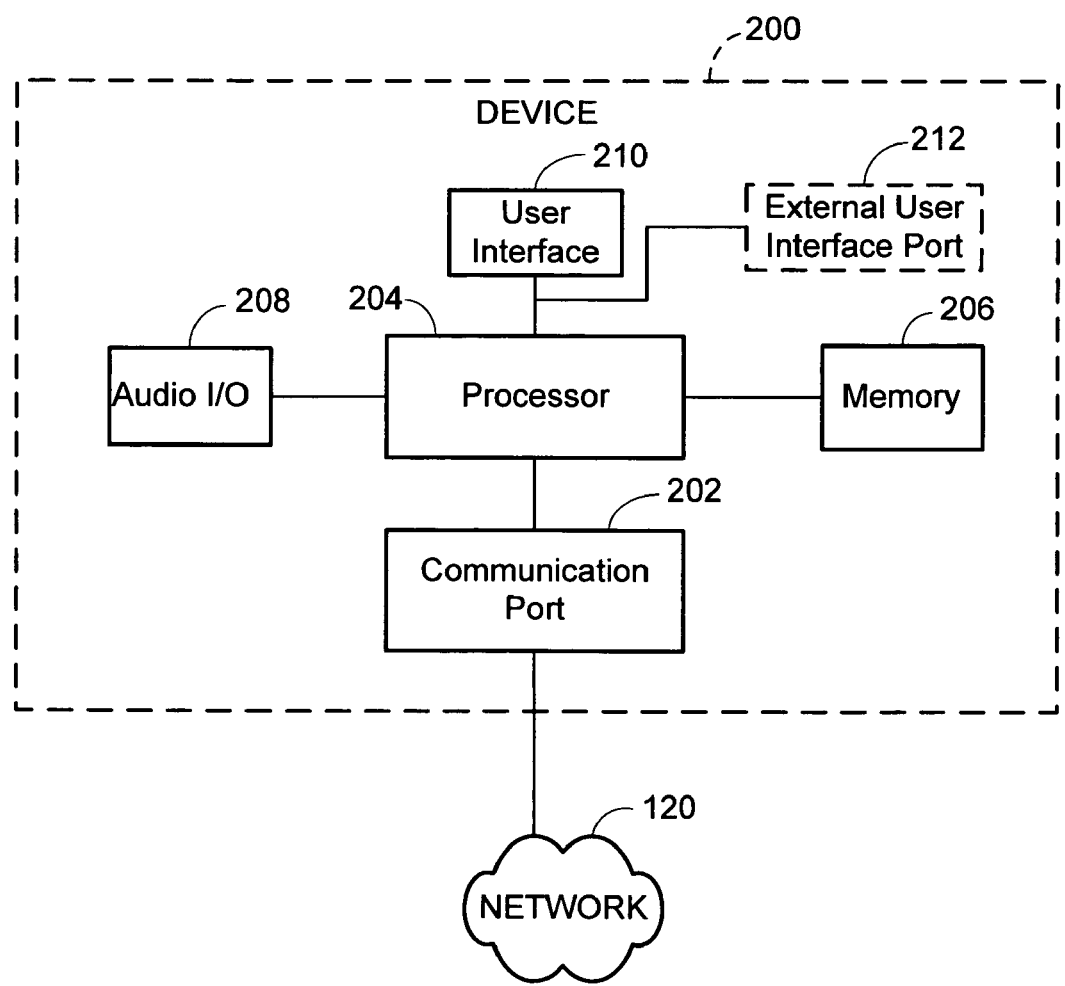
FIG. 2 is an example block diagram of one of the audio-related devices illustrated in the audio system of FIG. 1.

FIG. 2 is a block diagram of an example of an audio-related device 200 coupled with the audio network 120. The audio-related device 200 may be a mixer, an amplifier, a microphone, a lighting panel, a wall controller or any other device related to an audio sound system and/or audio performance. The audio-related device 200 includes a communication port 202, a processor 204, memory 206, audio I/O 208 and a user interface 210. Optionally, the audio-related device 200 may include an external user interface port 212. In other examples, more functionality may be depicted in the audio-related device 200. In addition, fewer or additional blocks may be used to describe the functionality of the audio-related device 200.

The communication port 202 may be any configuration of hardware and/or software that enables communication over the audio network 120. The processor 204 may be any device capable of executing instructions, logic tasks and/or operating code to manage overall functionality, perform calculations, control inputs/outputs, etc. within the audio-related device 200. The processor 204 also may control the operation of the communication port 202.

The memory 206 may be a volatile and/or a non-volatile memory device that is configured to store instructions executable by the processor 204, settings of the audio-related device 200, an audio node structure useable by the PEMs (described later), operational parameters, set points, and any other data or information pertaining to the audio-related device 200 and operation in the audio system 100 (FIG. 1). The memory 206 is a medium that preserves data for retrieval, such as instructions retrieved for execution. It may include a hard disk drive, a compact disc drive, a digital versatile disc drive, a Random Access Memory ("RAM"), a Read Only Memory ("ROM"), a Programmable Read-Only Memory ("PROM"), an Electrically Erasable Programmable Read-Only Memory ("EEPROM"), a flash memory, or any other digital storage device.

The audio I/O may be any inputs and outputs that are provided directly to the audio-related device 200. For example, an audio amplifier may have audio inputs that are processed and amplified and sent to outputs that are used to drive a loudspeaker. The user interface 210 may include buttons, sliders, knobs, a touch screen, or any other form of interface that allows user commands to be provided to the audio-related device 200. In addition, the user interface 210 may include any form of audio and/or visual outputs for receipt by a user of the audio-related device 200. Example audio and/or visual outputs include light emitting diodes ("LEDs"), meters, displays, such as liquid crystal displays ("LCDs"), or any other mechanisms providing indication to a user of the condition and/or operation of the audio-related device 210.

The external user interface port 212 may be an optional communication port that allows the audio-related device 200 to communicate with one or more other audio-related devices. The external user interface port 212 may provide a communication link to other audio-related devices that is outside of the communication path provided by the audio network 120. For example, an amplifier communicating on the audio network 120 may receive an input signal via the external user interface port 212 from a wall controller. An example wall controller may have outputs that are digital signals associated with a rotary switch, and inputs that are a feedback indication displayed on a display included in the wall controller. In this example, the wall controller may provide the input signal to adjust the output gain of the amplifier. In addition, the wall controller may receive an output signal from the amplifier via the external user interface port 212. The output signal may be representative of the output gain, and may be displayed on the display of the wall controller.

Figure 3:
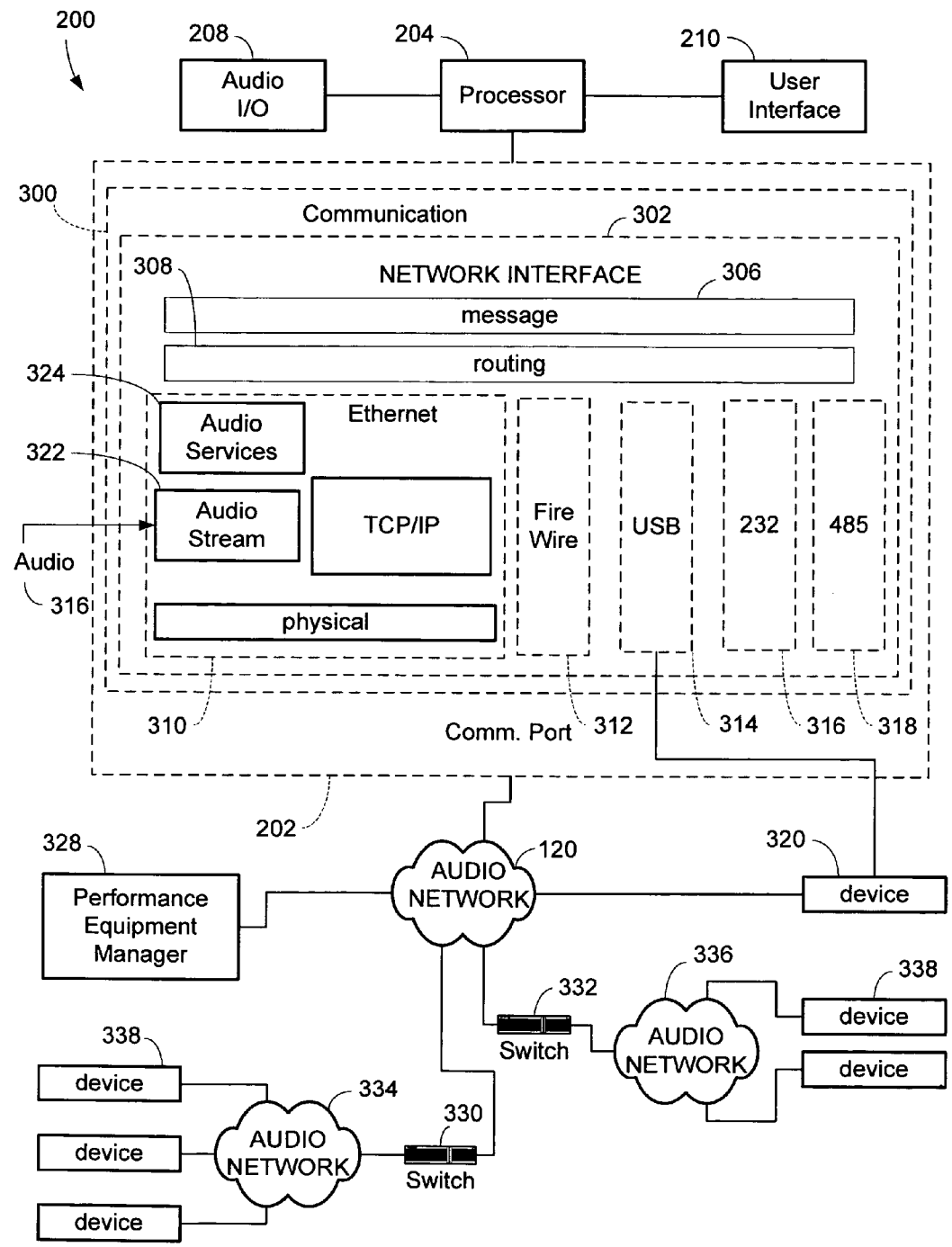
FIG. 3 is a more detailed block diagram of the audio-related device of FIG. 2 and a portion of the audio system depicted in FIG. 1.

FIG. 3 is a more detailed block diagram of a portion of the audio-related device 200 illustrated in FIG. 2 and a portion of the audio system illustrated in FIG. 1. In FIG. 3, the communication port 202, the processor 204, the audio I/O 208, and the user interface 210 are depicted. The communication port 202 includes a communication module 300 having a network interface 302. The communication module 300 may be stored in memory 206 and may be used for any communication external to the audio-related device 200.

The network interface module 302 includes a message layer 306 and a routing layer 308. The message layer 306 is configured to communicate messages between the audio-related device 200 and other audio-related devices and/or equipment in the audio system. Various aspects of messaging within the audio system are discussed in detail later. The routing layer 308 includes a plurality of subsystems capable of communication with different protocols and/or physical media combinations.

An Ethernet communication link 310, a Fire Wire communication link 312, a USB communication link 314, an RS232 communication link 316, and an RS485 communication link 318 may be used within the audio-related device 200. In other examples, any other form of communication link may be used to transfer audio signals, audio-related device settings, and data related to the audio system. For example, an audio-related device may communicate over the audio network 120 using the Ethernet communication link 310, or directly with another audio-related device 320 using the USB communication link 314 as illustrated in FIG. 3. The various communication links that interface with the routing layer 308 each may include a packet service layer, a reliability layer, a network layer, a data link layer, and a physical layer. Within each of the communication links, the routing layer provides messages received over the audio network, or from other audio-related devices.

An audio stream module 322 and an audio services module 324 also may be included in the network interface 302. The audio stream module 322 may receive an audio signal 316 and transmit the audio signal 316 as streaming audio over the audio network 120. In addition, the audio stream module 322 may receive streaming audio from the audio network 120. An example audio stream module is a Cobranet system manufactured by Peak Audio of Boulder, Colo. The streaming audio may be transmitted between the audio stream module 322 and another audio stream module in another audio-related device. The audio stream modules of different audio-related devices should be compatible to communicate.

The audio services module 324 is operable to automatically configure the audio stream modules 322 to create compatible communications between different audio stream modules. The audio services module 324 may compare the capability of each of the audio stream modules 322 based on the settings of the network interface modules of the corresponding audio-related devices. Based on negotiations with other audio services modules, the audio services module 324 may select settings that are compatible and common to all the audio stream modules. Accordingly, all of the audio steam modules may be configured with settings based on the audio-related device with the most limiting communication capabilities. By automatically negotiating the settings, the audio services module 324 may configure all the audio stream modules in the audio system to be compatible and capable of communication with each other. Example settings that may be automatically negotiated by the audio services module 324 include channel count, bit depth, sample frequency and latency.

In FIG. 3, the audio-related device 200 also may communicate over the audio network 120 with a PEM 328. As previously discussed, the PEM 328 may manage, control and monitor the audio-related device 200 over the audio network 120. A first and second switch 330 and 332 also may be coupled with the audio network 120. The first and second switches 330 and 332 may provide a communication path between the audio network 120 and a respective first audio network 334 and a second audio network 336. A plurality of other audio-related devices 334 may be coupled with the first and second audio networks 334 and 336. Other audio-related devices 338 may be capable of communication over the audio network 120 using the first and second switches 330 and 332.

III. Audio Node Structure

The functionality within each audio-related device may be represented with an audio node structure. The audio node structure also may be used to generate one or more GUI control panel views within a GUI. The GUI control panel views may be used to monitor, control and configure a corresponding audio-related device. In addition, the audio node structure may be used to configure one or more control surfaces.

Figure 4:
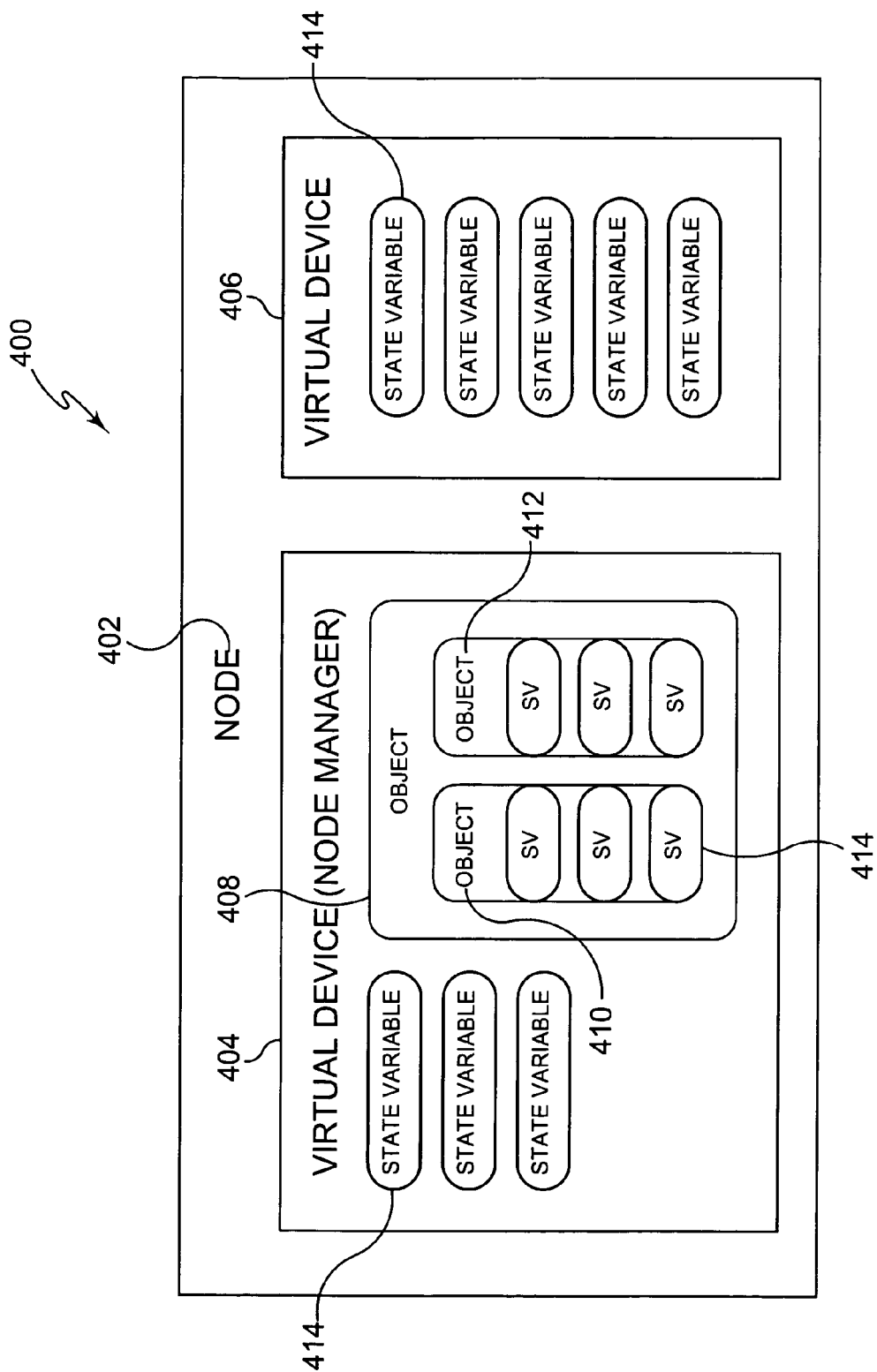
FIG. 4 is a block diagram of an example audio node structure representative of an audio-related device.

FIG. 4 is an example of an audio node structure 400 representative of an audio-related device. The audio node structure 400 includes a plurality of components included in a node 402. The node 402 may be representative of the audio-related device and includes a node ID. Alternatively, a node may form a sub-component of a larger system where a number of nodes are present to form a functional, audio-related device. Each node may include one or more virtual devices. Each virtual device may include one or more objects and state variables. Each object in a virtual device may include additional objects and also state variables. Nodes that are configured with network capability may communicate over one or more network interfaces.

In FIG. 4, the example node 402 includes components that are a first virtual device 404 and a second virtual device 406. In other example configurations, additional or fewer virtual devices may be included based on the functionality of the particular audio-related device. The first virtual device 404 is a node manager virtual device that is configured to be responsible for node level operations. For example, the node manager may maintain a list of virtual devices in the node 402. Using the virtual device list, the node manager virtual device may communicate to other audio-related devices what virtual devices are present in the node. In addition, the node manager virtual device may be responsible for maintaining any node level information.

The first and second virtual devices 404 and 406 are the top level of a three level hierarchy representative of each of the devices in the system. In general, each of the virtual devices in an audio node structure is representative of functional units within a device. The first virtual device 404 includes an object 408 representative of the second hierarchical level. As detailed later, objects may be used to represent processing blocks, control elements, status elements, etc. The object 408 may have additional components including are a first object 410 and a second object 412. The first and second objects 410 and 412 represent additional functional elements within the object 408.

The first and second objects 410 and 412, the first virtual device 404 and the second virtual device 406 each include components of the audio node structure that are state variables 414. As detailed later, state variables are data variables that may be varied, such as a frequency, a fader position, a delay time, or any other changeable parameter within a device. Accordingly, such variable data points may be present in virtual devices and/or objects depending on the functionality of the specific audio-related device being represented with an audio node structure. State variables are representative of the third hierarchical level.

The nodes 402, the virtual devices 404 and 406, the objects 408, 410 and 412 and the state variables 414 are the components that make up the audio node structure of each audio-related device. The nodes 402, the virtual devices 404 and 406, the objects 408, 410 and 412 and the state variables 414 may be in any configuration that reflects the functionality of a particular audio-related device. Accordingly, the audio node structure of different audio-related devices may be the same or may vary significantly.

Each of the nodes 402, the virtual devices 404 and 406, the objects 408, 410, and 412 and the state variables 414 (i.e. the components) may include attributes. The attributes may describe how the associated node, virtual device, object or state variable is used, a name, a unit of measure and/or association with other virtual devices, objects and/or state variables. In addition, attributes may provide descriptive information, such as placement in a control panel view of the corresponding virtual devices, objects and state variables, wiring details, or any other descriptions or characteristics of the corresponding component.

Within the audio node structure of an audio-related device, there may be no distinction between components used for signal processing such as a parametric EQ, control components such as a mechanical fader, or sensor components such as an output meter. In addition, global items, such as passwords and musical instrument digital interface ("MIDI") channels, may be included in the audio node structure. By representing all of the functionality of the different audio-related devices included in an audio system with state variable(s), object(s), and/or virtual device(s), the same mechanisms for communication, such as subscriptions and control, can be universally applied throughout an audio system that includes a wide variety of different audio-related devices.

A node can dynamically create and destroy virtual devices contained therein. A program operable in an audio-related device is an example of a dynamically created virtual device. Another example of a dynamically created virtual device is an automation virtual device for a control panel view in an audio-related device. Objects also may be dynamically created and destroyed. Examples of dynamically created objects may be an insert on a control panel view of an audio-related device. In this example, an effect object may be instantiated, and then objects may be linked to the effect object through modification of state variables that have routing attributes configurable to describe such linkage.

State Variables

Within the audio node structure, modifiable parameters in an audio-related device's functionality may be held within the state variable ("SV") component. Thus, SVs include actual values that may be measured values, set point values, tuning values, setting values, or any other parameter that is a changeable parameter within an audio-related device. Actual values may be automatically updated, manually updated, and/or logically updated based on other actual values. Examples of SVs include the parameter(s) of an audio object like frequency and the position of a fader on a control surface. Simple audio-related devices like a wall controller may contain only a limited number of SVs. Other audio-related devices, such as a mixing console may contain hundreds of thousands of SVs. Typical operations on SVs include 'set' a variable and 'get' a variable. For example, such operations could translate to setting the frequency of an EQ and getting a delay time for display on a control surface of the audio-related device. These basic operations may form the basis of more complex forms of usage such as automation.

Attributes

In addition to holding the value of an audio parameter, an SV also may possess a number of attributes that describe how the corresponding SV may be used. Examples of two attributes are 'minimum' and 'maximum' that represent the range of dB values to which a Gain SV may be set. Another attribute could be the data type used to hold the dB value. For example, the date type could indicate an SV as an IEEE float, a byte, or a word. Accordingly, by including the attributes information, the SV may be accessible to other audio-related devices in the audio system even when the other audio-related devices have not been programmed specifically for the SV and therefore do not know the characteristics of the SV. Thus, attributes may be used by other audio-related devices that do not have prior knowledge to discover the attributes and thus gain the knowledge required to use the SV.

Attributes also may provide information that is descriptive of the audio node structure. Accordingly, when some portion of an audio node structure is unknown, attributes associated with the unknown components may be used to determine the functionality of the components. In addition, attributes may provide a correspondence between the audio node structure and control panel views. For example, attributes may be used to identify stored, predefined control panel views for an audio-related device. In addition, attributes included in the audio node structure may provide information to form a control panel view when a stored, predefined control panel view does not completely correspond to the audio node structure, or does not exist at all. Thus, when an audio node structure of an audio device does not have corresponding stored, predefined control panel view(s) or stored, predefined aspect(s), the attributes of the audio node structure may provide information to generate control panel view(s) and/or aspect(s).

The attributes also may include information to allow integration or incorporation of a generated aspect into a stored, predefined control panel view or to form a number of generated aspects into a control panel view. For example, an audio node structure could include objects and SVs representative of channels in a mixer. Attributes associated with the objects and SVs could indicate that the channels should be displayed as percent with sliders to provide control capability. In addition, the attributes could describe the placement of the various aspects that are generated with respect to each other. Further, attributes could describe how the wiring between aspects should be displayed, interrelationships between aspects, colors, sizes, shapes, or any other parameters related to display of the functionality of an audio-related device in a control panel view. The concept of attributes is applied throughout the audio node structure and includes SV, objects, virtual devices, and node manager virtual devices.

An attribute may be classified into one of three categories that represent the way in which it may be used. The categories of attributes include static, instance, and dynamic. A static attribute is fixed and does not change. Accordingly, a database of static attributes can be defined that minimizes the amount of discovery required to control components, such as an SV in the audio node structure. An instance attribute may be set per instance of an SV. A dynamic attribute is a static attribute or an instance attribute that may be client-set or modified at run-time. Static and instance attributes may be queried. Dynamic attributes are generally similar to either static or instance attributes. Dynamic attributes differ from static or instance attributes, however because their values may be overridden at run-time.

Attributes may include an attribute identification ("attribute ID") and a class identification ("class ID"). The attribute ID is a way of uniquely identifying each attribute. The attribute ID may be enumerated from zero using an unsigned byte ("UBYTE") and may be represented with a predetermined name. The attributes at each level of hierarchy of the audio node structure may have their own enumeration. Thus, for example, an attribute ID of 3 for a SV class may refer to a different attribute in an object class. The class ID may be represented with a predetermined number, such as an unsigned word ("UWORD") that identifies a unique grouping of attribute values—the class ID. For example, if a SV has eleven attributes all set to specific values, this collection of attributes and their values may be identified as a SV class and assigned a representative class ID. This class ID may be used as a form of shorthand to save describing the attributes in long form. Class ID may be used in all levels of the hierarchy to represent sets of attribute values—SV class, object class, etc. To encourage the re-use of SV and object classes, a master list of class IDs may be maintained, and classes may be registered.

Class

A class, such as an SV class, an object class, a virtual device class or a node manager virtual device class may be represented numerically and by a string name, such as by the class ID ("UWORD") and a class name ("STRING"), respectively. Each class ID may include a set of attributes, such as an ID, an attribute name and a category. class names may be prefixed to identify the hierarchical level in the audio node structure. For example, a class name of SVs may be the term "SVClass." Example SV class names are SVClassPeqFreq, SVClassPeqQ and SVCassPeqGain. A class ID also may be used for any of a SV class, an object class, a virtual device class and a node manager virtual device class. An example set of attributes in a SV class ID are:

TABLE 1

| ID | Attribute Name | Datatype | Category |
|---|---|---|---|
| 0 | Data Type | | Static |
| 1 | Name String | STRING | Instance + Dynamic |
| 2 | Minimum Value | Data Type | Static + Dynamic |
| 3 | Maximum Value | Data Type | Static + Dynamic |
| 4 | Control Law | | Static |
| 5 | Flags | UBYTE | Static |
| 6 | Default Value | Data Type | Instance |
| 7 | Control Primitive | | Instance |
| 8 | Control Coordinates | | Instance |
| 9 | Encoder Mode | UBYTE | Instance |

An object class and its associated class ID may define specific a priori knowledge of the object. The object class may enable an object to be wholly defined by the object class and the values of the SVs. An object class may be formed from static and instance attributes. Static attributes that define an object class may include any sub-objects contained by the object and any SVs contained by the object. For example, a three band Equalizer and a five band Equalizer would be different object classes because they contain different numbers of SVs. The object class ID may be a UWORD used to specify the object class. There may be one master registry of object class IDs. Developers may register their object class IDs with the master registry. In addition, the same objects may be used across families of audio-related devices. The object class ID may include a set of attributes as previously described. An object class may have a naming convention that begins with the phrase "ObjClass." An example set of attributes in an object class ID are:

TABLE 2

| ID | Attribute Name | Datatype | Category |
|---|---|---|---|
| 0 | Class Name | STRING | Static |
| 1 | Name String | STRING | Instance |
| 2 | Flags | UBYTE | Instance |

A virtual device or a node manager virtual device also may include a class. The class of a virtual device and associated class ID may represent a virtual device's unique characteristics and may be used for easy identification and differentiation of different kinds of virtual devices. An example of two different kinds of virtual devices is an Automation virtual device and an input surface virtual device within a node of an audio-related device, such as a mixing console. An example allocation of a unique class ID can be allocation of a class ID to a group of virtual devices representative of distinct software programs included in one or more audio-related devices. The class ID of a virtual device may be represented as a UWORD. The virtual device also may have a class name. The virtual device class name may be used to provide a human readable shorthand for the user. This class name need not be unique. An example set of attributes in a virtual device class ID are:

TABLE 3

| ID | Attribute Name | Datatype | Category |
|---|---|---|---|
| 0 | Class Name | STRING | Static |
| 1 | Name String | STRING | Instance |

An example set of attributes in a node manager virtual device class ID includes:

TABLE 4

| ID | Attribute Name | Datatype | Category |
|---|---|---|---|
| 0 | Class Name | STRING | Static |
| 1 | Name String | STRING | Instance |
| 2 | Flags | UWORD | Instance |
| 3 | Serial Number | BLOCK | Instance |
| 4 | Software Version | STRING | Instance |
| 5 | Reserved | UWORD (Set to 0) | |
| 6 | Hop Count | UBYTE | Instance + Dynamic |
| 7 | Venue Table Size | UWORD | Static |
| 8 | User Name A | STRING | Instance + Dynamic |
| 9 | User Name B | STRING | Instance + Dynamic |
| 10 | User Name C | STRING | Instance + Dynamic |
| 11 | User Name D | STRING | Instance + Dynamic |
| 12 | User Password A | STRING | Instance + Dynamic |
| 13 | User Password B | STRING | Instance + Dynamic |
| 14 | User Password C | STRING | Instance + Dynamic |
| 15 | User Password D | STRING | Instance + Dynamic |
| 16 | Address Mode | UBYTE | Instance + Dynamic |

Where the "BLOCK" data type represents a data structure comprised of a size N and N bytes of data.

Static Attributes

Static attributes may be predefined for each of the classes. For example, a SV class may include the static attributes of a set of data types to represent different SV values, a minimum SV value, a maximum SV value, a control law, and flags.

The control law may describe how the SV should be controlled. For example, an SV for frequency may be logarithmic, or a gain SV may be logarithmic with extra resolution around 0 dB. If an SV can take on any floating-point value between the class Min and Max, it may be desirable to specify a control law to give a certain look and feel to a user. For example, in the case of a frequency variable, it may be desirable, when the user turns an encoder or pushes an "up" control on a spinner, for the next value to be logarithmically spaced from the previous value. The control law also may be used to specify the granularity that an SV can accept. For example, a gain SV may have a maximum resolution of 0.1 dB. The control law may be omitted in the case of an enumerated SV, since all steps are predefined.

Flags may be predefined to further define the SV associated with the attribute. Example flags include sensor attributes that may be used in subscriptions to automatically set the type of subscription to periodic or on change. Examples of sensor SVs include output meters, threshold meters, or power amplifier temperature. Example non-sensor SVs include frequency or MIDI channels. Other example flags include an event type to indicate that an SV can be subscribed to with an event subscription, and a modified flag to indicate a change such as when the maximum, minimum, or SV name string has been changed from the documented static class value. Although the SV name string is an 'instance' attribute within the SV class, it is normally static within the object, and therefore any changes made to it may be tracked with the modified flag.

An object class, a virtual device class or a node manager virtual device class also may include static attributes, such as a class name. An object class name may be used to provide a human readable shorthand for the user. The object class name need not be unique among families of audio-related devices. For example, a first audio-related device that is a mixer may have the object class Name 'ObjClassSC_PEQ_5' and a second audio-related device in the same family of audio-related devices, such as a dbx DriveRack may have the object class name 'ObjclassDR_PEQ_5'. Both audio-related devices may have the class name "5 Band PEQ." The class name may be selectable from a drop down on a GUI control panel view and may be stored as a STRING.

In virtual devices, static attributes may be those attributes belonging to the virtual device that have the values associated with the class ID. In one example, the static attributes may not be set per-instance nor changed dynamically at run-time. Static attributes for virtual devices also may include a name string. The name string may be used to name the instantiation of the virtual device. The name string can be the same as the class name. Where there are multiple instances of the same name, the multiple instances may be differentiated by appending a space and decimal number. For example, if in an audio-related device that is a mixer, there were two instantiations of an input fader bank with a virtual device class name of "MHx Input Bank", the virtual device name strings for each instance could be "MHx Input Bank 1" and "MHx Input Bank 2."

Static attributes of node manager virtual devices also may include the class type. The class type of the node manager may determine the value of the node manager's static attributes. The attributes may not be varied on a per-instance basis nor changed at run-time. For example, a static attribute in a node manager class for a particular type of audio-related device will have the same value on each and every instantiation of the node manager. The node manager also may include a static attribute indicative of a venue table size. The venue table size static attribute may be queried to discover the size of a venue table supported by the audio-related device. Use and operations of venue tables will be described later.

Instance Attribute

An instance attribute is a static attribute that may be set to a unique value for each instance of a SV, object, virtual device or node manager virtual device class.

With regard to SVs, the object or virtual device may instantiate the SV that defines the values. Accordingly, these attributes may be static to the object or virtual device. The SV class may include instance attributes such as a SV ID, a Name String, a Default Value, a control primitive, a control coordinate and an encoder mode. The SV ID may be a UWORD that is used as an identifier of each SV within an object or virtual device. SV IDs need not be zero based nor fully populated within the object or virtual device. The SV name string may provide a human readable prompt for the SV. This string need not be unique to the SV within the object. For example, for each band of a parametric EQ, each SV representing gain can have the SV name string "Level." The default value may be used to initialize an object or virtual device. The default value may be expressed in the data type of the SV. The default value may be dynamic so that a programmer may uniquely specify this according to the needs of the object. For example, a crossover object with two crossover frequency SVs may want them initialized to 100 Hz and 1.0 kHz, respectively. The control primitive may be used to make a generic GUI control panel view or generic GUI aspect for the object or virtual device. The object or virtual device may suggest the control primitive to be used for each SV. The control coordinates may be used for placement of the control primitives for a generic GUI control panel view or a generic GUI aspect. The encoder mode may recommend how to display a SV value on a GUI aspect, such as an encoder. The Encoder Mode attribute's Data Type may be a UBYTE.

Objects also may include instance attributes, such as a name string. The name string may be a name of the instantiated object and may be stored in a STRING data type. For example, a product could have an object class "Input_Channel" with instantiations "Input 1", "Input 2", etc. Objects also may include instance attributes that are flags. The flags may provide information about the corresponding object. For example, one of the flags may be a modified flag. The modified flag may be a bit that indicates when one or more SVs within the object have been modified from their static class definition. Possible modifications may be listed under 'SV Dynamic Attributes.' Upon recognition of a modified object, another audio-related device with a control surface may perform further queries to resolve the changes.

Node manager virtual devices also may include instance attributes that may be set to custom values when the node manager is created. Such instance attributes may not be changeable dynamically during run-time. Examples of instance attributes of a node manager are included in the previously described example node manager virtual device class—Table 4.

In the examples of Table 4, the virtual device name string of the node manager virtual device may designate both the name of a node and a workgroup to which the node belongs. The name string attribute may be user-configurable and storable in non-volatile memory. The serial number attribute may be a unique number identifying each node. The unique number may be used, for example, to resolve address conflicts. One type of example serial number may be a statistically unique 128-bit ID that is a hexadecimal number string. Generation of the statistically unique 128-bit ID may be performed, for example, with a PC running the Microsoft application 'uuidgen.' The generated serial number may be written into the non-volatile memory of the node during manufacture and never changed. Another type of example serial number is a 48-bit Ethernet MAC address with the top 80 bits set to zero. Where an audio-related device has two or more network interfaces, the MAC address from the interface that is usually enabled, or enabled more often, may be used.

The software version attribute in Table 4 may be the revision of embedded firmware or PC application software operable in the audio-related device. The software version may be represented by a string of any format. A hop count attribute may be used to indicate the number of hops an outgoing message will be initialized with. The data type of the hop count attribute may be a UBYTE and the default can be a predetermined number of hops. The user name A-D attributes may contain a user name for each category of user. The user password A-D attributes may contain a password for each category of user.

The address mode attribute in Table 4 may control whether the node chooses a random or sequential node address during address negotiation. Address negotiation is described later. In an example audio system, all audio-related devices may be set to use random addressing to minimize the possibility of address clashes. Alternatively, in other audio systems, such as in a tour sound audio system, it may be desirable to have nodes sequentially numbered. Accordingly, the address mode attribute may be set to sequential node addressing, and sequential numbering may be achieved by turning on nodes (audio-related devices) one at a time and having each successive one choose an address, which is one higher than the last. The address mode attribute may be contained in a UBYTE with an example format of 0-Random and 1-Sequential.

Dynamic Attributes

Dynamic attributes are a sub-set of attributes that may be client-set or modified at run-time. This is useful when setting user-defined ranges and names for SVs. In this example, the SV attributes that may be modified dynamically are minimum value, maximum value, and name string. When the modifiable attributes deviate from their published values and become 'dynamic,' the discovery process may require an extra step to determine the actual values. For this reason the list of dynamic attributes may be limited to situations where there is a specific need in order to limit the extra overhead during discovery.

Virtual devices also may utilize dynamic attributes. For example, dynamic attributes may be included as part of the class ID of a virtual device. In this example, the dynamic attribute may be a bit flag used to indicate that the virtual device may be re-configured at run-time to contain different objects. When the bit flag is cleared, the dynamic attribute may indicate that the virtual device contains a static configuration of objects and may be wholly known by its class ID. The specification of more than one dynamic virtual device class may occur in an audio-related device when the audio-related device is reconfigurable. In this scenario, a reconfigurable audio-related device may use a dynamic virtual device to represent a set of audio-related functions or operations executed in the audio-related device. Accordingly, the class type may be used to identify the version of the set of audio-related functions or operations. In addition, the class type may be used to determine if a set of audio-related functions or operations are compatible with a software patch, a software upgrade, a set of audio-related functions or operations in another virtual device, etc. For example, if a user copies the values of a set of audio-related functions or operations of an audio-related device that is represented by a dynamic virtual device to a clipboard, a simple check of the virtual device type would stop the user from being able to paste the values of that set of audio-related functions or operations to an incompatible set of audio-related functions or operations in another audio-related device that has its own unique dynamic virtual device class.

Communication Support

The SVs, objects, and virtual devices support communication between the audio-related devices. Query and modification of SVs, objects, and virtual devices may be with a message based communication infrastructure. In addition, direct calling to perform queries and modification via pointers and the like is also possible. The communication infrastructure may be predefined so that the support of the communication using SVs, objects, and virtual devices may be uniform across different audio-related devices with different audio node structures.

Support of predefined messages may be somewhat dependent on the components of the audio node structure being queried and modified. SVs may include actual values, and therefore support messages related to modification of the associated actual value(s). Messages to change an actual value of a SV, such as a set point, with a signed formatted replacement actual value, or with a percent change value may be supported.

Various forms of "get" messages may be supported. Get messages may include get attribute messages to obtain the attributes associated with one or more SVs, objects, or virtual devices. In addition, get messages may request the actual values from a SV, such as with a get value string message. In the case of objects and virtual devices, get messages to provide lists or tables may be supported. As discussed later, a list of virtual devices within a node may be requested from the virtual device node manager. Similarly, lists of components inside of other components, such as a list of objects or SVs within a virtual device and/or a list of objects within an object may be requested with get messages. Get messages also may be supported by virtual devices and/or objects to provide information related to inputs and outputs included in the functionality represented by the respective virtual device or object. For example, messages may query for a virtual device I/O list and/or an object I/O list. Further, get messages to provide any other information, related to the SVs, objects, and/or virtual devices also may be supported.

"Set" messages also may be supported. Set messages may set the actual value in a SV, set an attribute, set one or more values in a list, modify a table, etc. In addition, "subscribe" and "unsubscribe" messages may be supported by the SVs, objects, and virtual devices. As opposed to "get" messages that involve poling an audio-related device for information, "subscribe" messages may create an event-driven mechanism for providing information. For example, a subscribe message may be used to request that anytime the actual value(s) of SV(s) within a component change, the changes are provided. Such subscribe messages may be supported to allow subscriptions between one or more individual, audio-related devices with the same or different audio node structures. For example, a first object or virtual device in a first audio-related device may subscribe to all the SVs, selected SVs, or one SV in one or more other objects and/or virtual devices in a second audio-related device. Subscribe messages may be related to any information available about a component, such as actual values, errors, configuration, and/or status.

Routing

Routing of messages may be between components, such as objects, in the node structure of an audio-related device. In addition, messages may be routed between components in the node structures of different audio-related devices. Routing may be configured between virtual devices and/or objects. For routing between components in different audio-related devices, the components may be bound to one or more physical interfaces, which in turn may stream the audio to and from the audio network.

Routings may be constructed by configuring each component. Such configuration may involve uniquely identifying the source and destination of each routing. For example, a first component, such as a first object, may be configured to identify that inputs will be from an output of a second component, such as a second object, and that outputs of the first component will be provided to the input of the second component. Each component may have a number of channels. The channels may be identified by a predetermined identifier, such as a zero-based integer. The channels may be configured to be either an input or an output. The channel identifier may be combined with the audio system address of the audio-related device to form a unique audio address. For example, an audio-related device with an audio address of: 0xABCD00000001 may have a channel: 12 with an I/O Mode of Output.

The audio address may be an output audio address or an input audio address. Thus, an audio-related device may have an input channel that can receive an output audio address to identify where the input channel should obtain its audio source. In addition, the audio-related device may have an output channel that can receive an input audio address to identify where the output channel should route its output. For example:

Output Connection specifying an Input Address (First Object)
    Audio Address: 0xABCD00000002, Channel: 2, I/O Mode: Input
    Input Connection specifying an Output Address (Second Object)
    Audio Address: 0xABCD00000001, Channel: 12, I/O Mode: Output Subscriptions A subscription is a mechanism that may be used to notify a control panel view and/or audio-related device when something has changed. Subscriptions may be based on a predetermined condition, such as 'on change' or 'periodic.' All metering may be handled through subscriptions. For example, a first control panel view subscribes to an SV. If that SV is changed by a second control panel view, the first control panel view is told of the new actual value of the SV. Notifications may be handled using a set message, such as a SVSet message. All subscription messages may automatically generate an immediate response, such as an actual value of a SV. The response may be immediate to synchronize the different control panel views to have the same value.

In the subscription message, the subscribee may be directed to use a specified virtual device, object, and SV ID to report changes. From the point of view of the subscriber, when a change is reported to the subscriber, the SV on the subscriber is set to the new value as opposed to notifying the subscriber that the particular SV on the subscribee is changed. This mechanism is useful, for example, when the subscriber does not keep a full-mirrored data set of the subscribee. A subscriber that is a simple control surface, such as a wall controller, or a custom control panel, can have its own set of SVs with their own audio addresses. The subscribee may simply set these SVs directly without any translation required on the subscriber end. Accordingly, each SV may have a set of 0 to N audio addresses and SV IDs that are mapped. When a SV has changed, a predetermined subscription list may be accessed by the subscribee, and a set message, such as SV_Set may be transmitted to each of the subscribers on the subscription list that are mapped to the changed SV. To minimize network traffic, notifications may be bundled and sent to any one node using any one of the normal bundling techniques.

Each SV class may define whether a respective SV is to be considered a sensor or non-sensor SV. All sensor SVs may notify based on a predetermined condition, such as at a periodic rate. The periodic rate may be specified by the subscriber. If because of overhead the sensor cannot support at the rate suggested by the subscriber, the sensor may notify at a slower rate. The sensor may be configured not to notify at a faster rate then specified by the subscriber. The subscription message may include a rate that is used when the subscription is to a sensor SV. Non-sensor SVs may be automatically assigned to notify on change.

A subscription also may be based on a predetermined condition, such as an event subscription or a value subscription. A value subscription is a request to be notified of a new actual value of an SV when the actual value of the SV has been changed by a third party. For example, a value subscription may be used when multiple control panel views that need to stay in a coherent state attach to an audio-related device that is a mixer core. If a first control panel view engages a mute in the mixer core, a second control panel view may be notified with a value subscription to a SV that controls a mute indicator in the second control panel view.

An event subscription is a request to be notified of an SV's current value in response to a hardware trigger, such as switch contacts closing. A SV may support event subscription if the SV has input hardware associated with it. Event subscription capability may be indicated as part of the SV class declaration. An attempt to obtain an event subscription from an SV that does not support event subscriptions may be rejected with an error.

In an example application, event subscriptions may be used to implement 'bank' buttons on an assignable control surface. A bank switch maintains a SV that holds the name of a 'macro' as an output audio address. When a bank button is pressed, the event subscription may provide the actual value of the SV to a subscribing object and the subscribing object may execute the 'macro' thus remapping the faders.

Event and value subscriptions are not mutually exclusive. Both event and value subscriptions may be in force at the same time. An example of this is an automation object. In the previously described example, an automation object may use an event subscription to record when the bank button is pressed, and a value subscription to capture the switch being re-programmed to a different value. The previous example can also be coded as two separate SVs, one representing the actual switch press and the other the value that will be sent on pressing of the switch. With this scheme, event subscriptions may be supported on the audio-related device.

Subscriptions also may be multi-level. With SVs subscriptions, the subscription may be to a single SV or a list of SVs within one subscription request message. Object and virtual device subscriptions also may be to a single SV or multiple SVs. All of the SVs in an object may be subscribed with a single message, such as a SateVariableSubscribeAll message. If a virtual device or object contains multiple objects, the subscribes may include all of the SVs that form the hierarchical audio node structure of the virtual device or object in a subscription. In one example, to minimize the amount of data to be transmitted in a subscription data message, the subscribee may assume that the virtual devices and/or objects of the subscriber have the same structure as the subscribee. When the subscriber has a portion of audio node structure that mirrors the portion of the audio node structure of the subscribee, the addressing information may be omitted from the actual values of the SVs included in subscription data message payload. A subscription to an entire node also may be requested. A node subscription message, such as a SubscribeErrors message to subscribe to all of the errors generated by a node, may be directed to the virtual device node manager of the subscribee.

The subscriber also may request the subscription data message to be delivered to an alternative destination virtual device or object. The alternative destination also may include a 'mirrored' audio node structure. The mirrored audio node structure may allow audio-related devices, such as GUIs, Control Surface or Automation devices to subscribe to any other audio-related device without an address clash occurring between the components in the subscriber and subscribee.

In one example, an SV list on a subscriber object mirrors the SV list on the subscribee so that each individual SV ID need not be sent in the subscribe data message. Subscriptions to an entire object also may specify whether the subscription is to all sensor and non-sensor data, all sensors or all non-sensors. Subscriptions to a virtual device may be by addressing a subscription message to the virtual device. All of the SVs contained in the virtual device and every object encapsulated in the virtual device may be subscribed to. The virtual device structure of the subscriber may be identical to that of the subscribee.

A subscription may be added or removed using add and remove messages. For example, a subscribe message may be used to add a subscription and an unsubscribe message may be used to remove a subscription. A subscribe message instructs the subscribee to add the subscriber to the subscribee's subscribe list for one or more identified SVs. An unsubscribe message, on the other hand, directs the subscribee to remove the subscriber from the subscribe list for one or more identified SVs. If for example, it was desired to change a subscription from one SV to another on the same object, then both an UnSubscribe of the first subscription and then a Subscribe for the new subscription may be sent.

Multiple SVs also may be unsubscribed in a single unsubscribe set message, such as a SVUnSubscribeAll message. Such an unsubscribe set message may be used to unsubscribe from every SV under an object or virtual device. If the virtual device or object contains multiple objects, the unsubscribe set message may include every SV in the corresponding portion of the audio node structure that is identified in the unsubscribe message. Similar to the subscribe message, to minimize the amount of data to be transmitted, the unsubscriber may have a mirrored audio node structure so that the subscriber and subscribee object addresses and SV identifiers can be used interchangeably.

Error Handling

Error messages may be categorized generally as protocol errors and device errors. Protocol errors result when an audio-related device receives a malformed or otherwise undecipherable message. An example of this type of error is a message with an incorrect length field. As a best practice, devices should attempt to detect and report all such errors. Device errors result when a device is unable to perform a requested action for a device-specific reason. An example of this type of error might be an attempt to communicate with a subsystem that is temporarily busy or otherwise unavailable. Another form of device error is application errors. An example of an application is clipping somewhere in the signal path of an audio-related device.

An audio-related device may report an error upon receipt of a message. Mechanisms to communicate errors include an error acknowledgement message and an error subscription. An error acknowledgement message may be used to report the error to the sending device. An error acknowledgement message may take the form of a bit in a message header flag. When a device receives a message that constitutes or results in an error, an error information message may be returned to the sender.

An error subscription may allow interested parties to subscribe to all error acknowledgement messages generated by an audio-related device. Error subscriptions can be used so that an interested party may monitor or log all errors during operation. With an error subscription, all error messages sent by the subscribee may be copied to the subscriber. The error subscription data may include the error message and the original message that caused the error. To reduce the size of that message, the original subscription message may be limited to a maximum size resulting in truncation of the original message that caused the error if the original message is too long.

Event Logging

Event logging is a way to store and report significant occurrences on a node. The events may be of an informational nature such as the recall of a venue preset, or may be more serious errors, like a power supply failure. The events may be recorded by the node and stored in non-volatile storage until such time that an event log client, such as a control panel view reads the events.

Event logging may be different from error handing in a number of areas:
a) Event logging may allow benign events; error handling may only report failure modes.
b) Event logging may save events if the client is not online; error handling may not.
c) Event logs may be supplied 'on-demand'; errors may be pushed via subscription.
d) Events may be assigned to a category and given a priority; errors may not be.

Event logs may be exported in a predetermined format, such as XML files or in a binary format using messages. XML is the preferred format where the memory resources of the audio-related device are sufficient to generate the resulting file. Audio-related devices with limited resources may use the binary format or even a proprietary compressed format.

XML Event logs may be transported via a file transport protocol, such as an FTP protocol. Audio-related devices that need to export logs over non-IP networks may use a binary event log format which transfers event log entries via Messages. Alternatively, event logs may be made directly accessible via a Web Browser.

Workgroups

Nodes may be configured in a workgroup. Typically, a workgroup of nodes is deployed in an audio-related device having relatively complex functionality, such as a large soundboard. Within the audio-related device, the nodes may be aggregated into a cooperatively operating functionality. Workgroups may be hierarchical but not overlapping. Each workgroup may be identified by a string name and levels of hierarchy may be separated by a predetermined character, such as '\'. An example workgroup may be an audio-related device, such as a console, that includes two nodes, such as a node representative of the functionality of a control surface and a node representative of the functionality of an audio rack. When both nodes are active the console can be considered "whole." The workgroup of this audio-related device could be designated as 'FOH Mixer' and the nodes could be called 'FOH Mixer\Surface' and 'FOH Mixer\Audio.'

Workgroups also may be used to segment an audio system. Audio system segmentation may be desirable to control access to subsystems within the audio system or to otherwise divide the functionality of the audio system into subsystems. For example, in a stadium audio system design, a top-level workgroup may be identified as "Stadium," an intermediate level work group may be identified as "SkyBoxes", and each individual skybox may be identified as its own workgroup. Accordingly, in this example, the workgroup of an audio-related device in skybox number 10 may be "Stadium\SkyBoxes\Skybox10." Discovery can now be segregated such that a control surface inside a skybox can choose to discover only the node(s) within that skybox, but a control surface assigned to the workgroup "Stadium\Skyboxes" can discover any audio-related device within any of the skyboxes. Discovery is discussed in more detail later.

Segmentation by workgroups may be limited to the discovery process within the application layer. Other messages still may be passed between nodes in different workgroups. Assignment of workgroups may be with an attribute. A workgroup string, such as 'name string' may be an attribute of the node manager virtual device. This string may be set and queried by other audio-related devices.

IV. Performance Equipment Manager ("PEM")

Figure 5:
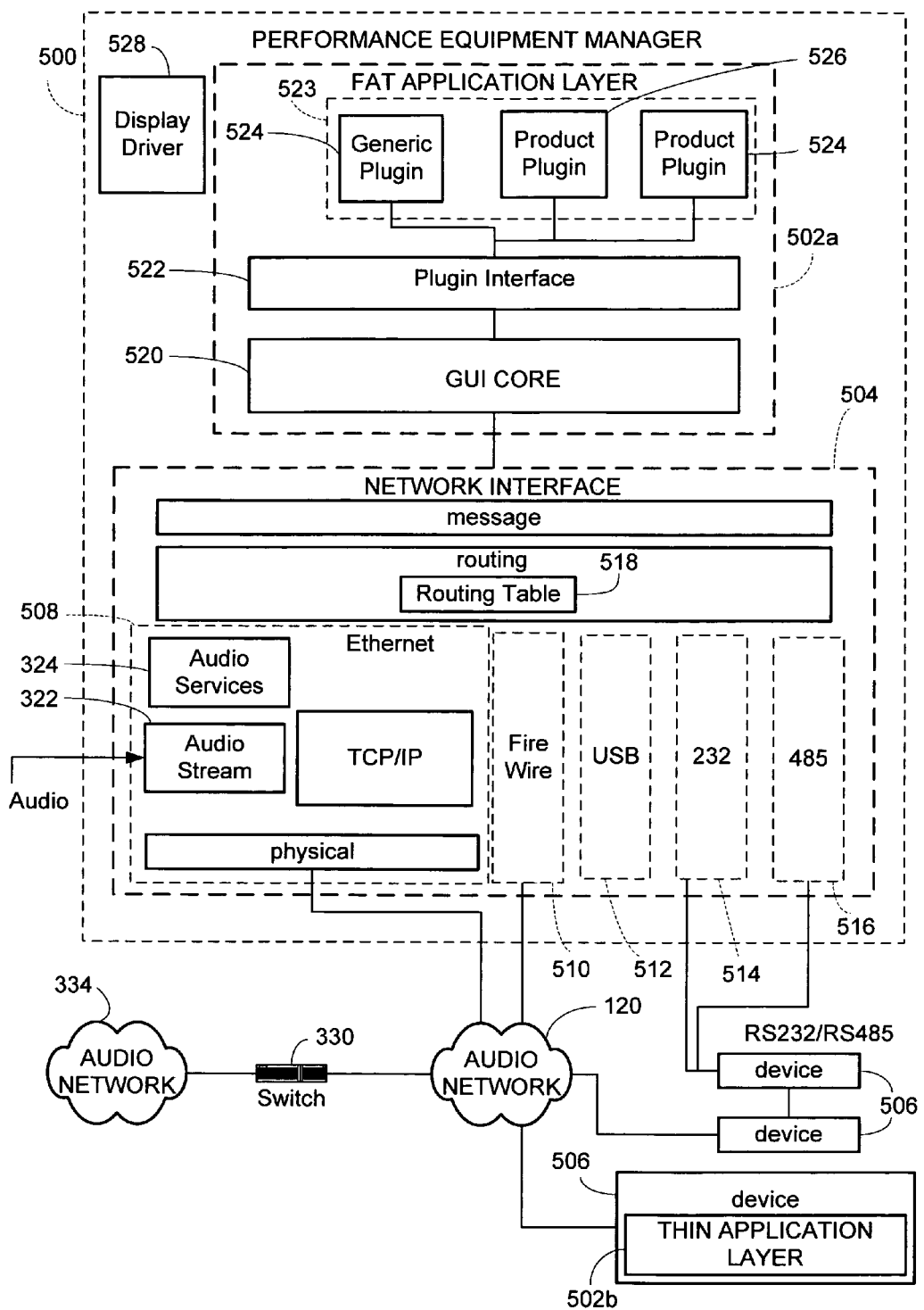
FIG. 5 is a block diagram of an example PEM and a portion of the audio system depicted in FIG. 1.

FIG. 5 is a block diagram of a PEM and a portion of the audio system. The PEM 500 may be formed with a plurality of instructions and data stored in one or more memory devices. The memory device(s) may be any medium that preserves data for retrieval and may include a hard disk drive, compact disc drive, digital versatile disc drive, RAM, ROM, PROM, EEPROM, flash memory, or any other digital storage device. The PEM 500 may reside on any audio-related device in the audio system.

The PEM 500 may include an application layer 502 and a network interface 504 stored in the memory. The network interface 504 may be configured to allow communication between the PEM 500 and an audio-related device 506 or multiple audio-related devices. The PEM's network interface 504 may operate in a similar manner as the previously discussed network interface of the audio-related device 506. For example, the PEM 500 may be connected directly to a device 506 or may be in communication with a device 506 using the audio network 120. The audio network 120 also may be coupled with the first audio network 334 via the first switch 330 as previously discussed. The PEM 500 may communicate with a device 506 using any communication link, such as Ethernet 508, FireWire 510, USB 512, RS232 514 or RS485 516, as previously discussed. In addition, the PEM 500 may include the previously discussed audio stream module 322 and audio services module 324.

The network interface 504 also may include a routing table 518. The routing table 518 may be used to route data between nodes and the PEM. The routing table 518 may store a list of routes between nodes on the audio network 120 and the network information transmitted between the nodes. The routing table 518 may include multiple routes between a set of nodes to allow for redundant networking. Routes may be chosen on the basis of the shortest transit time. Several factors may be considered in determining the shortest transit time. For example, the bandwidth between nodes may be a factor in the "cost" of a particular route. In addition, hop counts and message size may be considerations. Based on these factors, a "cost" may be associated with each route and different routes may be chosen, for example, to minimize costs or maintain costs, below a predetermined threshold.

The PEM's application layer 502 may be either a "fat" application layer 502a or "thin" application layer 502b, depending upon the capability of the device on which the application layer is running. In a "fat" PEM, the entire audio node structure of a device may be obtained and analyzed to determine the appropriate set of control panel view(s) to represent the entire audio node structure. A "thin" PEM, however, may obtain and analyze only a portion of the audio node structure as needed for a control panel view to be displayed. Accordingly, the control panel views obtained and analyzed by the PEM 500 may be based on a sliding scale of complexity dependent on the computing power capabilities of the audio-related device 506 upon which the PEM 500 is operating. In some circumstances, a "fat" PEM may operate in a similar manner as a "thin" PEM to conserve processing power or to limit network traffic. Before querying a device, for example, a "fat" PEM may recognize that the volume of traffic on the audio network 120 is high, and therefore, only obtain a portion of the audio node structure of the audio-related device 506 to reduce network traffic.

The PEM's application layer 502 may include a GUI core 520, plugin interface 522 and a plurality of plugins 523. The plugins 523 may include a generic plugin 524 and one or more product plugins 526. The GUI core 520 may be configured to query the audio node structure of a device 506. This audio node structure data may be broadcast to the product plugin(s) 526 and/or generic plugin 524 to search for an appropriate control panel(s) for the device 506. The GUI core 520 (in cooperation with the product plugin(s) 526 and/or generic plugin 524) may direct a display driver 528 to drive a display to render a control panel view(s) for each level of the audio node structure, regardless of whether each portion of the audio node structure in the device has a known, predefined control panel view. If a control panel view is known for the entire audio node structure, a predefined control panel view may be displayed using the display driver 528, and may be used to monitor and control the device. If all or a portion of the audio node structure is unknown, however, a "generic" control panel view or a "generic" GUI aspect for the unknown portion of the audio node structure may be generated dynamically and displayed using the display driver 528. The "generic" control panel view or a GUI aspect included in a predefined control panel view may be used to control the device.

The GUI core 520 may communicate with devices 506 through the network interface 504. Communications between the GUI core 520, generic plugin 524 and product plugin(s) 526 may pass through the plugin interface 522. The generic plugin 524 and product plugin 526 also may communicate with each other using the plugin interface 522.

Figure 6:
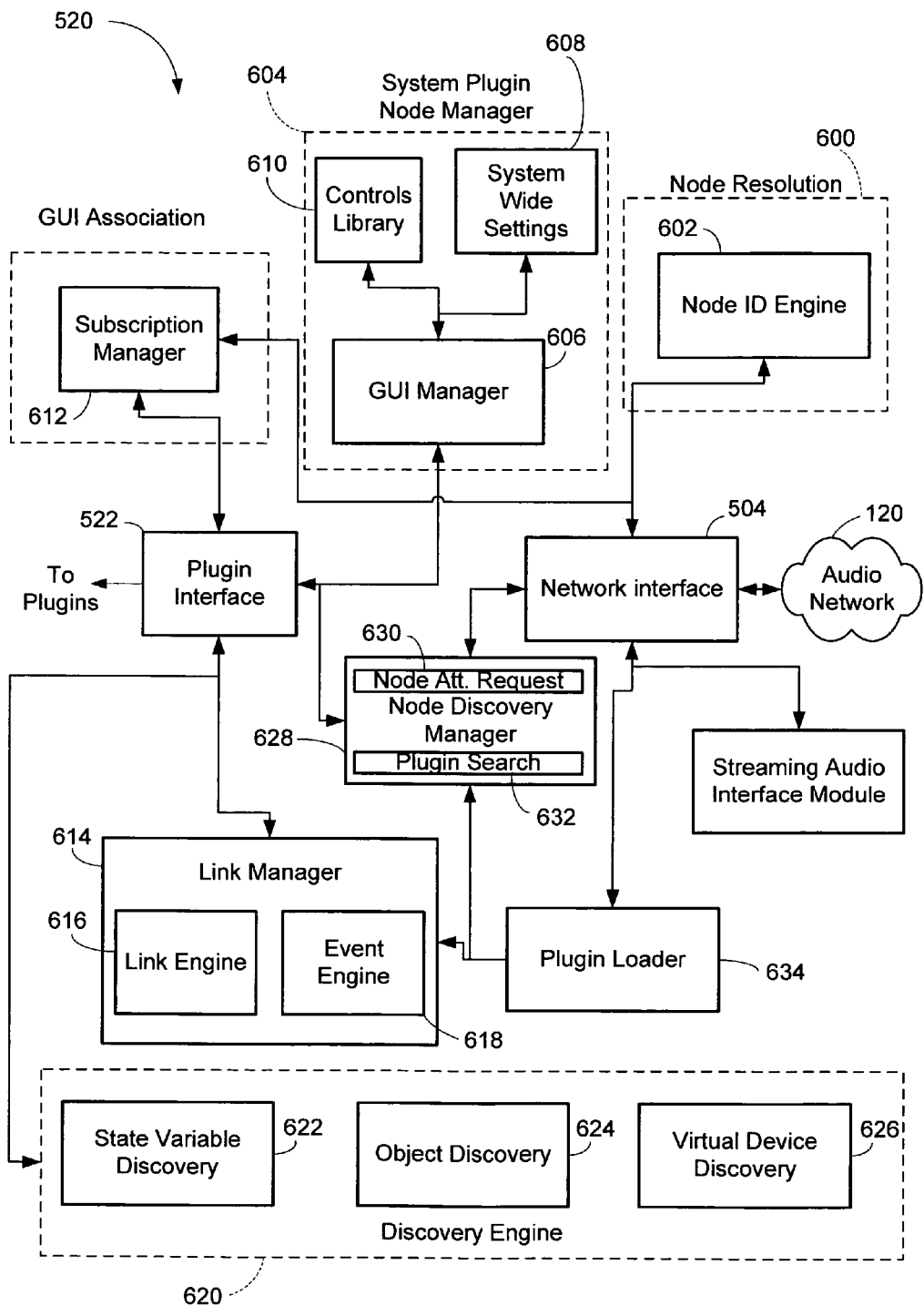
FIG. 6 is a detailed block diagram of a GUI core portion of the PEM of FIG. 5.

FIG. 6 is a block diagram of an example GUI core 520. The GUI core 520 may include a node resolution module 600. Each audio-related device connected to the PEM 500 (either directly or through a network) is a node that may be identified with a unique node identification ("ID"). The node resolution module 600 may include a node ID engine 602 for assigning a node ID or node address to each device connected to the PEM 500. When a new device is connected to the PEM 500, the node ID engine 602 may assign a node ID to the new node. A method that may be used to assign such a node ID is described later.

The GUI core 520 also may include a system plugin node manager 604. The system plugin node manager 604 may communicate with the product plugin(s) 526 and generic plugin 524 through the plugin interface 522. The system plugin node manager 604 may include a GUI manager 606, a system wide settings module 608 and a controls library 610.

Figure 27:
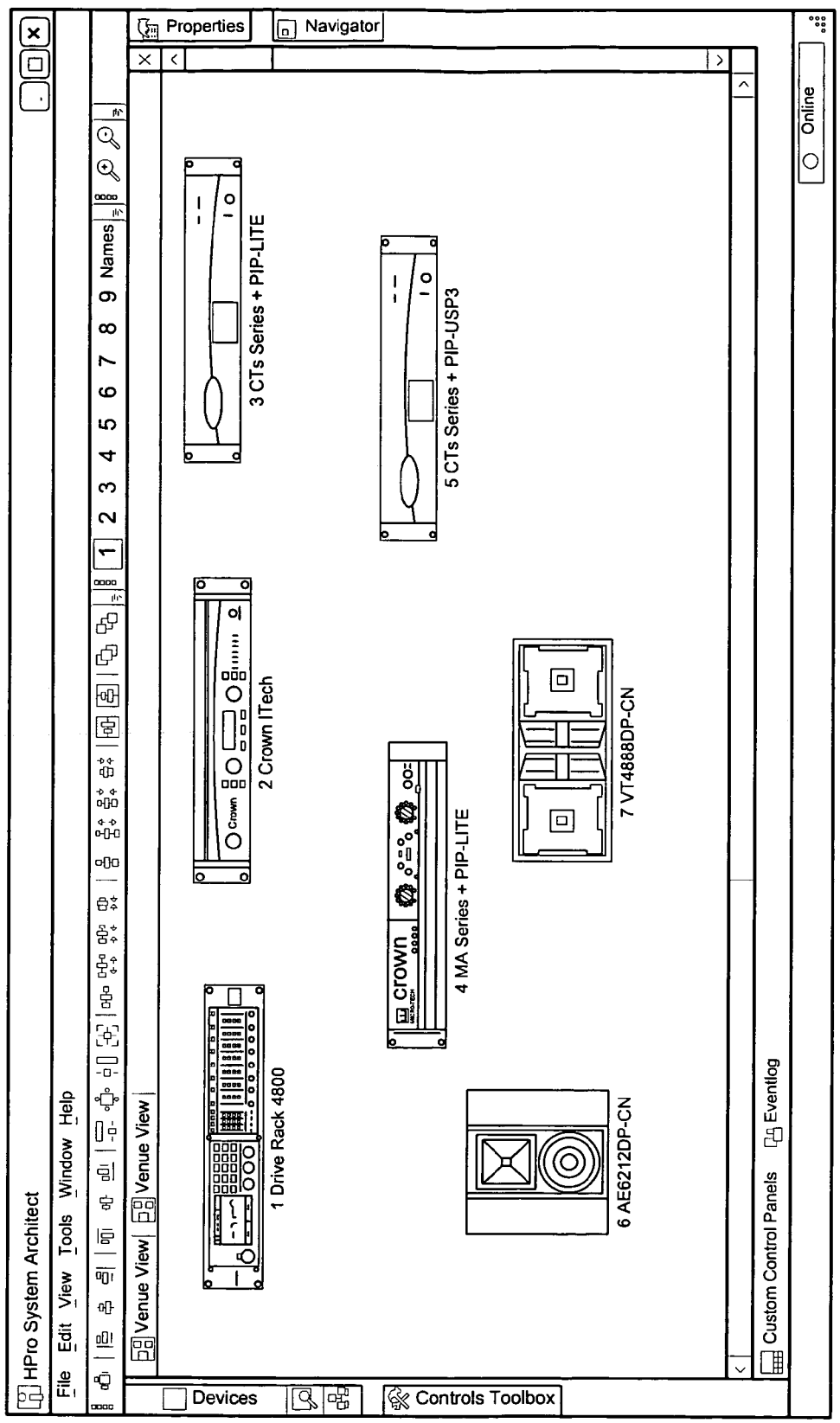
FIG. 27 is an example control panel view showing a GUI venue view of an example system.
Figure 28:
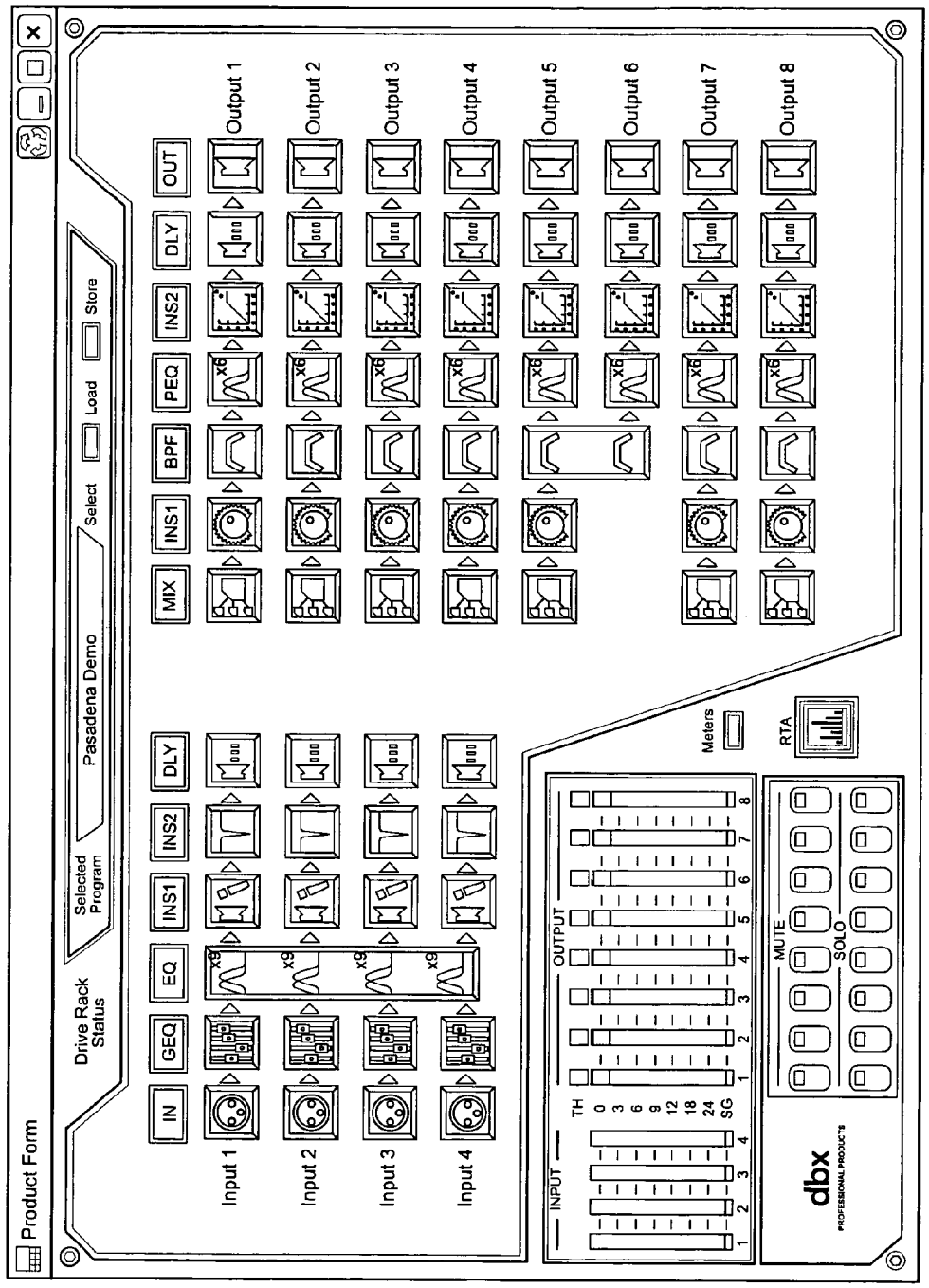
FIG. 28 is an example control panel view showing the product view of a product shown in FIG. 27.
Figure 29:
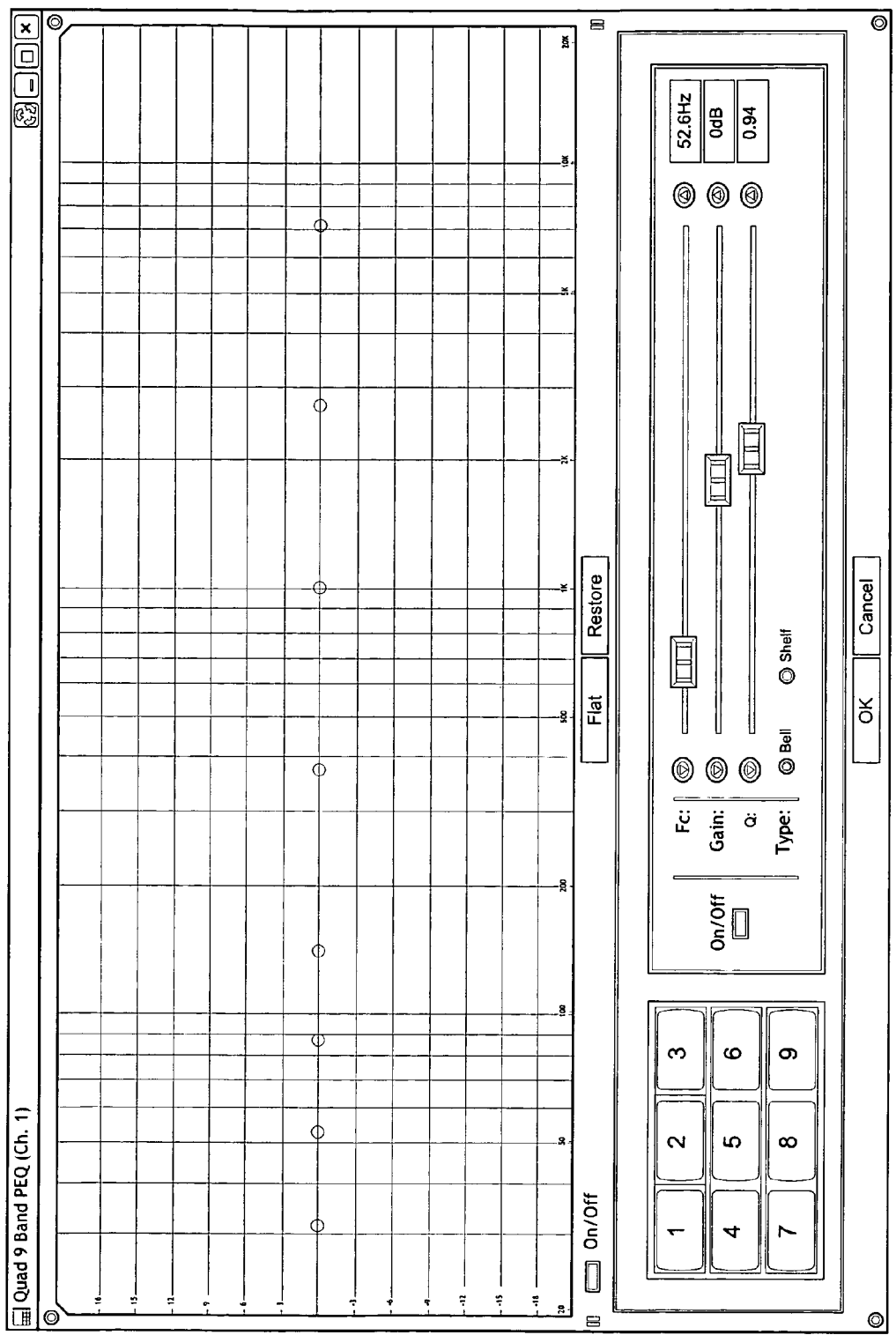
FIG. 29 is an example control panel showing a GUI product view of an exemplary system.

The GUI manager 606 may be configured to manage the mode of the control panel view GUI formats. For example, the GUI manager 606 could switch between a venue view and a product view. In the venue view, the GUI of the control panel view may allow a user to view multiple devices in an audio system at the same time. For example, the venue view may display all audio-related devices in a system, as well as the interrelationships between these devices. This mode may be setup with multiple floating windows in which each floating window displays information about a device. In the product view, the GUI of the control panel view for a single audio-related device may be displayed. In some examples, the product view may have a menu or tabs hierarchy that would allow a user to switch between various virtual devices or objects for an audio-related device. A user may be able to switch between the product view and venue view as needed. For example, the user may use the product view when using a touch screen interface, such as that found on a tablet computer, and use the venue view when using a computer with a mouse and keyboard. FIG. 27 shows a venue view for an example system while FIGS. 28 and 29 show an example product view.

The system wide settings module 608 may be configured to store the settings for all or part of an audio system for later use. These saved settings could be loaded at a later time and sent to each audio-related device to restore a saved configuration. The GUI manager 606 also may direct that all settings and control panel views be saved by each respective product plugin 526 and the generic plugin 524.

The GUI manager 606 also may be configured to provide the capability to generate custom control panel views. The custom control panel views may be configured with data variables from multiple different devices using predefined GUI aspects or generic GUI aspects from the product plugin(s) 526 and the generic plugin 524. The GUI manager 606 also may be configured with a plurality of hot buttons. The hot buttons may be mapped to specific control panel views of specific devices in the product plugin(s) 526 and the generic plugin 524, or may be mapped to a custom control panel view created by a user.

When creating a custom control panel view, specific stored, predefined GUI aspects from different product plugins may be dragged from a stored, predefined control panel view to the customized control panel view being created. For example, a slider on a stored, predefined control panel view may be clicked with a mouse and moved to the customized control panel view. In addition, within the customized control panel view, a dragged and dropped GUI aspect may be changed or "morphed" into a different GUI aspect. For example, a dragged and dropped slider may be changed to a knob, a button, a rotary encoder, a list box, etc. A changed GUI aspect also may be configured with different values. For example, in the case of a dragged and dropped slider with a range of 0-100 percent that has been changed to a button, the button can be configured with a depressed state of twenty percent and an un-depressed state of sixty percent.

The GUI manager 606 also may include a venue functionality control. The venue functionality may refer to a plurality of predetermined groups of venue settings included in the devices. The venue settings may be stored in the memory of the audio-related devices as a venue table. Each of the venue settings included in the venue table may be identified by a corresponding component of the audio node structure of the audio-related device. Accordingly, each of the venue settings may replace an existing setting present in the corresponding component when a group of venue settings is selected.

For example, a group of devices may have a group of EQ settings for a musical performance and a different group of EQ settings for a theatrical performance. In another example, some audio-related devices may be disabled in certain venues and enabled in other venues. The GUI manager 606 may include functionality that provides for selection of one of the groups of venue settings from the venue table. Upon selection of one of the groups of venue settings by a user, a set venue message that includes a venue setting group identifier may be sent by the PEM to all of the audio-related devices. Those audio-related devices with groups of venue settings that correspond to venue setting group can switch to operation with the group of venue settings indicated in the set venue message. Those audio-related devices that do not have such a group of venue settings can ignore the set venue message and/or become disabled.

A controls library 610 also may be provided in the GUI core 520. The controls library 610 may include a set of GUI control panel views and/or GUI aspects that can be associated with user defined SVs. For example, a user could pull a GUI aspect representative of a slider bar from the controls library 610 and associate the slider bar with several SVs of different audio-related devices in the audio system. Consequently, the user could use the custom slider bar as a "master controller" to simultaneously control several sliders (or other controls) on a GUI control panel view. In addition, the user may drill down into the master controller GUI using the GUI control panel view to adjust the offsets of the data variables being adjusted with the master slider.

The GUI core 520 also may include a subscription manager 612, which can manage the updating and notification of changing data in the control panel views and/or devices. For example, a GUI control panel view may contain a slider with an associated SV value. If the user moves the slider (and therefore changes the actual value of the SV associated with the slider) in the GUI control panel view, the subscription manager 612 can manage the subscription. For example, the subscription manager 612 may verify that data is sent in the appropriate format to the corresponding audio-related device(s) that have previously subscribed to the corresponding SV.

The GUI core 520 also may include a link manager 614 that keeps track of which GUI controls are visible to the user on a particular control panel view and which SV values are associated with the GUI controls. The link manager 614 may include a link engine 616 and an event engine 618. The event engine 618 may be notified of changes to actual values of any SVs in the control panel view or corresponding audio-related device. When changes to SVs in the control panel view occur, the link engine 616 may notify any control panel views and/or audio-related devices that are associated with the changed SV. In response to the notification, the control panel views may request the updated actual value of the SV from the control panel view in the corresponding product plugin 526 or the generic plugin 524 instead of from the audio-related device. Accordingly, network traffic to and from the audio-related device may be minimized since the various control panel views are updated with data that is in the PEM 500.

Similarly, when an SV changes at the audio-related device, the device may be subscribed to only one control panel view. Accordingly, when the one control panel view is updated by a message from the device, the event engine 618 may notify all the corresponding control panel views that display the changed actual value of the SV. In response, the corresponding control panel views request the updated actual value of the SV from the updated control panel view instead of the device. For example, each audio-related device may include a configuration state. The configuration state may be a single number that represents which SV(s) in the audio-related device have been changed. The configuration state may be useful for determining whether significant changes have been made to a device from another GUI control panel view, as well as other diagnostic and maintenance related activities.

Discovery Engine

The GUI core 520 also may include a discovery engine 620 that may communicate with product plugin(s) 526 or the generic plugin 524. The discovery engine 620 may be initiated by the product plugin(s) 526 or the generic plugin 524 when one or more components in the audio node structure of an audio-related device are unknown. An unknown component in the audio node structure of an audio-related device can be a virtual device, object or SV that does not include a corresponding stored, predefined GUI control panel view and/or GUI aspect. In other words, the component is not predefined within the audio system.

When enabled, the discovery engine 620 may query audio-related devices about their audio node structure. The discovery engine 620 may include a SV discovery module 622, an object discovery module 624 and a virtual device discovery module 626 for determining the SV and/or associated attributes, the objects and/or associated attributes and the virtual devices and/or associated attributes of a device, respectively.

For audio-related devices that have static audio node structure configurations discovery with the discovery engine 620 may not be necessary since the audio node structure of such devices may already be known by the product plugins. In these situations, queries for the current SV actual values may be all that is required. If, however, any portion of the audio node structure of an audio-related device is not known, discovery with the discovery engine 620 may be implemented. In addition, some audio-related devices include configurable virtual devices. Configurable virtual devices may be configured by a user with different configurations of objects and/or SVs. Accordingly, the audio node structure is configurable and the objects and SVs within such a configurable virtual device may need to be discovered with the discovery engine 620.

An example of a static audio node structure that is unknown may arise as a compatibility issue. For example, consider a tour sound provider that receives a new audio-related device for a touring audio system while out on the road. The new audio-related device received by the tour sound provider has a new firmware revision that provides additional functionality and/or capability not present in an existing audio-related device that will be replaced by the new audio-related device. If the tour sound operator does not update the product plugin by loading the new components of the audio node structure and corresponding GUI control panel views and/or GUI aspects that came with the new audio-related device, access to the new features may not be possible. Or, even worse, the tour sound operator may not be able to control the existing features. The discovery engine 620 may overcome such issues by providing mechanisms to discover the audio node structure of the new device and to provide information that allows default editors to be built to view, control and edit all of the features of the new device.

The discovery engine 620 may use a "get" methodology for discovery of the components within the audio node structure of an audio-related device. The audio-related device may respond with an "Info return" message to provide information related to the audio node structure. When an unknown virtual device, object, or SV is encountered in an audio-related device, the discovery engine 620 may be deployed to query the audio-related device for the detailed attributes. This type of discovery may be referred to as unknown discovery. When enabled, the discovery engine 620 may discover the entire audio node structure of an audio-related device, or a portion of the audio node structure of an audio-related device. In addition, the discovery engine 620 may be enabled to discover specified components in the audio node structure, namely one or more specified virtual devices, objects or SVs.

Once an audio-related device has been addressed and becomes available on the audio network, audio node structure queries may be used. Audio node structure queries may be used to determine the audio node structure of any audio-related device. The audio node structure queries may use predefined request messages that enable a call and a response. As a result of the queries of an audio-related device each virtual device, object and SV representative of the functionality of the audio-related device may be obtained.

Whenever an unknown component of the audio node structure is identified, the discovery engine 620 may be enabled to discover more detailed attribute information of the unknown component, and to ascertain what the entire audio node structure is, or what the unknown component represents. Accordingly, a call and response functionality provided by the audio node structure queries and/or a discovery functionality provided by the discovery engine 620 may be used to ascertain all of the components of an audio node structure and/or the detailed attributes of components within the audio node structure.

When the discovery engine 620 is enabled to determine the entire audio node structure, an entire audio node structure query request may be communicated in a single message to the discovery engine 620. The discovery engine 620 may then communicate with the audio-related device of interest using a series of the audio node structure queries. The responses to the calls may be collected and temporarily stored, or the responses may simply be forwarded to the plugin 523. When the responses are collected, the discovery engine 620 may assemble the entire audio node structure of the audio-related device of interest based on the attributes included with the virtual devices, objects and/or SVs provided in the responses. The entire audio node structure may then be provided in a single message to the plugin 523.

Alternatively, the discovery engine 620 may be enabled to obtain more detailed information related to components encountered in the audio node structure that are unknown. In this scenario, a virtual device, object or SV may be identified to the discovery engine 620 as unknown. The discovery engine 620 may then communicate with the audio-related device of interest using one or more component specific audio node structure queries. The responses to the queries may include the detailed attributes of the unknown component. The detailed attributes may be used to assemble or define the component of interest, and provide the now defined unknown component in a single message. Alternatively, the detailed attributes may be obtained and provided to the plugin 523 without further processing by the discovery engine 620.

Initial communications with an audio-related device to determine the audio node structure may be performed with one of the plugins 523. To obtain the audio node structure of an audio-related device, the audio-related device may first be queried by one of the plugins 523 for a list of virtual devices on that node. A predetermined message, such as the message GetVDList may be sent to the node manager virtual device of the audio-related device. The node manager may reply with a list of the virtual devices on that node including itself. Once the virtual devices have been identified, it is determined by the plugin 523 if all of the virtual devices are known. If any virtual devices are unknown, the plugin 523 may enable the discovery engine 620 to determine the entire audio node structure, or the unknown virtual devices. Alternatively, the plugin 523 may determine the audio node structure. In another alternative, the discovery engine may perform all communication with an audio-related device, pass received information to the plugins 523 and perform additional communication with the audio-related device at the direction of the plugins 523.

If one or more of the virtual devices on a node are unknown, each of the listed unknown virtual devices may be queried using audio node structure queries to determine the SVs and objects included in the unknown virtual device. To obtain the virtual device level SVs, a predetermined get SVs message addressed to the virtual device, such as a GetSVList message may be used to query for a list of the SV classes used in the virtual device. The get SVs message may return a list that includes the class ID for each SV on the virtual device. To determine the objects in a virtual device, a predetermined get objects message addressed to the virtual device, such as a GetObjectList message may be used. A list of the objects included in the virtual device may be returned in response to the get objects message. The audio node structured queries may be initiated by the discovery engine or the plugin. Alternatively, instead of lists, the virtual devices, objects and SVs may be queried individually.

Finally, the actual values of the SVs included in the virtual device may be obtained. The actual values may be obtained with a predefined get actual values message query such as a MultiSVGet message. In response to the get actual values message, the actual values of the SVs included in the virtual device may be returned. Alternatively, the SVs may be subscribed to. Subscribed SVs are automatically provided whenever the actual value is updated.

The previous discussion assumes the existence of a configurable (or dynamic) virtual device or a static virtual device that is unknown and/or includes unknown components. In the case of a static virtual device where the audio node structure is known, no further queries may be necessary beyond a query for the virtual devices since the objects and SVs are known.

Thus, the plugin or the discovery engine 620 may not need to send the get SVs message (GetSVList) or the get objects message (GetObjectList).

If the object class identified in a received list of objects is known, then only queries for the actual SV values may be necessary using one of the two methods described above. For each object in a virtual device that is unknown, a list of sub-objects and SVs may be requested using the get SVs message and/or the get objects message. The other action that may need to be performed on unknown objects is to discover the dynamic attributes of all the SVs in the object. Dynamic attributes may be set by the object itself. The mechanism to obtain the dynamic attributes of such an object may be with a predefined get dynamic attributes message, such as SVGetDynAttributes.

Where an unknown SV is identified, a predefined get static attributes message such as, SVGetStaticAttributes, may be transmitted to the object or virtual device containing the unknown SV. The static attributes provided in response may be used to define the unknown SV.

Alternatively, a more efficient discovery mechanism for virtual devices also may be used. A predefined set of audio-related device node structure query messages may be transmitted to an audio-related device. The predefined set of query messages may request the audio node structure in a condensed format. In response, each virtual device may provide replies that fully describe the functionality of the audio-related device. The functionality may be fully described by, for example, registered class IDs of object and SV members within the virtual device that are predefined. If any of these audio-related device node structure query messages return classes of objects or SVs that are unknown, more detailed discovery of that component as previously described may be performed.

An example of discovery of an audio-related device that is a zone controller will now be described. A zone controller is a simple wall controller that may provide an audio source select and a gain control for a single zone within an installed audio system. The functionality of a zone controller may be modeled as a user interface object with no audio capabilities. The zone controller may be configured to have two subscriptions to a router object that performs the gain and source selection functions. Processing may be handled with a separate processing object on a different node.

Modeled as a stand alone node with a non-configurable virtual device, the zone controller can be viewed as follows. A gain SV such as a SVClassGain SV, may be linked to a gain SV in an audio processing object. A source selection SV such as SVClassCMInput, may be linked to a routing SV in an audio processor object. A get message, such as GetVDList (info), may be used to describe the virtual device(s) in a zone controller class. With this information, it is known that this node has no configurable members. The virtual device has no user interface other than a mechanical pot to control selection, and two momentary switches to control the volume (a control surface). A describe message, such as DescibeVD, that is addressed to the zone controller object may return the instance attributes, actual values of the SV and subscriptions of the zone controller virtual device.

Upon receiving the queried data from a device, the discovery engine 620 may communicate information to the product plugin(s) 526 or the generic plugin 524 through the plugin interface 522. The information may be used by the product plugin(s) 526 or the generic plugin 524 to determine the control panel view and/or the GUI aspect to be selected or created for the corresponding device.

The product plugins 526 or the generic plugin 524 also may enable the discovery engine 620 to assist in determination of an unknown control panel view and/or GUI aspect. An unknown control panel view or GUI aspect is one that is not available from any of the product plugin(s) 526 or the generic plugin 524 to represent some or all of the audio node structure of an audio-related device. For example, when the product plugin(s) 526 or the generic plugin 524 do not have sufficient information included in the audio node structure obtained from the audio-related device to create a GUI aspect for one or more components of the audio node structure, the discovery engine 620 may be enabled to obtain additional details.

Node Discovery Manager

The GUI core 520 also may include a node discovery manager 628. The node discovery manager 628 includes a node attribute request engine 630 and a plugin search engine 632. The node attribute request engine 630 may query a device about its node class attributes. The class attributes may be indicative of the functionality of the audio-related device. In addition, the class attributes may provide information to match the audio-related device to a corresponding product plugin 526. For example, the class attributes may describe the type of audio-related device, such as an amplifier, the family of audio products, such as a model and/or a product identifier, such as a model number or product name.

The node discovery manager 628 may use the class attributes to query the product plugins 526 with a broadcast message to determine if any of the product plugins 526 have a class that includes the device. In other words, to determine if any of the product plugins 526 are associated with the device and, therefore, have predefined control panel view(s) for the device. The class attributes broadcast in the query may be compared to class attributes stored in the product plugins 526. The Node Discovery Manager 628 may enable the launch of a product plugin 526 and creation of a communication node with the plugin interface 522 when one of the product plugins 526 recognizes the class attributes and indicates an association with the audio-related device.

The plugin Search Engine 632 may be enabled when a plugin 523 does not include a component of the audio node structure of an audio-related device. The plugin Search Engine 632 may be enabled to query other plugins 523 for unknown components included in the audio node structure. In addition, the plugin Search Engine 632 may be enabled to query other plugins 523 for GUI aspects. The query for GUI aspects may be enabled when a product plugin 526 does not include all of the GUI components in a predefined control panel view that are needed to support a audio node structure of an audio-related device. The plugin Search Engine 632 also may enable the discovery engine 620 when the other plugins 523 do not include information on the unknown components or the GUI aspects included in a respective query.

The GUI core 520 also may include a plugin Loader 634. The plugin Loader 634 may maintain a running list of all the product plugins 526 currently available to the GUI core 520. Accordingly, the GUI core 520 may query and/or initiate the launch of a product plugin 526 through communication with the plugin interface 522 based on the list maintained by the plugin loader 634.

Plugin Interface

Figure 7:
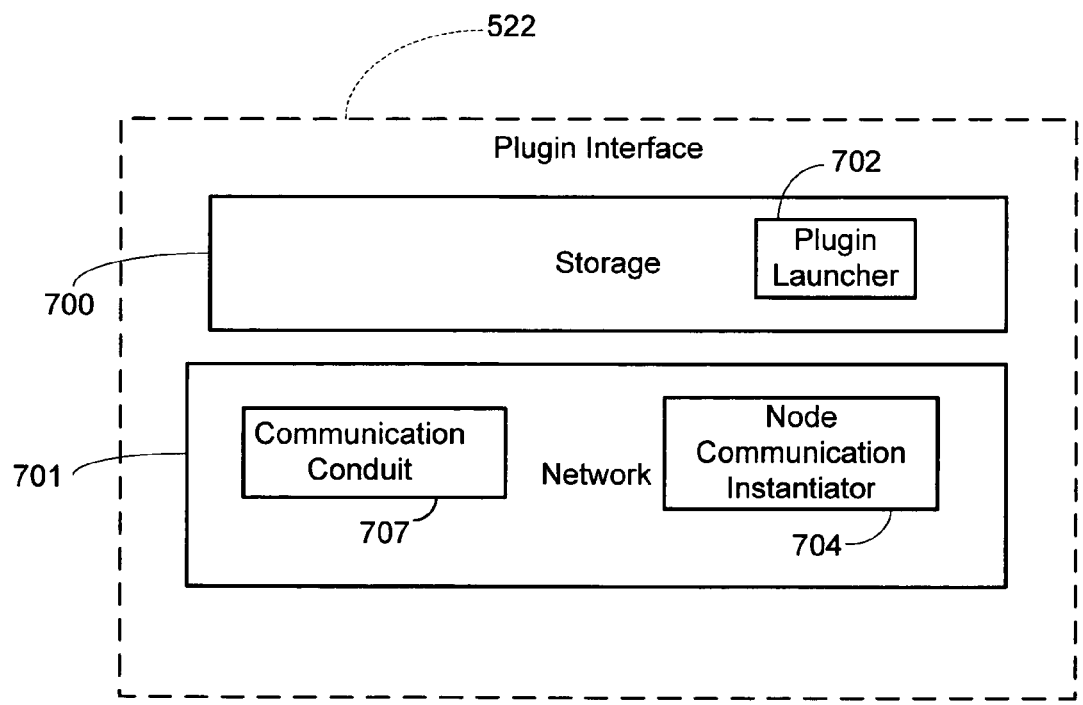
FIG. 7 is a block diagram of an interface module portion of the PEM of FIG. 5.

FIG. 7 is a block diagram of a plugin interface 522 which may be used in the system. The plugin interface 522 includes a storage module 700 and a network module 701. The network module 701 may provide a communication conduit 702 which would serve as a communication interface between the GUI core 520 and a product plugin 526 and/or the generic plugin 524. The storage module 700 includes a plugin launcher 702 for launching a product plugin 526 or the generic plugin 524. Additionally, the network module 701 may include a node communication instantiator 704 to setup communications between an audio-related device identified with the GUI core 520 as associated with a product plugin 526 or the generic plugin 524. Respective communication with the audio-related device and the plugin 523 may be separate and independent so that the plugin 521 may not need to include knowledge of the communication path to the audio-related device. Such knowledge may include, communication protocols that may be used with the audio-related device, the ID of the audio-related device, etc. In this manner, the plugin interface 522 may shield the product plugin 526 or generic plugin 524 from the audio network 120 by opening a communication conduit to the device (through the GUI core 520). Accordingly, the product plugin 526 or the generic plugin 524 may communicate over the audio network 120 with an audio-related device without knowledge of the audio network 120.

Product Plugin

Figure 8:
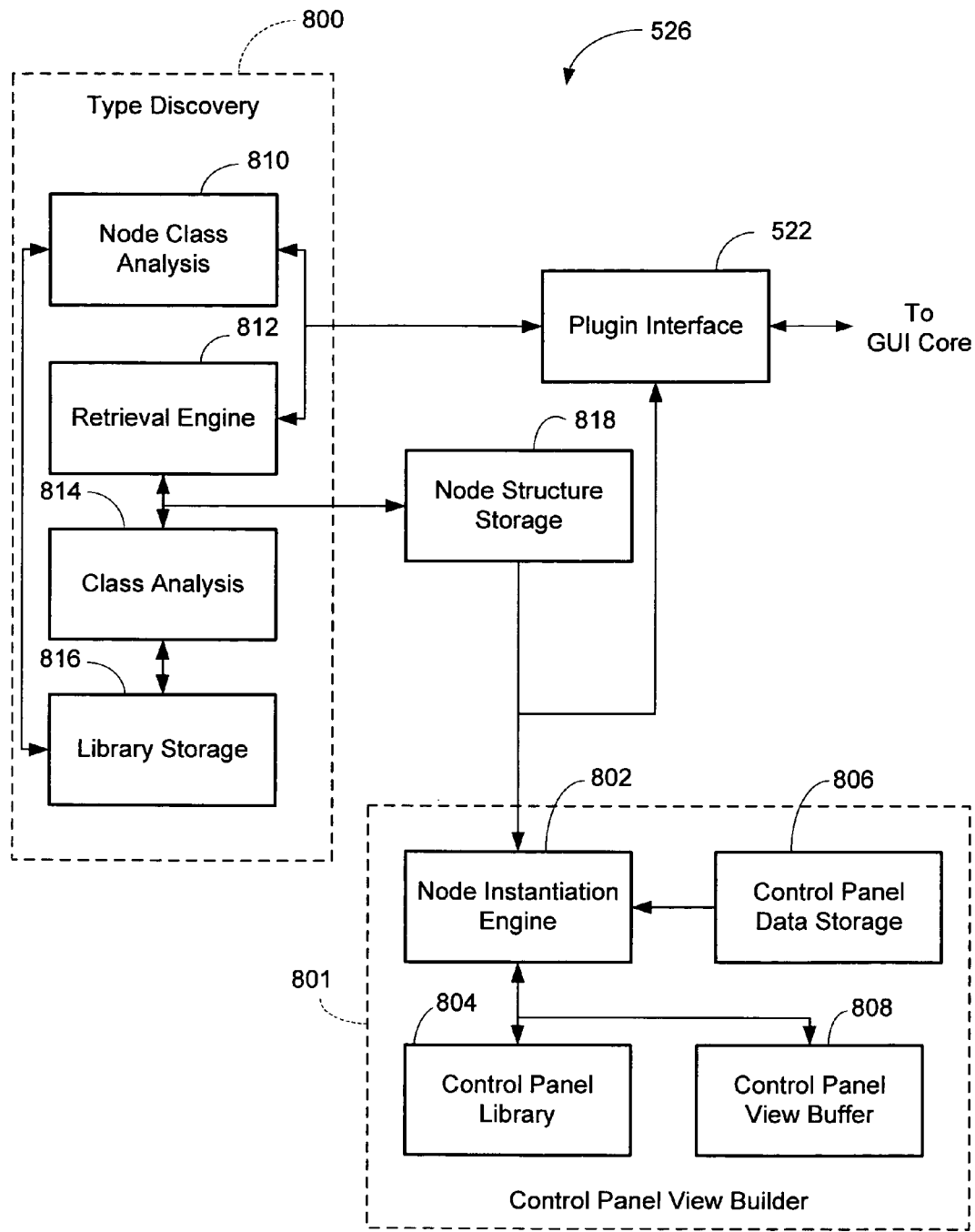
FIG. 8 is a block diagram of a product plugin portion of the PEM of FIG. 5.

FIG. 8 is a block diagram of a product plugin 526 that may be used in the system. The system may include multiple product plugins that may be associated with audio-related devices included in the audio system. The product plugin 526 may be supportive of one or more associated audio-related devices. For example, audio-related devices with similar model numbers, functionality and/or manufacturer may be associated with the same product plugin 526. In general, the product plugin 526 may include stored, predefined audio-related device specific information that may be used to represent the functionality and control capability of the associated audio-related device(s). Such information may include stored, predefined GUI control panel views, stored, predefined GUI aspects, class identification information of the associated audio-related devices, stored, predefined node structures of audio-related devices, stored portions of predefined node structures, etc.

The product plugin 526 may include a type discovery module 800 and a control panel view builder 801. The control panel view builder 801 may include a node instantiation engine 802, a control panel library 804, a control panel data storage 806 and a control panel view buffer 808. The type discovery module 800 may include a node class analysis 810 that communicates through the plugin interface 522 with the GUI core 520. The node class analysis 810 receives broadcast class information from the node attribute request engine 630 via the plugin interface 522. The class information includes class attributes such as an object class ID and a product name that were pre-assigned to the audio-related device. The class information may be provided by an audio-related device in response to a class attribute query. The class attributes may be any symbols, words, numerals or some combination thereof that are indicative of the nature and type of audio-related device.

The class attributes may be broadcast in a node query to the product plugins 526 by the node discovery manager 628. Alternatively, each of the product plugins 526 may be sent a node query individually. The node query that includes the class attributes may be used to determine whether one of the product plugins 526 correspond to the class attributes of the device. Class attributes that are stored in a library storage module 816 may be compared with the class attributes included in the query. For example, the library storage module 816 may include a product dynamic link library ("DLL"). The DLL may include a public product DLL description ("PDD") class with static members that include the object class ID and product name of each audio-related device associated with the product plugin 526. Once the class attribute information is compared, the node class analysis 810 may send a message to the GUI core 520 indicating whether the product plugin 526 is associated with the corresponding class attributes of the audio-related device.

If the product plugin 526 corresponds to the class attributes of the device, a communication conduit may be set up through the plugin interface 522. Using the plugin interface 522, a retrieval engine 812 may be used to obtain the audio node structure from the audio-related device. The audio node structure may be representative of the functionality of an audio-related device, and may include SVs, objects and/or virtual devices. A class analysis 814 may then traverse through the audio node structure to perform a comparison with the library storage 816. The library storage 816 may include one or more predefined audio node structures and/or audio node structure components for each of the audio-related devices associated with the product plugin 526. The audio node structure(s) and/or audio node structure component(s) may include virtual devices, objects and/or SVs in a configuration that is indicative of the functionality of each of the audio-related devices supported by the product plugin 526.

In one example, the product plugin 526 may query the audio-related device for a list of the virtual devices included in the audio-related device. Alternatively, the node discovery manager 628 may receive the list of virtual devices as part of the class attributes. In another example, the product plugin 526 may query for each of the virtual devices, objects and/or SVs included in the audio-related device.

If the virtual device(s), object(s) and/or SV(s) are known, a representation of that portion of the audio node structure and an indication that the portion of the audio node structure is known may be stored in a node structure storage 818. For example, the representation may be a list of virtual devices and indication of the virtual devices that are known. In another example, the known portions of the audio node structure and the attributes included with the known portions of the audio node structure may be stored in the node structure storage 818. If any portion of the audio node structure received from the audio-related device is not found to correspond with the predefined virtual devices, objects and SVs included in the audio node structure or audio node structure components included in the library storage 816, the plugin search engine 632 may be enabled by the retrieval engine 812 to query the other product plugin(s) 526 and the generic plugin 524 for the unknown components of the audio node structure. Alternatively, the product plugin 424 may perform such queries.

If the unknown components are present in another plugin 523, the unknown components may be retrieved, stored in the library storage 816 and used to fully define the audio node structure. The corresponding components of the audio node structure may then be stored in the node structure storage. If the unknown components are not available from any of the product plugin(s) 526 and the generic plugin 524, the discovery engine 620 may be initiated to either determine the entire audio node structure of the audio-related device, or determine the unknown components of the audio-related device as previously discussed. The audio node structure and/or components determined by the discovery engine 620 may be associated with the audio node structure of the audio-related device and stored in the library storage 816. The detailed attributes obtained by the discovery engine 620 for the unknown portions of the audio node structure also may be stored in the node structure storage 818.

Since the discovery engine 620 may be enabled by any one of a plurality of product plugins 526 and/or the generic plugin 524, this may be advantageous. Namely, each of the product plugins 526 and the generic plugin 524 do not need to store and execute instructions to operate the discovery engine 620. In addition, changes and updates to the instructions within the discovery engine 620 may be made once.

Once the entire audio node structure of an audio-related device has been determined, and indication stored in the node structure storage 818, the node instantiation engine 802 may utilize the audio node structure stored in the node structure storage 818 to identify one or more control panel views. The control panel views may be identified based on the components of the audio node structure and/or the attributes included with the components of the audio node structure. For example, a stored, predefined control panel view may be associated with one or more specifically identified virtual devices.

The node instantiation engine 802 may access the control panel library 804 and obtain one or more GUI control panel views that correspond to the components of the audio node structure. The control panel library 804 may store predefined GUI control panel views and/or predefined GUI aspects that are capable of being displayed in a display. The corresponding GUI control panel views may be configured by the node instantiation engine 802 and stored for instantiation. The GUI control panel views may be instantiated and displayed by the node instantiation engine 802 when requested by a user to allow monitoring, control and manipulation of the functionality of the audio-related device.

The node instantiation engine 802 also may setup subscribe messaging for each SV in the control panel view(s). In addition, the node instantiation engine 802 may communicate with the link manager 614 regarding the control panel view(s) and associated SVs. The control panel data storage 806 may be used to store the actual values of the SV(s) included in the GUI control panel view(s) that are instantiated by the node instantiation engine 802. The actual values of the SV(s) may be retrieved from the audio-related device with the retrieval engine 812 and provided to the node instantiation engine 802 for storage in the control panel data storage 806. The control panel data storage 806 also may store all settings and control panel views when directed by the GUI manager 606, as previously discussed.

A control panel view buffer 808 also may be provided to buffer data related to the GUI control panel view(s). The control panel view buffer 808 may buffer control panel views and related data while the node instantiation engine 802 is preparing the GUI control panel view(s) for instantiation and display. In addition, multiple GUI control panel views may be prepared and stored in the control panel view buffer 808. Accordingly, as a user requests various GUI control panel views, the view may be extracted from the set of control panel views buffered in the control panel view buffer 808. The extracted GUI control panel view may be instantiated on a display with the actual values of the SVs that are stored in the control panel data storage 806. While the actual values are stored in the control panel view buffer 808 and/or instantiated in a GUI control panel view, the actual values may be updated. This may occur with a get command or by subscription.

The number of control panel views that are formed and stored in the control panel view buffer 808 may be based on the capability of the PEM. Where the PEM is a "fat" PEM, GUI control panel views for the entire audio node structure may be developed and stored. Alternatively, where the PEM is a "thin" PEM, fewer, or only one control panel view may be developed and stored at any given time.

When one or more GUI control panel view(s) selected by the node instantiation engine 802 do not support the entire audio node structure of the audio-related device, the node instantiation engine 802 or the discovery engine may check the control panel library 804 for one or more stored, predefined GUI aspects that are capable of supporting the unsupported components of the audio node structure. In addition, other product plugin(s) 526 may be checked for one or more store predefined GUI aspects capable of representing the unsupported portion of the audio node structure. An unsupported portion of the audio node structure may be, for example, some of the objects and/or SVs contained within an otherwise supported virtual device.

Determination of a GUI aspect(s) capable of representing the audio node structure may be based on the attributes included in the audio node structure. For example, attributes of a component of the audio node structure may describe a control GUI aspect that needs a variable control from zero to one hundred percent, or may specifically indicate that a slider is needed to represent the functionality of the control GUI aspect. In another example, an attribute of a node structure component may describe an indicator GUI aspect that needs a variable indicator from zero to one hundred percent, or may specifically indicate that a numeric display is needed to represent the indicator GUI aspect.

If the missing GUI aspect(s) that meet the qualifications described in the attribute(s) of the audio node structure are predefined and stored in the control panel library 804 or another product plugin 526, the stored, predefined GUI aspect(s) may be retrieved and integrated into the predefined GUI control panel view. Integration of the GUI aspect(s) may include placement, size adjustment, color adjustment, interrelation of the GUI aspect with existing GUI components in the stored, predefined GUI control panel view and/or any other manipulation and/or configuration identified by the attributes of the corresponding audio node structure. Following incorporation of the GUI aspect, the node instantiation engine 802 may store the GUI control panel view that includes the integrated GUI aspect as a new predefined GUI control panel view in association with the audio node structure of the audio-related device. The new predefined GUI control panel view may be stored in the control panel library 804. The GUI control panel view that includes the integrated GUI aspect may be stored and instantiated together on a display.

If the missing GUI aspects are not available from any of the product plugin(s) 526, the generic plugin 524 may be enabled. The generic plugin 524 may be enabled to construct a one or more generic GUI control panels, such as a default panel (editor) to support the audio node structure. The generic GUI control panel(s) constructed by the generic plugin 524 may be provided to the node instantiation engine 802. The node instantiation engine 802 may use the generic GUI control panel(s) to display the functionality of the audio-related device. Alternatively, the generic plugin 524 may be enabled by the product plugin 526 to generate generic GUI aspects to represent the functionality of the components of the audio node structure not associated with stored, predefined GUI aspects. Any GUI aspects generated and/or identified using the discovery engine 620 may be also used by the node instantiation engine 802 to fill in missing portions of the predefined control panel views. The node instantiation engine 802 also may interrelate the generated GUI aspect with the existing GUI components of a predefined control panel view based on the attributes of the audio node structure.

The node instantiation engine 802 also may take into consideration the computing power capability of the device providing display of the instantiated GUI control panel views or enablement of the control surfaces. Based on the capability of the device, the node instantiation engine 802 may simplify, enhance, eliminate, or embellish a stored, predefined GUI control panel view or stored, predefined GUI aspect. For example, where the display is small, with limited display capability, such as low resolution or limited "real estate" for display, selected GUI component(s) included in a stored, predefined GUI control panel view may be changed to simpler GUI component(s), combined with other GUI components, or eliminated completely. In another example, where the display is relatively large and includes high resolution display capabilities, a store predefined GUI control panel view may be changed to include more complex GUI components, such as with more graphical details, automation, etc. Consideration of the computing power capability of the device providing display of the GUI control panel view(s) also may effect the integration of stored, predefined GUI aspects and/or GUI aspects.

Changes to a stored, predefined control panel view configured to enable a control surface also may be made to conform with the hardware of a control surface. For example, a stored, predefined control panel view that includes functionality to drive an analog meter in a control surface may be changed to functionality to drive a numeric digital display when the hardware in the control panel, as described by attributes in the audio node structure, dictates.

Generic Plugin

Figure 9:
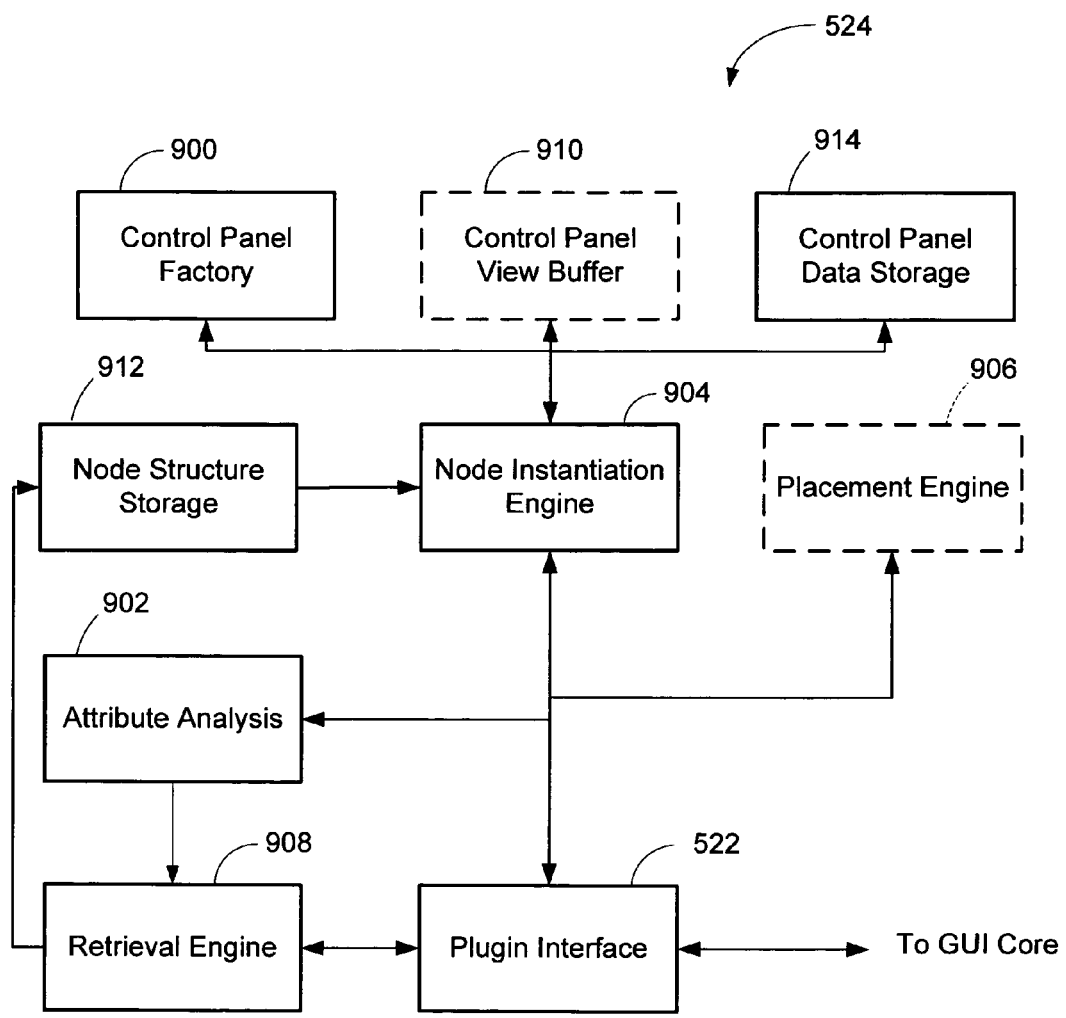
FIG. 9 is a block diagram of a generic plugin portion of the PEM of FIG. 5.

FIG. 9 is a block diagram of a generic plugin 524. The generic plugin 524 may be enabled in the event that the class attributes of the device are not recognized by any of the product plugins 526 presently listed in the plugin loader 634. When enabled, the generic plugin 524 may determine the audio node structure of an audio-related device. The audio node structure may be determined by the discovery engine 620 as previously discussed. In addition, the generic plugin 524 may be enabled to create one or more generic GUI control panel views when the audio node structure is not completely supported by stored, predefined GUI control panel views stored in the product plugins 526.

When none of the product plugins 526 support the class attributes of an audio-related device, the generic plugin 524 may be enabled by the GUI core 520 via the plugin interface 522 to dynamically create one, or a set of "generic" control panel views based upon the audio node structure provided by the device. Alternatively, when one of the product plugins 526 that supports the class attributes of an audio-related device does not have a predefined control panel corresponding to one or more components in the audio node structure of the device, the generic plugin 524 may be enabled by the product plugin 526 to dynamically create one or more "generic" control panel views based upon the audio node structure provided by the device. In addition, the generic plugin 524 may similarly be enabled to generate a generic GUI aspect when a stored, predefined GUI aspect does not exist for one or more components in an audio node structure. The generic plugin 524 may include a Control Panel Factory 900, an attribute Analysis 902, a node instantiation engine 904, a placement engine 906, a retrieval engine 908, a control panel view buffer 910, a node structure storage 912, and a control panel data storage 914.

The GUI core 520 (FIGS. 5 and 6) may be enabled to communicate with the audio-related device and/or the product plugins 526 to obtain the audio node structure of an audio-related device. Alternatively, the retrieval engine 808 may obtain the audio node structure and/or attributes of the audio-related device. Once obtained, the audio node structure and/or attributes of the audio node structure of the audio-related device may be stored in the node structure storage 912, as previously discussed. In addition, the actual values of the obtained SVs may be stored in the control panel data storage 914, as previously discussed.

The attribute analysis 902 may review the attributes associated with the stored audio node structure of the audio-related device. Based upon analysis of the attributes of the audio node structure, the node instantiation engine 904 may initiate the control panel factory 900 to generate one or a set of generic GUI control panel views and/or generic GUI aspects. The GUI components in the generic GUI control panel view(s) or the generic GUI aspects may be determined based on the attributes included in the stored audio node structure.

The node instantiation engine 904 may enable the plugin search engine 632 (FIG. 6) to search the product plugin(s) 526 for stored, predefined GUI aspects described by the attributes to integrate into the generic GUI control panel view(s). Alternatively, the node instantiation engine 904 may search and obtain stored, predefined GUI aspects from the product plugins 526. Thus, the one or more generic control panel views may include predefined GUI aspects and generated "generic" GUI aspects.

If insufficient attributes are available in the audio node structure received from the audio-related device to generate all or a portion of the generic GUI control panel view(s), the discovery engine 620 may be enabled to obtain and provide additional information from the device. Such additional information may include additional information about the audio node structure. For example, retrieval of objects and/or SVs may be obtained from an audio-related device that had previously supplied only the virtual devices included in the audio node structure. In addition, information obtained may include detailed attributes of the components of the audio node structure, such as sizes, colors, shapes, wiring, interrelationships with other components in the audio node structure, functionality details, relational placement, etc.

The node instantiation engine 904 may instantiate the completed generic GUI control panel view or a generic GUI aspect for display. In addition, actual values of the SVs may be retrieved from the control panel data storage 914 and included in the generic GUI control panel view or a generic GUI aspect. Alternatively, a generic GUI aspect may be provided to the product plugins to complete a stored, predefined GUI control panel view. The generic GUI control panel view(s) or generic GUI aspects also may be stored in association with the audio-related device for later retrieval. Storage of the generic control panel views or generic GUI aspects may be in the control panel data storage 914.

The node instantiation engine 904 also may setup subscribe messaging for each SV in the generic GUI control panel view and communicate with the link manager 614 regarding the generic control panel view and associated SVs. The generic plugin 524 also may optionally include a placement engine 906. The placement engine 906 may manage the placement of GUI aspects in the generic control panel views within a "fat" PEM based on attributes included in the audio node structure. In addition, within a "fat" PEM, a control panel view buffer 910 also may optionally be provided to buffer data regarding the additional layers of generic control panel views for the device. The node instantiation engine 904 also may consider the capabilities of the device that includes the display as previously discussed when obtaining the audio node structure and building the generic control panel views and/or generic GUI aspects.

V. Audio-Related Device (Cont'd)

Figure 10:
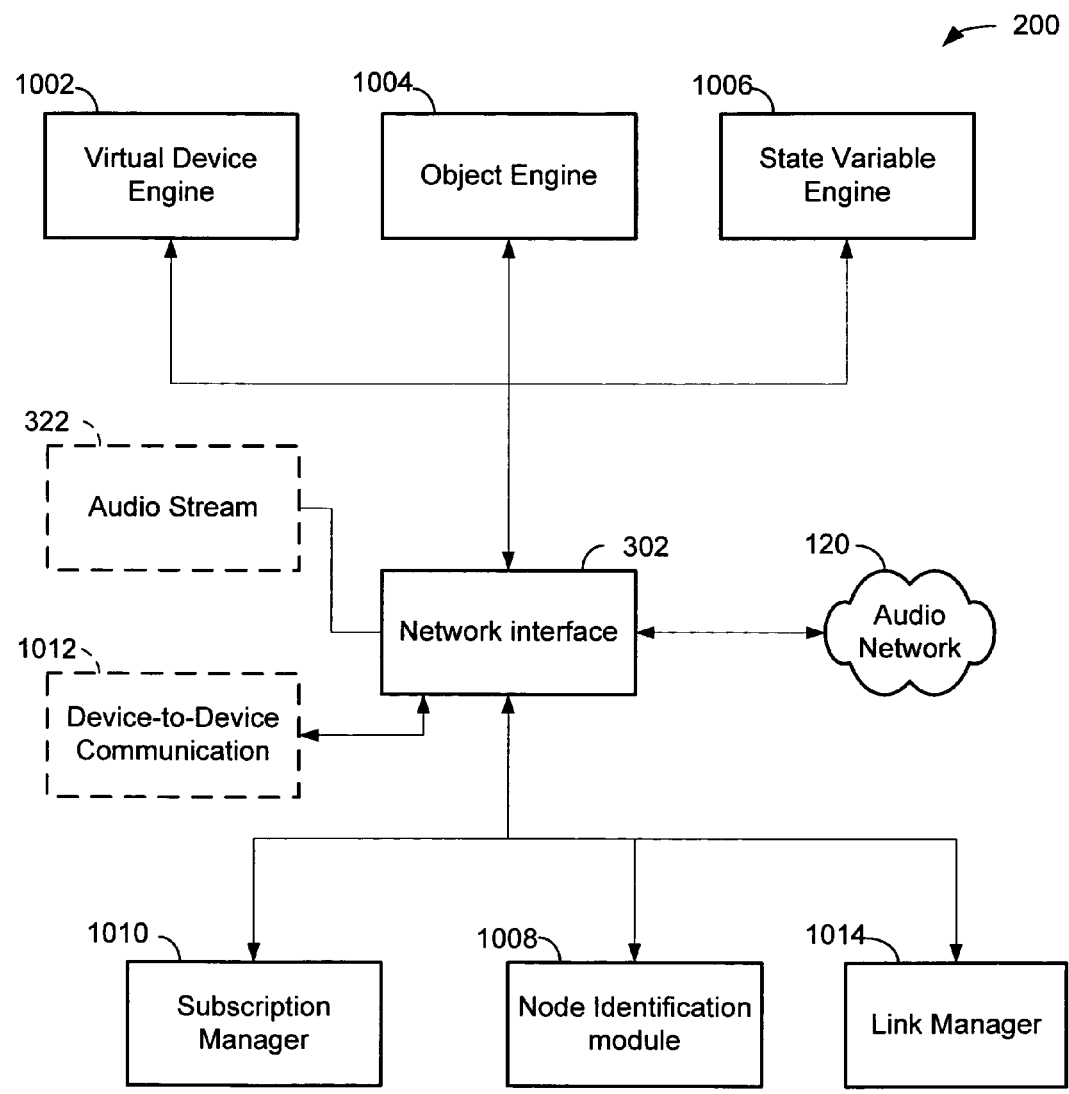
FIG. 10 is a more detailed block diagram of a portion of the audio-related device of FIG. 2.

FIG. 10 is a block diagram of a portion of the audio-related device 200 illustrated in FIGS. 2 and 3. The portion of the example audio-related device 200 includes the network interface 302, the audio stream 322, a virtual device engine 1002, an object engine 1004, a SV engine 1006, a node identification module 1008, a subscription manager module 1010, a device to device communication manager module 1012, and a link manager module 1014. The various modules depicted in FIG. 10 may be stored in the memory 206 and are selectively executable by the processor 204 (FIG. 2). In other examples, additional modules may be included to depict the described functionality of the audio-related device 200.

Each of the audio-related devices may be represented as a node on the audio network 120 (FIG. 1). Each audio node structure may include a three level hierarchy that includes virtual devices, objects, and nodes. Each virtual device may group one or more objects and one or more SVs. The virtual devices, objects, and SVs are representative of the functionality, settings and operational aspects of the corresponding audio-related device 200. The SVs are usually operational parameters in the form of variable data.

The virtual device engine 1002 is configured to track and maintain a plurality of attributes of the one or more virtual devices included in the node. The attributes may be either static or dynamic and provide a description of the capability, functionality and operability of the corresponding virtual device. In addition, due to the nested configuration of the node, the virtual device engine 1002 also may track and maintain objects and SVs included in the virtual device. The object engine 1004 is configured to maintain and track the attributes associated with objects in a node. In addition, the object engine 1004 may maintain and track the SVs nested in the objects. The SV engine 1006 is configured to track and maintain the actual data values present in the audio-related device (node).

The node identification module 1008 is configured to generate a node ID when the audio-related device 200 is initially coupled with the network. The node ID may uniquely identify the audio-related device 200 on the network 120. The node ID may be assigned in a number of different manners, such as by manual assignment or through address negotiation. As discussed previously, the node ID also may be assigned by a PEM. In examples where the node ID is manually assigned, the node ID may be set with a physical switch associated with the audio-related device 200. For example, the node ID may be assigned via a DIP-switch or a panel setting on the audio-related device 200.

The node ID may be assigned through address negotiation among audio-related devices on the audio network. In some examples, audio-related devices may be assigned a node ID based upon a node ID received in a message from the audio network. In other examples, the audio-related device 200 may generate a node ID, such as by randomly or sequentially selecting a node ID. Random address negotiation minimizes the possibility of an address conflict. Sequential address negotiation may be particularly useful in examples where audio-related devices may be identified by numeric address rather than by name. In examples where sequential address negotiation is used, the audio-related devices may be powered up one at a time with the first audio-related device taking address 1, the second, address 2 and so forth, for example. In some examples, a power sequencer may be used to sequentially power up audio-related devices.

Figure 11:
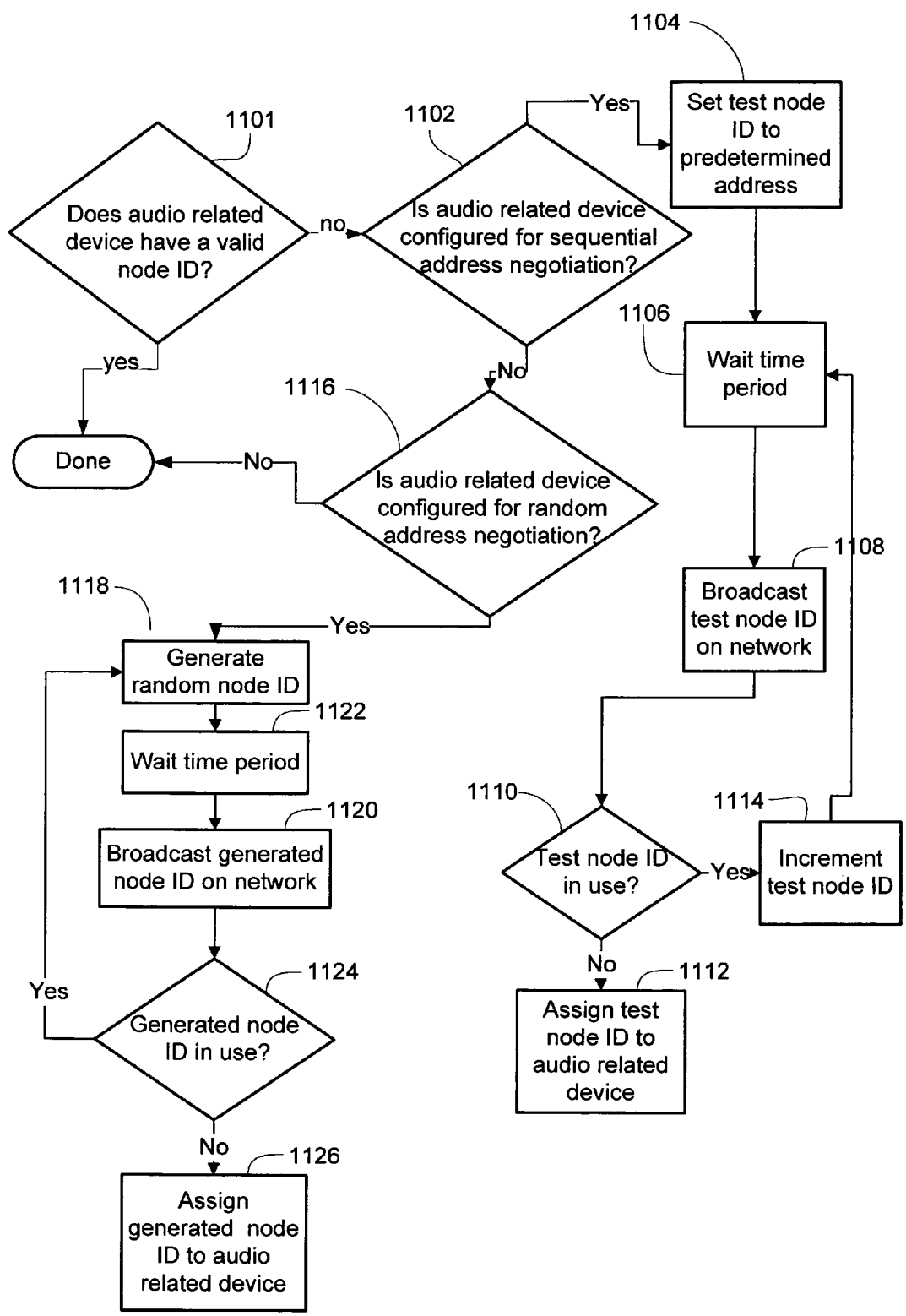
FIG. 11 is an example flow diagram to discovery an audio-related device in the audio system of FIG. 1.

An example method for selecting a node ID in either a random or sequential manner is shown in FIG. 11. Upon power-up, the audio-related device 200 may decide if a valid node ID has been assigned as shown in step 1101. If the audio-related device 200 does have a valid node ID, then that node ID may be used. If the audio-related device does not have a valid node ID on power-up, then the audio related device 200 may start an address negotiation process. The audio-related device 200 may determine that the node ID is invalid on power-up by using a pre-determined invalid node ID such as "0", or by an attribute that categorizes the node ID stored in memory 206 to be invalid. In some examples, the node ID may be stored in non-volatile storage, such that when powering up the audio device 200, the same node ID is restored from the previous time the node was powered. In other examples, the node ID may be invalidated upon power down.

In step 1102, a determination is made whether the audio-related device 200 is configured for sequential address negotiation. If the audio-related device 200 is configured for sequential address negotiation, the audio-related device 200 may set a test node ID to a predetermined address, as shown in step 1004. For example, the predetermined address may be "1." The audio-related device 200 may then wait a time period, such as a random time, to minimize network congestion as shown in step 1006. The test node ID may be broadcasted to other audio-related devices on the network as a request address message to determine whether the test node ID is already in use, as shown in step 1008. Upon receiving the request address message, other audio-related devices on the network may determine whether the test node ID is already in use, as shown in step 1010. If the audio-related device 200 receives no response to the request address message, the node ID may be set to the test node ID as shown in step 1012. If the test node ID is in use, the audio-related device 200 may continue to increment the test node ID until a unique node ID is selected as shown in step 1014.

If the audio-related device 200 is not configured for sequential address negotiation, a determination may be made whether the audio-related device 200 is configured for random address negotiation, as shown in step 1016. If not in the random address negotiation configuration, the audio-related device may use another method for generating a node ID. If the audio-related device 200 is configured for random address negotiation, however, the audio-related device 200 may generate a random node ID, as shown in step 1018. In some examples, the serial number of the audio-related device may be the seed for the random generation of the node ID. To avoid conflicts with the node ID of other audio-related devices on the network, the audio-related device 200 may broadcast a request address message with the generated node ID as shown in step 1020. The broadcast may occur after waiting a time period, such as a random time period, to minimize network congestion as shown in 1022. Upon receiving the request address message, other audio-related devices on the network may determine whether the generated node ID is already in use, as shown in step 1024. If the generated node ID is in use, the audio-related device 200 may be notified. The audio-related device 200 may continue to generate random node IDs until a unique node ID is selected. If the audio-related device 200 receives no response to the request address message, the node ID may be set to the generated node ID as shown in step 1026.

Alternatively, the audio-related device may use a node ID stored in memory 206. For example, the audio-related device 200 may initially have a predetermined node ID, such as "0," before the audio-related device is assigned a node ID. In some examples, the node ID may be stored in non-volatile storage, such that when powering up the audio-related device 200, the same node ID is restored from the previous time the node was powered. For example, the audio-related device 200 may determine that a node ID has previously been assigned because the node ID stored in memory is not the predetermined node ID, such as "0". In other examples, the node ID may be invalidated upon power down.

The subscription manager module 1010 is configured to manage subscription of the audio-related device by other audio-related devices in the audio network. In addition, the subscription management module 1010 is configured to manage subscriptions by the audio-related device to other audio-related devices on the audio network 120. Subscriptions are used to request receipt of one or more data variables from another audio-related device when the data variable(s) changes. For example, a first audio-related device may subscribe to the audio signal level of a second audio-related device. In this example, when the audio signal level changes, the second audio-related device may provide an updated data variable representative of the audio signal level to the first audio-related device over the audio network 120. Similarly, the second audio-related device may subscribe to one or more data variables of the first audio-related device. Such subscriptions are managed and administered by the subscription manager module 1010.

The device-to-device communication module 1012 is configured to establish and maintain non-network communication with other audio-related devices in the audio system. As previously discussed, an audio-related device may communicate directly with other audio-related devices outside of the network communications. Accordingly, the device to device communication module 1012 is configured to store the node ID and other related information and settings related to communications established with another audio-related device. In addition, messages passed between the audio-related devices may be transmitted and received by the device to device communication module 1012. Further, the device to device communication module 1012 may generate transmitted messages and process received messages.

The link manager module 1014 is configured to manage subscriptions to multiple other audio-related devices. The link manager module 1014 may be configured to manage data variables within the audio-related device 200. When the managed data variables change, the link manager module 1014 may notify other audio-related devices of the change. In response to the notification, the other audio-related devices may subscribe to the audio-related device with the changed data variable, to request receipt of the updated data variable. The operation of the link manager is also described with respect to the PEM of FIG. 5.

The link manager module 1014 also may be configured to lessen the subscription burden for a particular audio-related device. For example, if a first audio-related device is burdened with many subscriptions for a certain data variable, the link manager module of a second audio-related device with lower subscription demand may be used to relieve the burden. In this scenario, the second audio-related device may subscribe to the first audio-related device to receive the specific data variable. In addition, the link manager module of the second audio-related device may be configured to alert other audio-related devices when the specific data variable is received. Accordingly, the other audio-related devices may subscribe to the second audio-related device instead of the first audio-related device to obtain the updated specific data variable and the burden on the first audio-related device is lessened.

VI. Network Node Discovery

Figure 12:
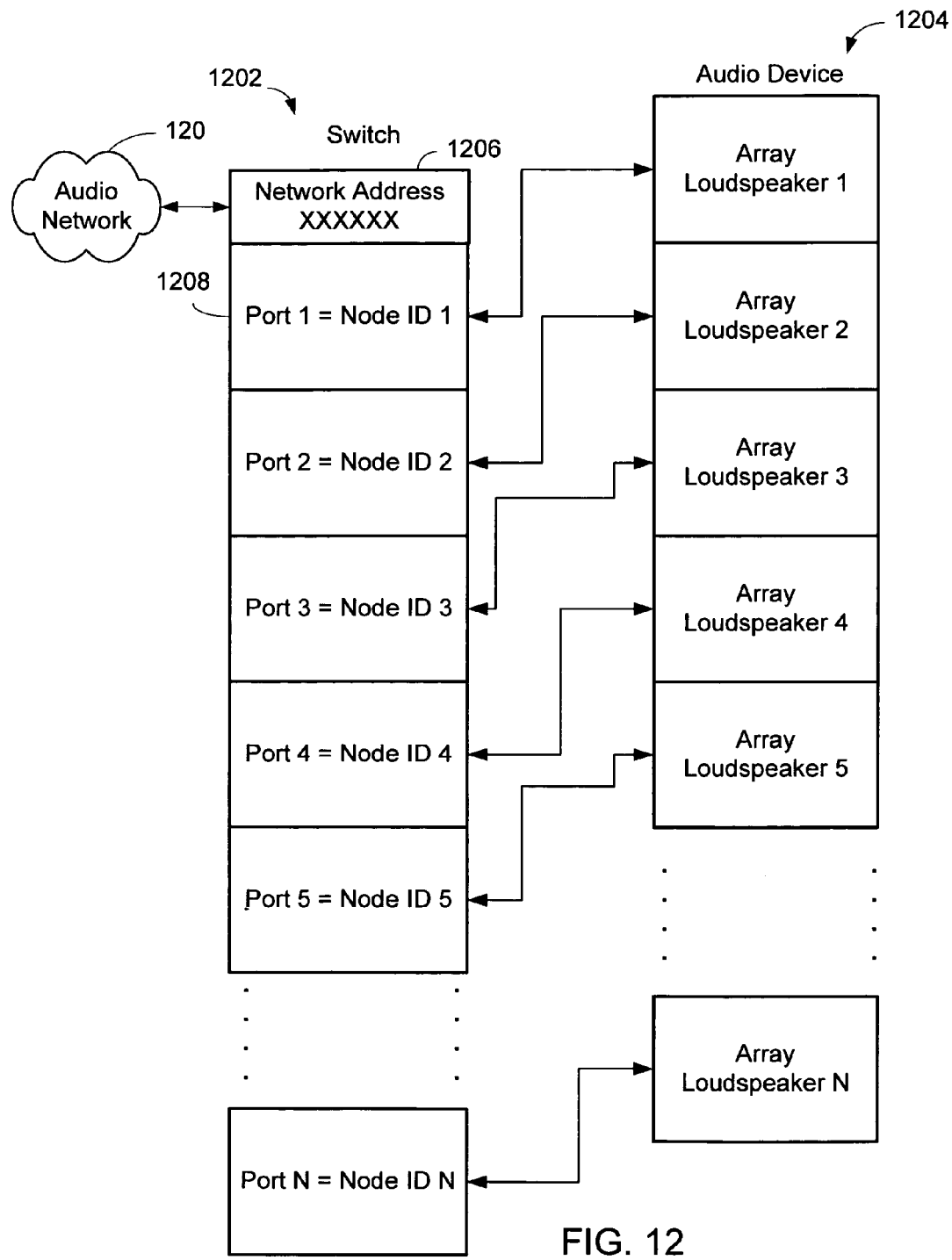
FIG. 12 is a more detailed block diagram of an example configuration of a switch and a plurality of audio-related devices of FIG. 3.

FIG. 12 is an example configuration of a switch 1202 coupled with the audio network 120 and a plurality of "N" audio-related devices 1204. In this example configuration, the switch 1202 may have a network connection 1206 and a plurality of "N" ports 1208. The network connection 1206 may have a network address. Each of the ports 1208 may have a predefined node ID.

The plurality of audio-related devices 1204 may be an array of amplifiers with associated loudspeakers. The position of each of the loudspeakers in the array may dictate the settings of the associated amplifier to create a desired acoustical effect from the array.

The PEM (not shown) may include stored predetermined settings for each of the amplifiers in the array. The PEM also may include stored predetermined settings of the switch 1202 indicating the correspondence between the ports 1208 and the node IDs. When the audio-related devices 1204 and the switch 1202 are activated, the PEM may not be able to see the audio-related devices 1204 over the audio network 120 due to the switch 1202. Because of the predefined assignment of node IDs to the ports 1208, however, the PEM may download the settings to the audio-related devices 1204 based on the port numbers 1208 that correspond to the node IDs. Accordingly, when each of the devices 1204 is coupled with a port 1208 on the switch 1202 that corresponds to a loudspeaker position in the array.

Once a device is assigned a node address, the PEM and other devices may discover the device. The below examples relate to discovery between audio-related devices. However, a PEM or other devices may discover audio-related devices on the audio network. For example, the node resolution module 600 (FIG. 6) of the PEM may be used as described later. In doing this, the routing layer 308 (FIG. 3) may use the services supplied by the underlying layers, such as TCP/IP on an Ethernet network, token network services on a 485 bus, or USB services on a USB bus, to determine the presence of audio-related devices residing on a given network interface and discover the network information necessary to address the audio-related devices. In some examples, the audio-related device 200 (FIG. 2) may be able to specify a node ID and a network address.

Figure 13:
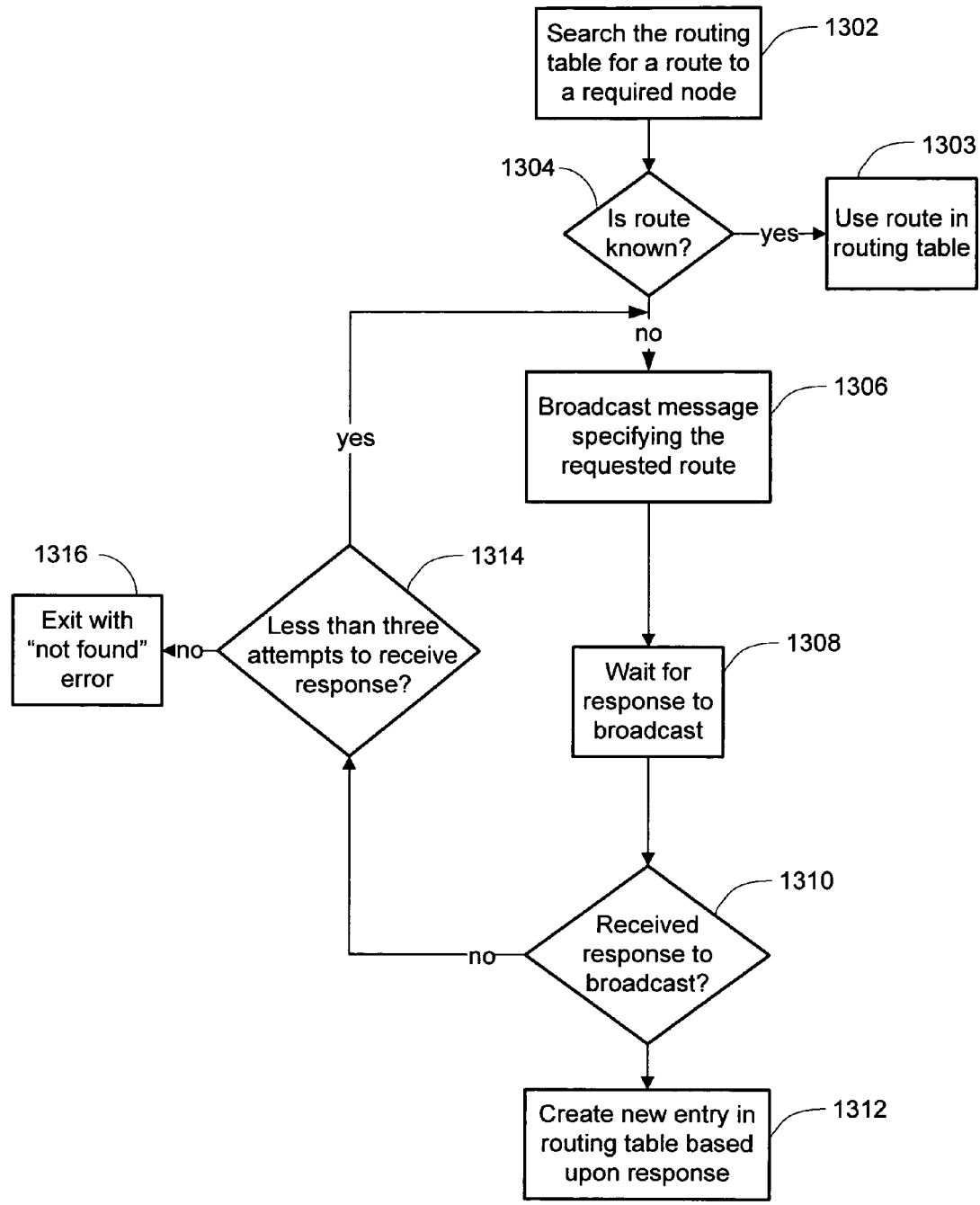
FIG. 13 is an example flow diagram to determine a communication path with an audio-related device.

FIG. 13 is a flow chart showing a method of discovering a node on the audio network that may be used with the system. The routing table is searched for the required node as shown in block 1302. If the node is found in the routing table, that route may be used (block 1303). If the node ID for a node is not found in the routing table (1304), a route to communicate with the device may be determined. To determine the route, the audio-related device may broadcast a message specifying the requested route, as shown in step 1306. The audio-related device may then wait for a response to the broadcast, as show in block 1308. Devices on the audio network receiving the broadcast may search for a route to the requested node. For example, a device receiving the request may search the device's routing table. By way of another example, a device receiving the request may determine whether the requested node matches the device's node ID. If the device receives a response to the broadcast (step 1310), a new entry in the routing table is created based upon the response (step 1312). If no response is received from the broadcast, additional broadcasts may be made that request the route, as shown by step 1314. A "not found" error may be returned if no response to the broadcast is received, as shown in step 1316. In some examples, a device may find nodes on the audio network only when a need arises for communication with such other nodes. This demand driven approach minimizes the size of the routing table by only requesting routes for those nodes that need to be contacted. In other examples, however, a device may wish to monitor the entire audio network even though the device may not be communicating with all nodes at an application layer level.

A device may use a discovery message, such as a DiscoInfo message, for node discovery. In some examples, there may be two different forms of DiscoInfo messages: query and response. The form of DiscoInfo message may be differentiated by the state of a flags field in the message. The query form of DiscoInfo message may be used to find a node on the audio network and pass information about the sender of the message to receiving audio-related devices. To use the DiscoInfo message of the query form, the sender may specify a node address of an audio-related device that is trying to be located along with the sender's network details. The sender may then broadcast the message onto the audio network. The following table is an example format and content of a DiscoInfo message. In the table an unsigned long computer data type is represented with the term "ULONG."

TABLE 5

| Message Region | Datatype | Example Data |
| --- | --- | --- |
| VERSION | UBYTE | 2 |
| HEADER LENGTH | UBYTE | 25 |
| MESSAGE LENGTH | ULONG | 0xNNNNNNNN |
| SOURCE ADDRESS | NODE ID | 0xNODE00000000 |
| DEST. ADDRESS | NODE ID | 0xNODE00000000 |
| MESSAGE ID | UWORD | |
| FLAGS | UWORD | |
| HOP COUNT | UBYTE | 0xNN |
| SEQUENCE NUMBER | UWORD | 0xNNNN |
| PAYLOAD . . . | | |
| Node | UWORD | Node address of sender |
| Cost | UBYTE | Aggregated cost of route back to src |
| Serial Number | BLOCK | Sender's Serial Number |
| Max Message Size | ULONG | Max Msg size sender can handle |
| Keep Alive Period | UWORD | Keep Alive rate in ms |
| NetworkID | UBYTE | 0xNN |
| NetworkInfo | Network specific | Network specific info of sender |

Alternatively, one of the nodes may act as a proxy. In this example, the audio-related device 1004 may query the other audio-related devices 1004 coupled with the switch 1002 (FIG. 10). The proxy audio-related device 1004 may then transmit audio-related device information, such as settings and a node ID, to the PEM or another audio-related device. The PEM or another audio-related device may then be made aware of the existence of the audio-related devices 1004 coupled to the switch 1002 and communication with the audio-related devices 1004 via the switch 1002 as appropriate.

For example, assume a first node and a second node are connected to a third node by a router. The third node may connect to first node. The third node may set the first node as a proxy by sending a proxy enable message, such as a SetProxyState(On) message, to the first node. The third node may then send a DiscoInfo message (of the query form) to the first node. In response, the first node may save the node ID and network address of the third node in the routing table of the first node. The first node may then broadcast a DiscoInfo message of the query form on the audio network. This broadcast by the first node may be received by the second node. In response, the second node may save the node ID and network address of the third node in the routing table of the second node.

The second node may now communicate with the third node via the first node. The second node may send a DiscoInfo message of the response form to the third node using the node ID of the first node as the network address. This message may be received by the first node, which may recognize that the node ID is that of the third node and will therefore forwards the message to the third node. Upon receiving the message from the first node, the third node may recognize that the message was routed through a proxy. For example, the third node may compare the network address of the node that sent the message with the proxy network address to determine whether there is a match. The third node may then make an entry in the routing table with the node ID of the second node with the network address of the first node. In some examples, an entry may also be made in the routing table of the third node with the network address of the second node that is taken from the DiscoInfo message.

In some examples, a system may be configured as a private audio network behind a firewall or the system is accessible through a shared public infrastructure such as the Internet. In such examples, a virtual private network ("VPN") may be used. A VPN may create a tunnel between two networks, or between a host and a network. The VPN also may provide authentication and/or encryption services. For example, the nodes may be accesses from anywhere on the Internet using a VPN.

Some examples may include failsafe node discovery to reduce the possibility that nodes joining an audio network may be missed by other interested devices. A device may broadcast a discovery message, such as a DiscoFailsafe message to the audio network at a certain interval, such as every minute. As discussed later with respect to the routing table, the serial number may uniquely identify a node indicated by a node address. For each DiscoInfo response message that is received, the device may search the routing table for routes to the node ID indicated by the source of the DiscoFailsafe message. For each identified route, the serial number may be compared to the serial number in the DiscoFailsafe message. If serial numbers do not match, there may be an address conflict that may be reported. If the serial numbers do match, the information from the DiscoInfo message may be added to the routing table. In some examples, the node may check for duplicate routes in the table to determine whether one or more devices have not responded to failsafe discovery correctly.

The audio-related device 200 may track continued participation of devices on the audio network. A keep alive period ("KAP") may be provided to determine the maximum period of inactivity allowed on a route before the route is 'timed-out' and deemed invalid. For example, the KAP associated with a device may be 250 milliseconds. In some examples, a source device may specify the KAP of the destination device by placing a KAP in each of the DiscoInfo messages that are sent. In a guaranteed connection, for example, a device could transmit a DiscoInfo message within the KAP period after the last DiscoInfo(Response) the device transmitted. A destination device may time-out a route when it has received no messages within the timeframe of the KAP.

Each device on the audio network may implement and maintain a routing table. The routing table may be used to choose the data path between nodes. The routing table may store a list of routes to other devices on the audio network and the network information needed to transmit messages to the other devices. In some examples, the table may accommodate at least 20 routes and a minimum of 10 other devices.

In some examples, the routing table may contain the following components: a node address, serial number, maximum message size, network interface, network address and cost. The node address component may identify a remote device for which an entry in the routing table is made. If the remote node has more than one network interface (multi-homed), there may be several entries in the table for the device, one entry for each network interface. In such a case, each route will have the same node address. The serial number component of the routing table may uniquely identify the device indicated by the node address. The maximum message size component may describe the maximum size of a message that may pass through the device associated with an entry in the routing table. The network interface component may describe a type of network interface used by a device. As described previously, if a device has multiple network interfaces, the device may have more than one entry in the routing table. The network address component may be used to describe a network address that is associated with a device. The cost component may represent a transit time for the route. While a node will typically route data through the least costly data path, other factors may impact the chosen route. For example, the communication bandwidth between nodes could be a factor in determining routes. For example, the cost associated with Ethernet may be "1," while USB may have a cost of "10," and RS232 may have a cost of "100."

VII. Protocol

Figure 14:
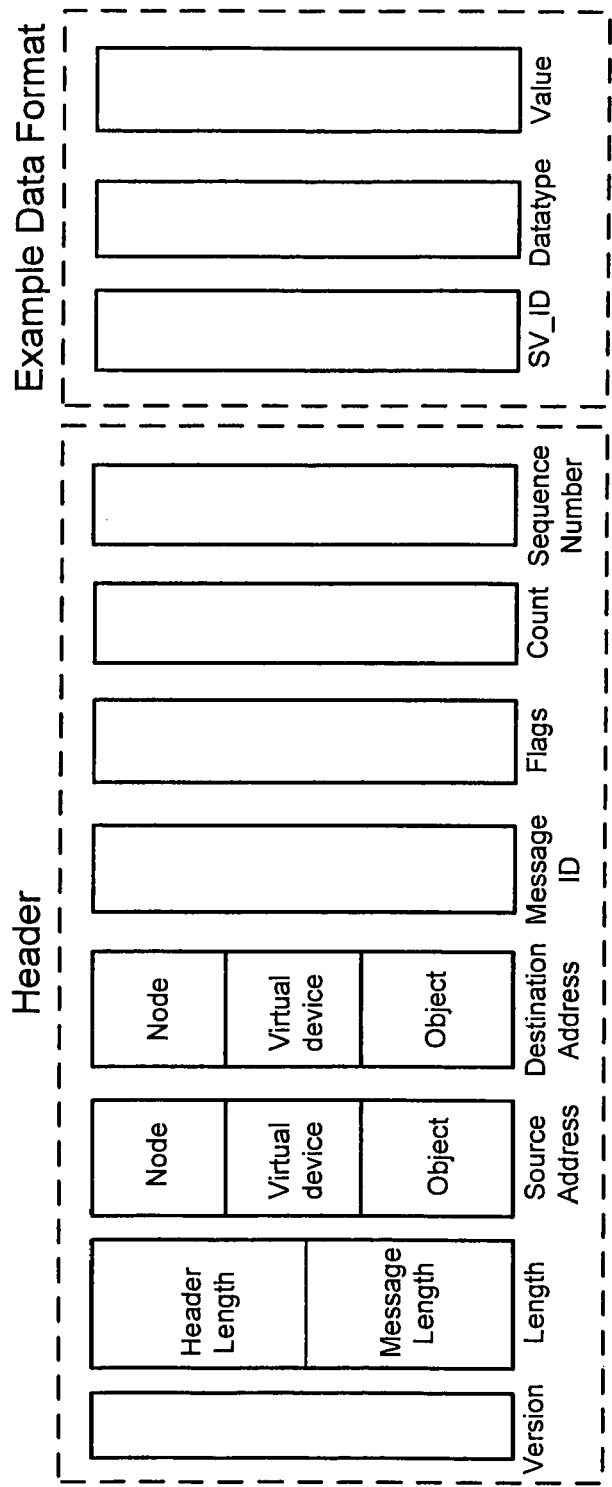
FIG. 14 is an example protocol structure for communication among audio-related devices.

FIG. 14 is block diagram showing a structure that may be used in the network protocol of the system. The header information may include a version, length, source address, destination address, message ID, flags, count, and sequence number. The version may indicate the version of protocol. The length may be used to indicate the length of the header and the message. The source address and destination address may be used to indicate the message's origin and destination.

These addresses may contain information about the node, virtual device(s), and objects(s) of the origin and destination devices. For example, if the source and destination address were 48 bits, bits 0-23 could be used to indicate the type of object, bits 23-31 could be used to indicate the type of virtual device and bits 31-47 could indicate the node address. The message ID may be used to indicate the type of message present.

The flags may be used to indicate whether the message is a request, reply, unsolicited information or other action. For example, the flags may indicate a request acknowledgement, acknowledgement, error, event, guaranteed or multiple part message. If the flag were a request acknowledgement, for example, a reply should not be transmitted until an action has been completed. For example, the request acknowledgement flag may be used in conjunction with an action to change the value of a SV. A message with an acknowledgement flag may be used in response once the SV value has been changed. In some examples where multiple successive actions are to be performed, each action message may wait to be sent until receiving an acknowledgement flag. This use of request acknowledgement and acknowledgement flags may be used to reduce network traffic.

The hop count may be used to indicate the number of hops for an outgoing message. The sequence number may be used as a diagnostic aid for resolving network problems. For example, the sequence number could be incremented by one each a time a message is sent.

FIG. 14 also shows an example SV message, which may include a count, SV_ID, data type and value. The SV_ID may be used to indicate the destination SV. The data type may indicate the size and format of the SV data. For example, the data type may indicate whether the value is byte, word, float, string or block. The value may be used to indicate the SV data actually being transported. FIG. 15 is a table containing example Application layer messages that may be used with the system. FIG. 16 is a table containing example routing layer messages that may be used with the system.

VIII. Audio-Related Device Discovery

Figure 17:
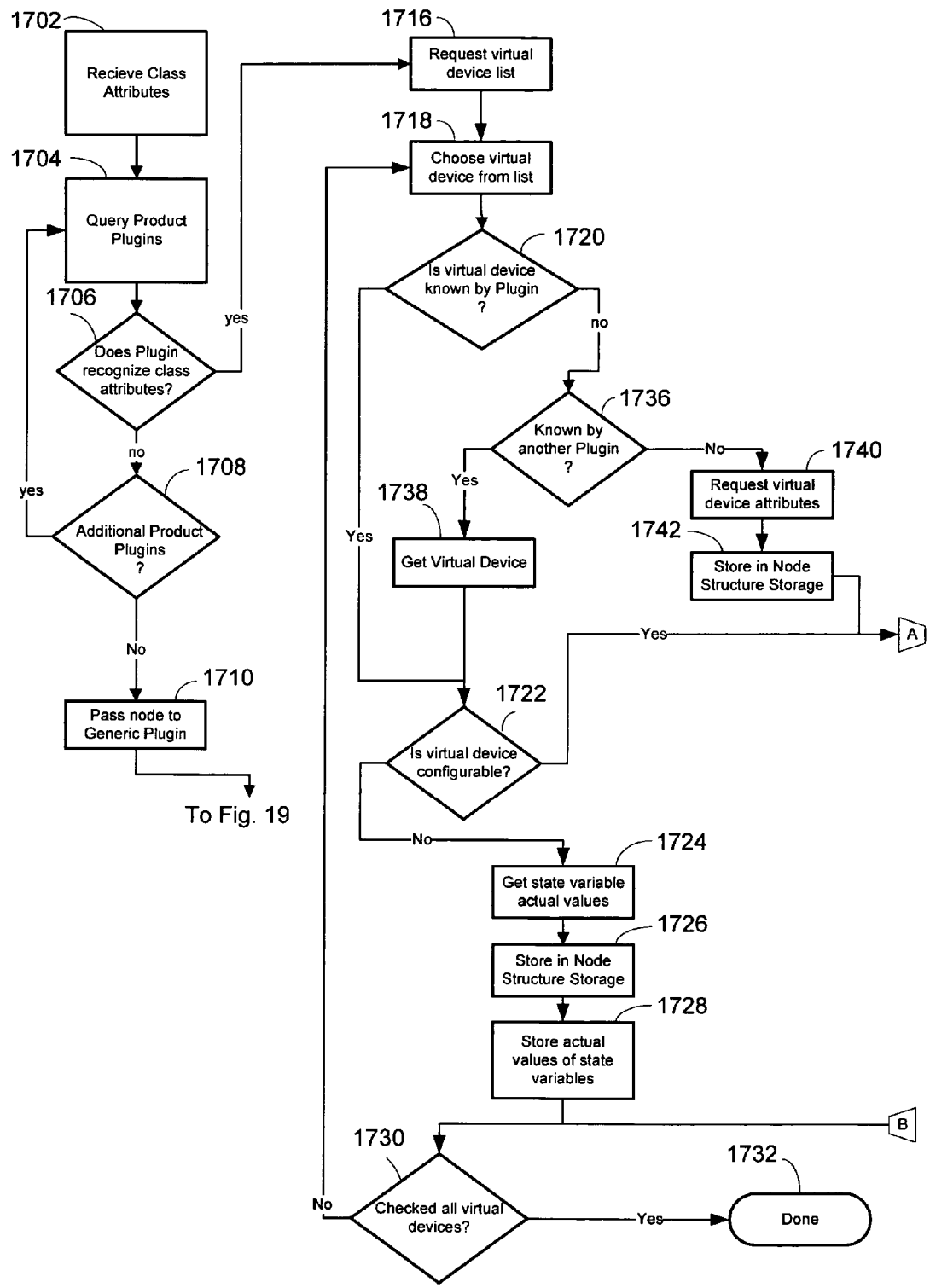
FIG. 17 is an example flow diagram to determine the audio node structure of an audio-related device associated with a product plugin.
Figure 18:
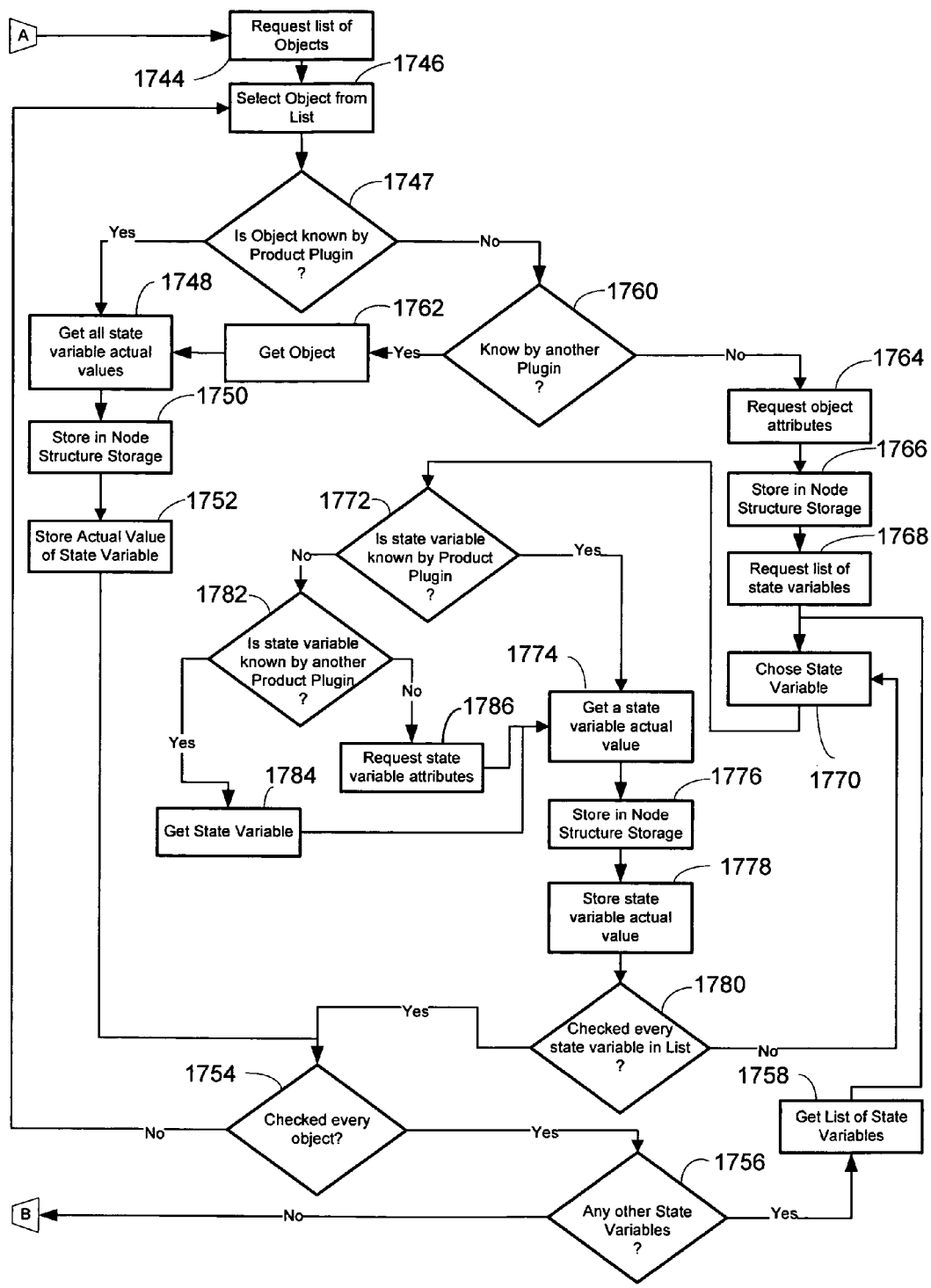
FIG. 18 is a second portion of the example flow diagram of FIG. 17 to determine the audio node structure of an audio-related device associated with a product plugin.

FIGS. 17 and 18 are a flow chart showing an example method of discovering the audio node structure and therefore the functionality of an audio-related device that may be used in the system. At block 1702, the GUI core receives class attributes from a node that is an audio-related device in response to an attributes query that was transmitted to the audio-related device. The GUI core queries a product plugin with an audio node query that includes the class attributes at block 1704. At block 1706, if the product plugin analyzes and does not recognize the class attributes of the node, it is determined if there are additional product plugins in the system at block 1708. If there are additional product plugins, the operation returns to block 1704 and the GUI core queries another product plugin to analyze the class attributes. If none of the product plugins in the audio system recognize the node, the node is passed to the generic plugin at block 1710 (discussed later with reference to FIG. 19).

If at block 1706, the product plugin being queried recognizes the class attributes of the node, a virtual device list is requested from the node manager virtual device in the audio-related device at block 1716. A virtual device is selected from the virtual device list at block 1718. At block 1720, the virtual device is compared by the product plugin to the predefined virtual devices included in the library storage of the product plugin to determine whether the virtual device is known. If the virtual device exists in the library storage, it is determined if the virtual device is configurable at block 1722. If the virtual device is not configurable, at block 1724, the product plugin may obtain the actual values of the SVs from the audio-related device since the objects and SVs include in the virtual device are all known. At block 1726, indication that the virtual device is known and that portion of the audio node structure of the audio-related device may be stored in the node structure storage. The actual values of the corresponding SVs may be stored in the control panel data storage at block 1728. It is determined if all the virtual devices included in the virtual device list have been checked to see if they are known at block 1730. If not, the operation returns to block 1718 and chooses another virtual device to analyze and determine if the virtual device is known. If all the virtual devices in the virtual device list have been checked, the operation ends at block 1732.

Referring again to block 1720, if the product plugin does not recognize the virtual device, at block 1736 other product plugins may be queried for knowledge of the virtual device. Queries of other product plugins may be performed with the plugin Search Engine or with the product plugin. If the virtual device is know by another product plugin, the virtual device may be retrieved and stored in the library storage at block 1738, and the operation continues at block 1722 to determine if the virtual device is configurable. If the virtual device is not known by another product plugin, detailed audio node structure attributes describing the virtual device may be retrieved from the audio-related device at block 1740. The detailed audio node structure attributes of the virtual device may be retrieved from the audio-related device by the discovery engine. At block 1742, the detailed audio node structure attributes of the virtual device may be stored in the node structure storage.

The operation continues in FIG. 18, where a list of objects included in the unknown virtual device may be obtained from the audio-related device at block 1744. Similarly, if at block 1722 (FIG. 17), the virtual device is configurable, a list of objects included in the configurable virtual device may be obtained from the audio-related device at block 1744. The list of objects may be obtained by the product plugin or the discovery engine.

At block 1746, an object is chosen from the list of objects. It is determined if the chosen object exists in the library storage of the product plugin and is known at block 1747. If the object is known, the actual values of the SV(s) included in the object may be obtained at block 1748. The actual values of the SV(s) may be obtained by the retrieval engine. At block 1750, indication that the object is known and the corresponding audio node structure may be stored in the node structure storage. At block 1752, the actual values of the SV(s) may be stored in the control panel data storage. It is determined if every object in the virtual device has been checked to determine if the objects are known at block 1754. If all objects have been checked, it is determined if there are any SVs not included in objects in the virtual device at block 1756. If yes, at block 1758, a list of SVs that not included in an object is obtained from the audio-related device and the operation proceeds to block 1772, as described later, to select a SV and to check if the SV is known. If there are no SVs included in the virtual device that are not included in objects, the operation returns to block 1730 of FIG. 17 to determine if all the virtual devices have been checked. If at block 1754, every object in the virtual device has not been checked, the operation returns to block 1746 to choose another object from the list of objects.

If at block 1747, the object is unknown, other product plugins may be queried for knowledge of the object at block 1760. Queries of other product plugins may be performed with the plugin Search Engine or the product plugin. If the object is know by another product plugin, the object may be retrieved and stored in the library storage at block 1762 and the operation continues at block 1748 to obtain the actual values for the SVs. If at block 1760, the object is not know by another product plugin, at block 1764, detailed audio node structure attributes describing the object are retrieved from the audio-related device. The detailed audio node structure attributes of the object may be retrieved from the audio-related device by the discovery engine. At block 1766, the detailed audio node structure attributes of the object may be stored in the node structure storage.

At block 1768, a list of SVs included in the unknown object and/or virtual device may be obtained from the audio-related device. At block 1770, one of the SVs is chosen from the list of SVs. It is determined if the SV is stored in the library storage and is therefore known at block 1772. If the SV is known, the actual value of the SV is obtained from the audio-related device at block 1774. At block 1776, indication that the SV is known and the corresponding audio node structure is stored in the node structure storage. In addition, the actual value of the SV is stored in the control panel data storage at block 1778. At block 1780, it is determined if all the SVs in the list of SVs have been checked to determine if they are known. If not, the operation returns to block 1770 to choose another SV from the list of SVs obtained from the audio-related device. If all of the SVs in the object have been checked, the operation returns to block 1754 to check if all the objects in the virtual device have been checked.

If at block 1772, the SV is not known by the product plugin, it is determined if the SV is known by any other product plugins at block 1782. Queries of other product plugins may be performed with the plugin Search Engine or the product plugin. If yes, the SV is retrieved from the other product plugins and stored in the library storage at block 1784 and the operation continues to block 1774 to retrieve the actual value of the SV from the audio-related device. If the SV is not known by another product plugin, detailed audio node structure attributes describing the SV are retrieved from the audio-related device at block 1786 and the operation proceeds to block 1776 to store the SV in the node structure storage. The detailed audio node structure attributes of the SV may be retrieved from the audio-related device by the discovery engine.

The process may continue until each SV, object and virtual device in the audio node structure of the audio-related device or a detail audio node structure attributes of unknown SVs, objects and virtual devices has been stored in the node structure storage. Alternatively, in the case of a "thin" PEM with limited capability, lesser portions of the audio node structure or detailed attributes may be stored in the node structure storage at any one time, and additional audio node structure or detailed attributes may be stored on an as-needed basis.

Figure 19:
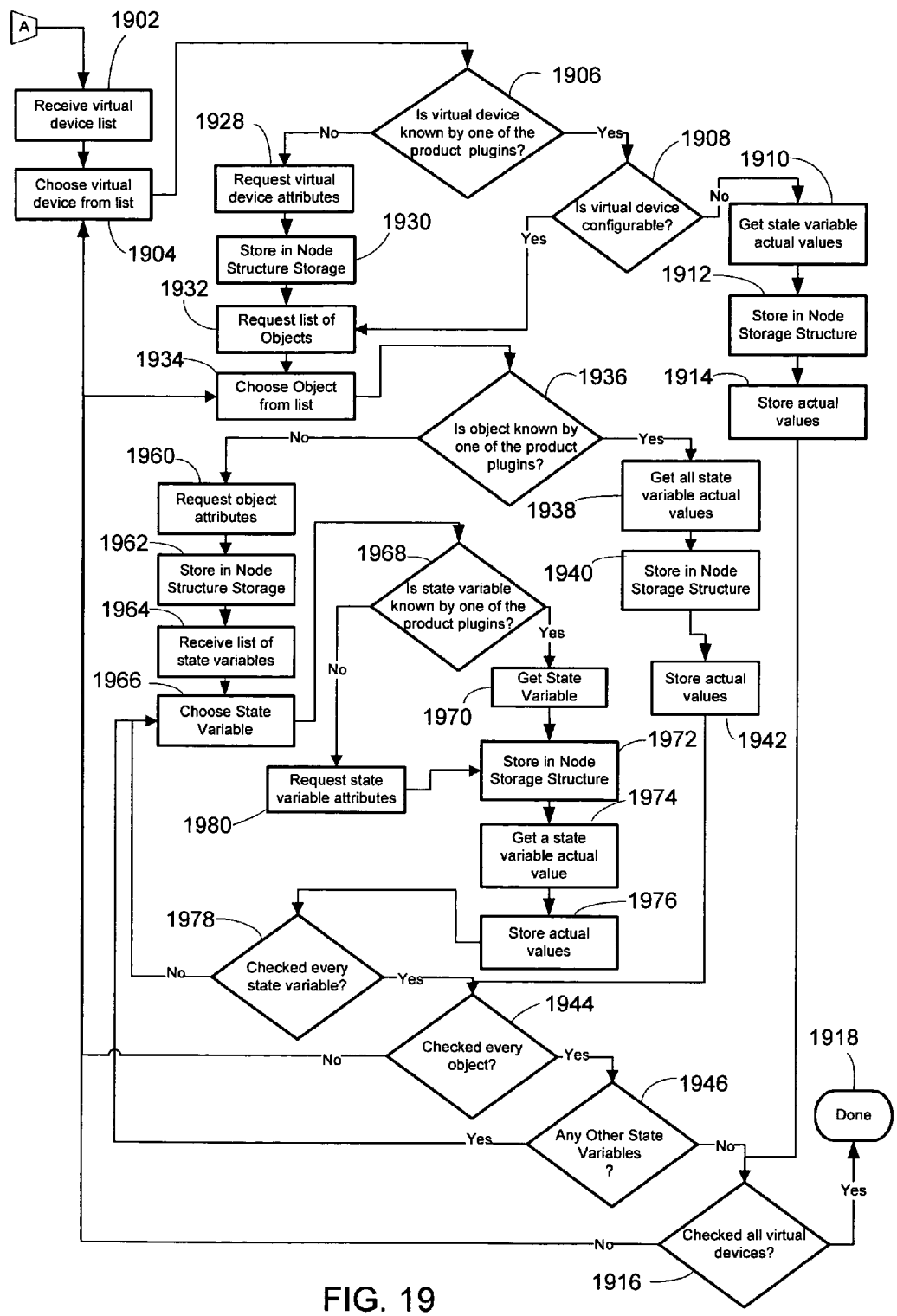
FIG. 19 is an example flow diagram to determine the audio node structure of an audio-related device that is not associated with a product plugin.

Referring again to block 1710 of FIG. 17, if the class attributes of a node are not recognized by any of the product plugins, the node is passed to the generic plugin. In FIG. 19, at block 1902, the retrieval engine of the generic plugin receives a virtual device list in response to a node query. At block 1904, a virtual device is selected from the virtual device list. The plugin search engine may be enabled to query the product plugins for knowledge of the selected virtual device at block 1906. Alternatively, the retrieval engine may query the other product plugins. If the virtual device is known by a product plugin and not configurable (block 1908), the actual values of the SVs of the virtual device may be obtained at block 1910. Indication that the virtual device is known, and the corresponding audio node structure may be stored in the node structure storage at block 1912. The actual value of the SVs within the virtual device may be stored in the control panel data storage at block 1914. At block 1916, it is determined if all the virtual devices have been checked and if so, the operation ends at block 1918. If all the virtual devices have not been checked, the operation returns to block 1904 and chooses another virtual device from the list. If at block 1906, the virtual device is unknown, the detailed attributes may be requested at block 1928 and stored in the node structure storage at block 1930.

At block 1932, a list of the objects in the unknown virtual device is obtained. Similarly, if at block 1908, the virtual device is configurable, the operation proceeds to block 1932 to request a list of objects in the configurable virtual device. At block 1934, an object is chosen from the list, and at block 1936 it is determined if the chosen object is known by any of the product plugins. If the object is known, the actual values of the SVs included in the object are obtained at block 1938; indication that the object is known and the corresponding audio node structure is stored in the node structure storage at block 1940. At block 1942, the actual values of the SVs associated with the object may be retrieved from the audio-related device and stored in the control panel data storage. It is determined if all of the objects have been checked at block 1944. If all objects have not been checked, the operation returns to block 1934, and if all objects have been checked, it is determined if there are any SVs in the virtual device not included in objects at block 1946. If there are not, the operation returns to block 1918 to determine if all the virtual devices in the list have been checked. If there are such SVs, the operation proceeds to block 1966 to get the SVs as described later.

If at block 1936, the object is not known, the detailed attributes of the object may be obtained at block 1960 and stored in the node structure storage at block 1962. A list of the SVs of the unknown object is obtained at block 1964, and one of the SVs in the list is chosen at block 1966. At block 1968, it is determined if the SV is recognized by one of the product plugins. If the SV is known, the actual value of the SV is retrieved from the product plugin at block 1970. At block 1972, indication that the SV is known and that portion of the audio node structure is stored in the node structure storage. At block 1974, the actual value of the SV is received, and at block 1976, the actual value of the SV is stored in the control panel data storage.

At block 1978, it is determined if every SV has been checked. If not, the operation returns to block 1966 to get another SV. If all of the SVs have been checked, the operation returns to block 1944 to determine if every object has been checked. If at block 1968, the SV is not known, the detailed attributes of the SV are obtained at block 1980, and the operation continues to block 1972 where detailed attributes of the SV are stored in the node structure storage. The operation continues until all of the audio node structure has been identified as known, or further discovery is performed to determine unknown components in the audio node structure.

IX. Control Panel Display

Figure 20:
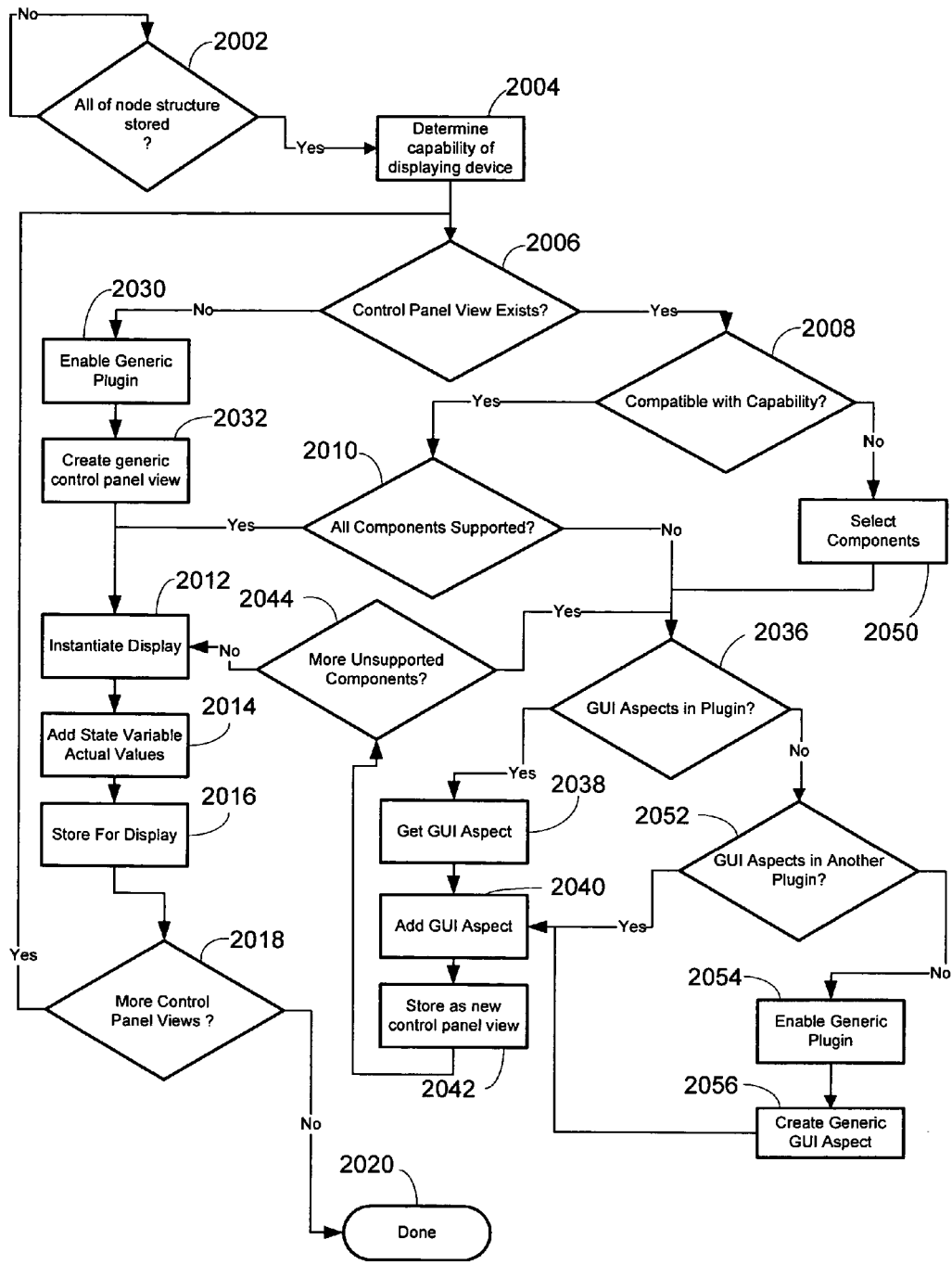
FIG. 20 is an example flow diagram to determine how the GUI control panel view of a corresponding audio-related device may be displayed based on the capability of the displaying device.

FIG. 20 is a flow chart showing a method that may be used in the system for discovering product attributes when the capabilities of the PEM may vary. For example, the PEM may reside on a device that is not capable of displaying an entire stored, predefined GUI control panel view on its display. By way of another example, the device may have limited processing abilities and therefore it may not be desired to prepare for display of an entire stored, predefined GUI control panel view at once. Instead, the GUI control panel views may be generated as needed based on, for example, commands of a user. Accordingly, scalability for varying levels of device processing capabilities and sizes of displays may be supported. This also may be referred to as the "Thin Application Layer" as discussed with reference to FIG. 4.

In FIG. 20, at block 2002 it is determined if all of the audio node structure of the particular audio-related device has been checked and whether indication of the audio node structure has been stored in the node structure storage. If not, the operation continues to determine if this has occurred. If the node structure storage contains indications for the entire audio node structure, the device on which the PEM resides is checked to determine the device display capability at block 2004. At block 2006, it is determined if one or more stored predetermined control panel view exists for the audio node structure of the audio-related device.

If a control panel view exists, it is determined if the stored control panel view is compatible with capability of the displaying device at block 2008. At block 2010, it is determined if all of the functionality of the components of the audio-related device included in the control panel view are supported by the predefined control panel view. If they are supported, the display is instantiated at block 2012. At block 2014, the actual values of the SVs included in the control panel view are added from the control panel data storage. The instantiated control panel view may be stored for display at block 2016. It is determined, based on the capability of the displaying device, whether additional control panel views of the audio node structure should be instantiated at block 2018. If no more control views should be instantiated, the operation ends at block 2020. If additional control panel views should be instantiated, the operation returns to block 2006 and checks for another control panel view that is associated with the audio node structure of the audio-related device.

Returning to block 2006, if a control panel view does not exist for the audio node structure of the audio-related device, the generic plugin is enabled at block 2030. At block 2032, the generic plugin may create a generic control panel view based on the audio node structure stored in the node structure storage, and the operation proceeds to block 2012 to instantiate the display of the generic control panel view. Returning to block 2010, if all components representative of a portion of the audio node structure are not supported in a predefined control panel view, it is determined if a predefined GUI aspect that corresponds to the unsupported component(s) is stored in the product plugin at block 2036. If a stored, predefined GUI aspect exists in the product plugin, the GUI aspect is retrieved at block 2038. At block 2040, the retrieved GUI aspect is integrated into the stored, predefined control panel view. The predefined control panel view that includes the integrated GUI aspect may be stored as a new predefined control panel view that corresponds to the audio node structure of the audio device at block 2042.

At block 2044, it is determined if there are additional components of the audio node structure that are not supported by the stored, predefined control panel view. If there are, the operation returns to block 2036 to check for stored, predefined GUI aspects. If there are not any additional components of the audio node structure, the operation proceeds to block 2012 and instantiates a display.

Referring again to block 2008, if the predefined stored control panel view is not compatible with the capability of the device driving the display, at block 2050, components may be selected from the audio node structure that are compatible. The operation then proceeds to block 2036 to retrieve a GUI aspect. Referring again to block 2036, if a GUI aspect is not predefined and stored in the product plugin, then other product plugins may be checked for the existence of a stored GUI aspect representative of the functionality that is missing from the control panel view at block 2052. If the GUI aspect is predefined and stored in another product plugin the operation returns to block 2038 to retrieve and process the stored, predefined GUI aspect. If the GUI aspect is not stored in any other product plugin, the generic plugin may be enabled at block 2054. At block 2056, the generic plugin may produce a generic GUI aspect and the operation continues at block 2040 to add the GUI aspect into the stored, predefined control panel view. The operation continues until, subject to the capability of the device, the functionality of the audio-related device has been instantiated into one or more control panel views.

Figure 21:
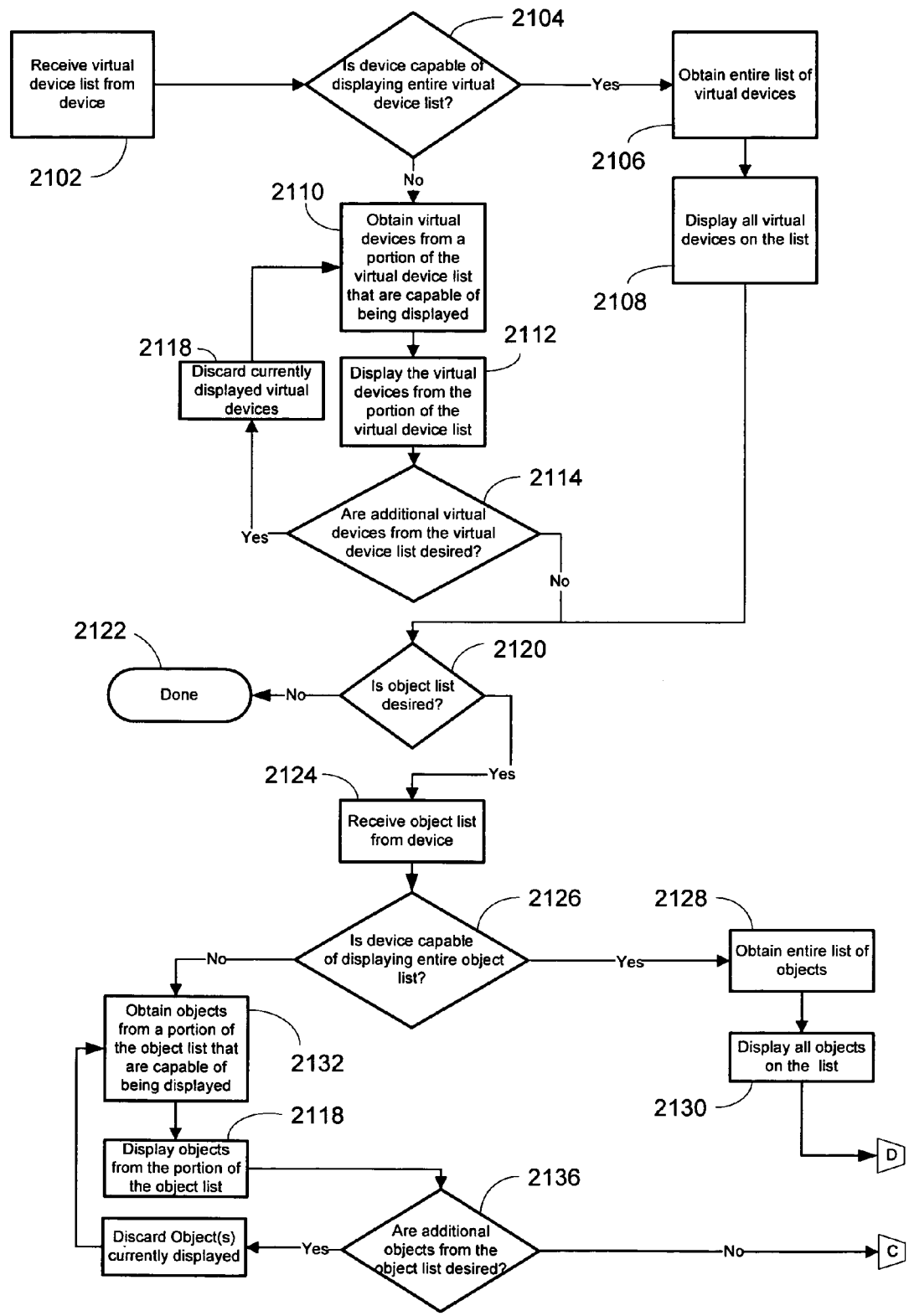
FIG. 21 is another example flow diagram to determine how the GUI control panel view of a corresponding audio-related device may be displayed based on the capability of the displaying device.

FIG. 21 is a flow chart of another example method that may be used in the system for discovering product attributes when the capabilities of the PEM may vary. In this example, the PEM contains all data for complete control of an audio-related device. The operation begins at block 2102 when a virtual device list is received from the audio-related device. At block 2104, the device on which the PEM is operating is checked to determine whether the device is capable of displaying the entire virtual device list. If the device is capable of displaying all the virtual devices, the entire virtual device list is obtained at block 2106. At block 2108, all of the virtual devices in the list are displayed. If at block 2104, the device is not capable of displaying all virtual devices, the portion of virtual devices that are capable of being displayed are obtained at block 2110 and displayed at block 2112. At block 2114, if the user would like to view other virtual devices, the presently viewed virtual devices may be discarded at block 2116 and the operation returns to block 2110 to obtain and display additional virtual devices. For example, the user may view other devices by selecting a "page down" button on the device to review all virtual devices.

If additional virtual devices are not viewed at block 2114, at block 2120, it is determined if the user would like to obtain additional information about a particular displayed virtual device. For example, a user could click on a portion of the control panel view that is an object in the audio node structure. If not, the operation ends at block 2122. If additional information is desired, an object list for the audio-related device may be requested at block 2124.

If at block 2126, the device on which the PEM resides is capable of displaying the entire object list, an entire list of the objects may be obtained at block 2128. Objects on the obtained list may be displayed at block 2130. If at block 2126, the device is not capable of displaying the entire object list, only a portion of the objects are obtained at block 2132 and displayed at block 2134. As discussed above with respect to the virtual devices, it is determined if the user wants to scroll through the object list at block 2136. If the yes, at block 2138, the currently viewed objects may be discarded and the operation returns to block 2132 where additional objects are obtained and displayed.

Figure 22:
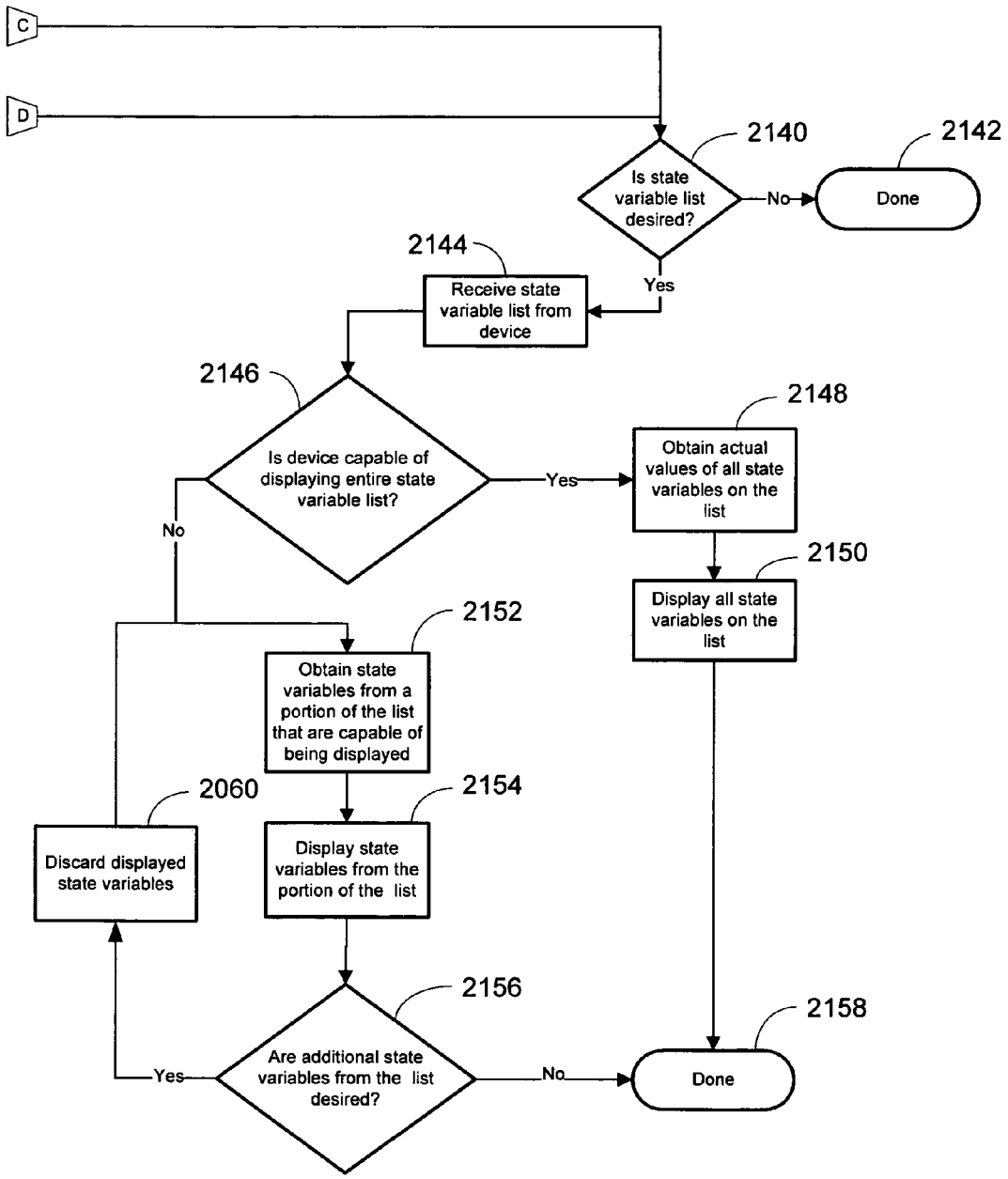
FIG. 22 is a second portion of the example flow diagram of FIG. 20 to determine how the GUI control panel view of a corresponding audio-related device may be displayed based on the capability of the displaying device.

Referring to FIG. 22, at block 2140, it is determined if the user desires to review the actual values of the SVs for an object. (FIG. 22 is a continuation of the flow chart of FIG. 21 continuing along paths C and D) If not, the operation ends at block 2142. If the user desires to review SVs, a SV list is requested and obtained at block 2144. It is determined if all the SVs on the obtained list may be displayed at block 2146. If the device is capable of displaying the entire list of SVs, the entire list is obtained at block 2148 and displayed at block 2150. Otherwise, a portion of the SVs are obtained at block 2152 and displayed at block 2154. At block 2156, it is determined if additional SVs from the list are desired. If no, the operation ends at block 2158. If there are additional desired SVs, the user can scroll through the SVs. The currently displayed SVs are discarded at block 2160. The operation then returns to block 2152 to obtain and display additional SVs.

Figure 23:
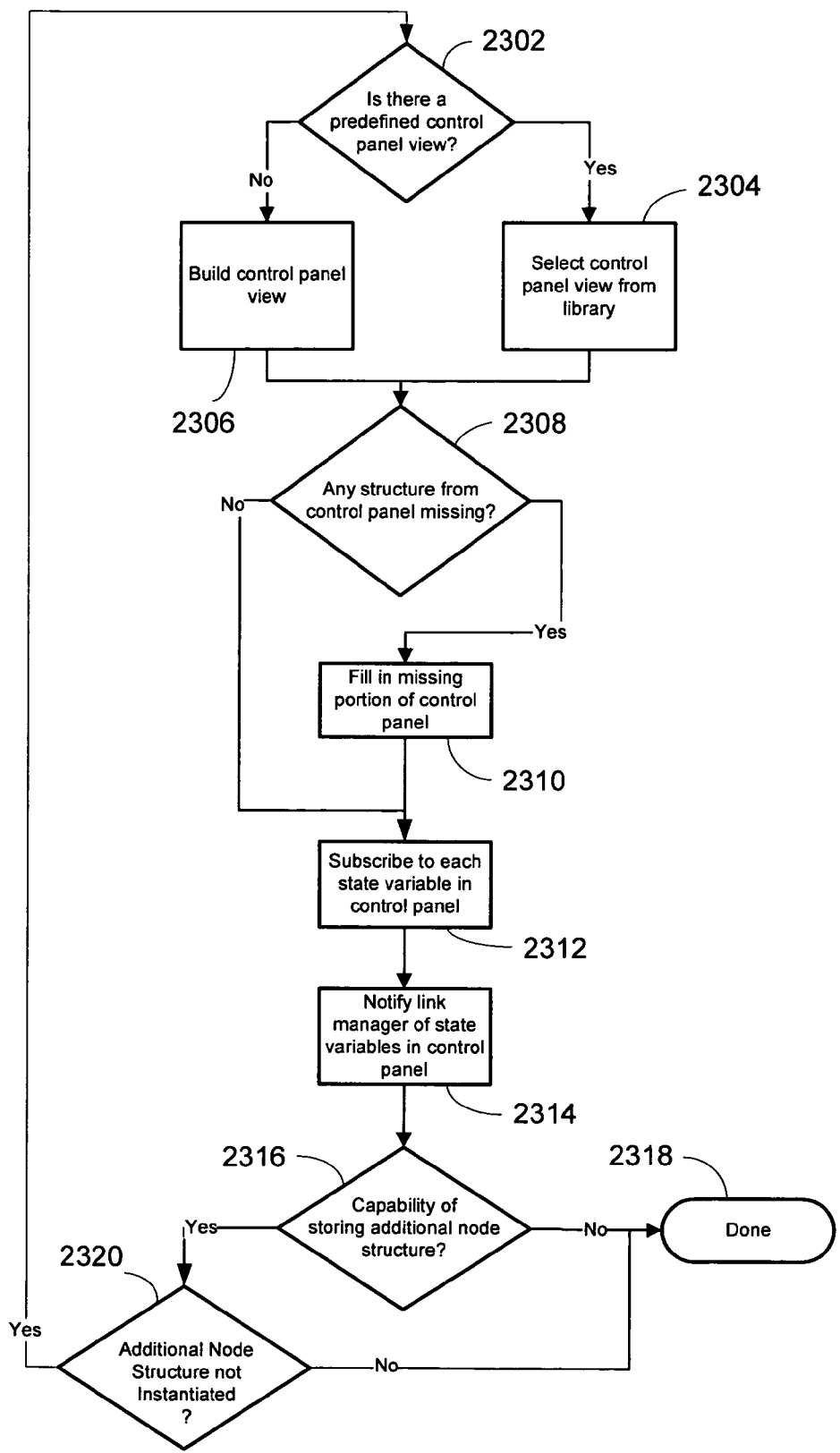
FIG. 23 is an example flow diagram to build a control panel view of a corresponding audio-related device.

FIG. 23 is a flow chart illustrating example operation of the node instantiation engine (shown in FIGS. 8 and 9). It is determined if the product plugin(s) has a stored, predefined control panel view corresponding to the audio node structure at block 2302. If yes, the predefined control panel view is selected from the product plugin control panel library at block 2304. If there is not a corresponding control panel view, a control panel view may be built using the generic plugin at block 2306. It is determined if any of the node structure is missing from the control panel view at block 2308. If yes, at block 2310 the missing structure may be filled in using the discovery engine of the GUI core. If at block 2308 the structure from the control panel view is complete, the node instantiation engine may setup subscriptions to one or more of the SVs in the control panel view at block 2312.

At block 2314, the node instantiation engine may notify the link manager of the SVs in the control panel view. It is determined if the displaying device has the capability to store additional audio node structure and instantiate additional control panel views at block 2316. If not, the operation ends at block 2318. If the displaying device has additional capability, it is determined if there is additional audio node structure that has not been instantiated at block 2320. If there is no additional audio node structure, the operation ends at block 2318. If there is additional audio node structure to instantiate in a control panel view, the operation returns to block 2302 so that one or more layers of control panel views of the remaining audio node structure may be instantiated and stored.

X. Link Manager

Figure 24:
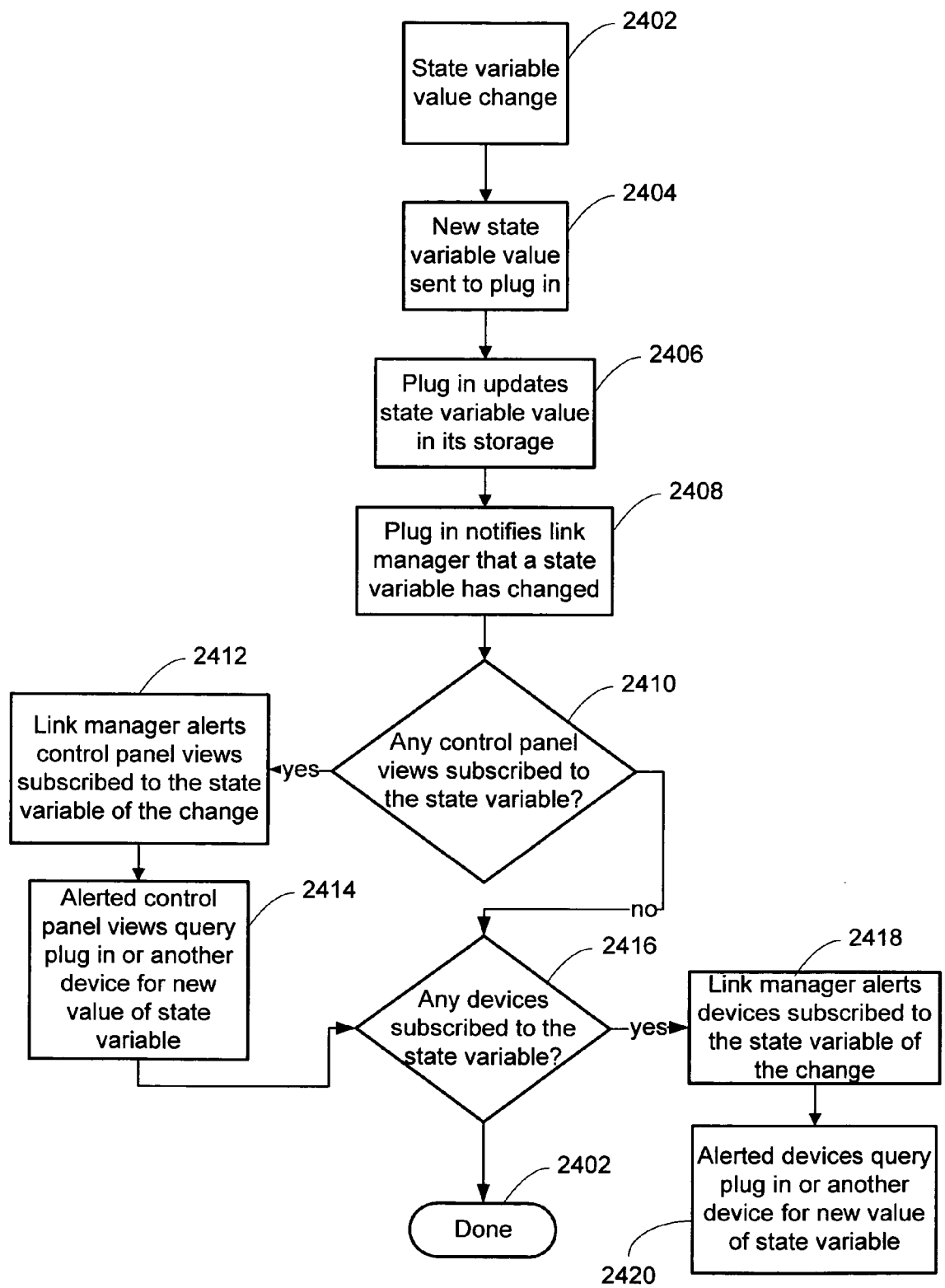
FIG. 24 is an example flow diagram to update the data variables displayed in a plurality of different control panel views.

FIG. 24 is a flow chart of a link manager that may be used in the system. This method could be used when a SV changes so that all associated control panel views and devices are updated with the new value of the SV. When the value of a SV changes in a control panel view (block 2402), the new SV value may be sent to the product plugin (block 2404). The product plugin may update the value of the SV in the corresponding control panel view as shown in block 2406. The link manager also may be notified that a SV value has changed as shown in block 2408. The link manager may determine whether any control panel views are subscribed to the changed SV (block 2410). If subscriptions between the SV and the control panel views exist, the link manager may alert each of the control panel views that are associated with the SV of the change (block 2412). The alerted control panel views may then query the product plugin or another device to determine the new value of the SV (block 2414). The link manager also may determine whether any devices subscribe to the changed SV (block 2416). If subscriptions between the SV and any devices exist, the link manager may alert each of the devices that are associated with the SV of the change (block 2418). The alerted control panel views may then query the product plugin or another device to determine the new value of the SV (block 2420)

XI. Subscriptions

Figure 25:
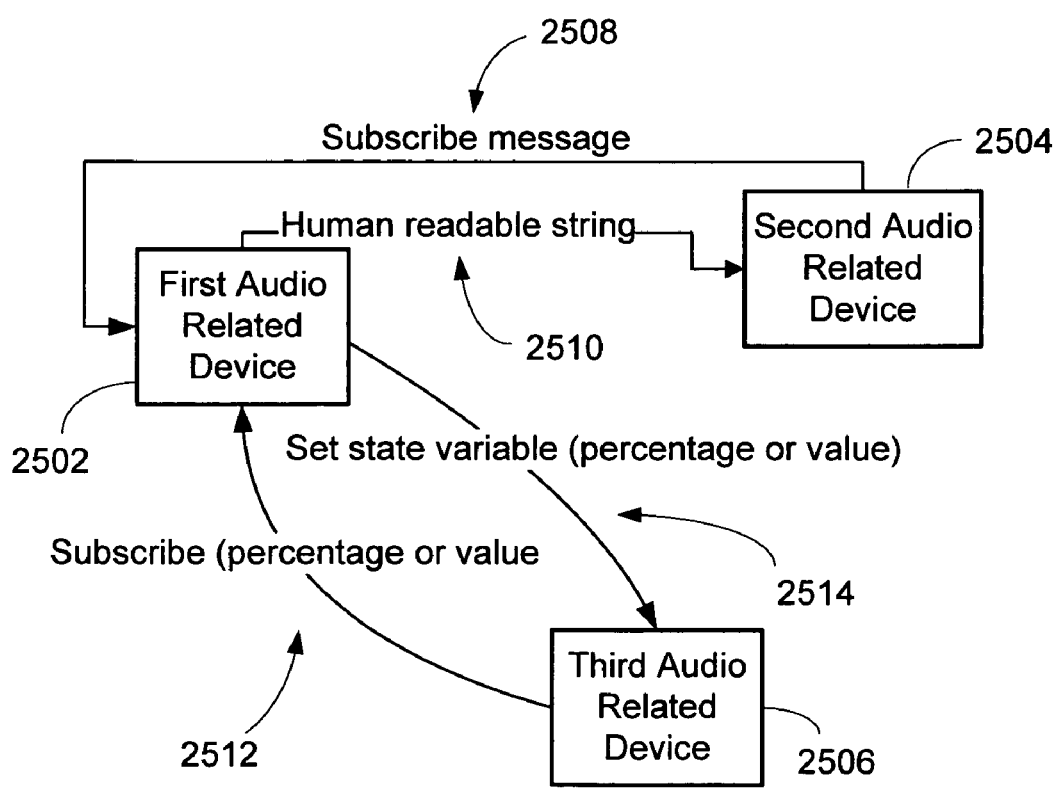
FIG. 25 is a flow diagram depicting various examples of communication of data variables from one audio-related device to another.

FIG. 25 is a block diagram showing a manner by which subscriptions between devices may be employed to monitor and/or control parameters in one or more audio-related devices with one or more other audio-related devices. A subscription may be used to notify one or more subscribers of a change in the value of a SV as previously discussed. In addition, a subscription may be used to direct changes to SV's in one or more other devices. Further, a combination of the subscriptions to monitor and control may be set up between audio-related devices. The example shown in FIG. 25 includes a first audio-related device 2502, a second audio-related device 2504 and a third audio-related device 2506.

The second audio-related device 2504 has setup a subscribe string with the first audio-related device 2502. The subscribe string may be setup using a subscription message 2508, such as a SVSubscribeString message as depicted in FIG. 15. A human readable string may be included in a subscription response message 2510. An example SVSubscribeString message may include:

TABLE 6

VERSION
HEADER LENGTH
MESSAGE LENGTH
SOURCE ADDRESS
DEST. ADDRESS
MESSAGE ID
FLAGS
HOP COUNT
SEQUENCE NUMBER
PAYLOAD . . .
Subscriber Address
No. of Subscriptions
First Subscribee SVID
First Subscriber SVID
Second Subscribee SVID
Second Subscriber SVID In the illustrated example, the source address would be the node ID of the first audio-related device 2502, and the destination address may be the node ID of the second audio-related device 2504. The message ID may identify the message as a subscribe string message. The flags, hop count, and sequence number may be an audio system specific value, and the payload may include the subscription string request message. The subscriber address may be the audio node address of the first audio-related device 2502. The number of subscriptions may indicate how many subscriptions to the first audio-related device 2502 are included in the subscribe string request. The first subscriber SV ID may indicate the SV in the second audio-related device 2504 that corresponds to the first subscribed SV ID in the first audio-related device 2502.

The subscribe string may be mapped between one or more SVs in the first audio-related device 2502 and corresponding one or more SVs in the second audio-related device 2504. A subscribe string requests a subscription in which the data provided based on the subscription is in a format that is capable of being readily deciphered by a user (i.e. human readable format). Accordingly, if the value of a SV associated with the subscription changes, the new value may be sent to the second audio-related device 2504 in the subscription response message 2510. The value may be sent as a human readable string so that the second audio-related device 2504 would not be required to convert between data types before the new value could be displayed.

The third audio-related device 2506 may setup a subscription with the first audio-related device 2502 using a subscription message 2512. The subscription message may request subscription responses that are values or percentages. If the third audio-related device 2506 knows the data type of the subscribed SV in first audio-related device 2502, the subscription message may request the actual value based upon a predetermined condition. The data type may be known if the components of the node structure of the third audio-related device 2506 are mirrored in the first audio-related device 2502. If the third audio-related device 2506 does not know the data type of the subscribed SV, the subscription message may be requested as a percentage.

Instead of the first audio device 2502 sending the value of the SV, a percentage of the change between 0 and 100% may be sent as a subscription response message 2514. Accordingly, instead of unit specific variables, percentages representative of unit specific variables may be transmitted and received. Based on the percentage, the third audio-related device 2506 may adjust the existing value by the identified percent. Alternatively, the third audio device may have a range of actual values that correspond to the percentage to determine an actual value from the percentage. Thus, the third audio device does not need to know the data type and/or units of the values when percentages are used.

In FIG. 25, the first audio-related device 2502 may set the value of SV(s) in the third audio-related device 2506 with the subscribe message 2514. The value of the SV may be changed by sending the actual value of the SV or by sending a percentage. A benefit of setting an audio-related device with a percentage, however, is that the subscriber audio-related device need not know the data type of the subscribee audio-related device that sends the data.

For purposes of this example, assume that the second audio-related device 2504 has setup a subscribe string for a SV of the first audio-related device 2502. Further assume that the third audio-related device 2506 is configured to set the value of the SV. In this setup, a setpoint of the SV from the third audio-related device 2506 generates an output from the first audio related device 2502 of the changed SV value to the second audio-related device 2504 in human readable form.

Neither the third audio-related device 2506 nor the second audio-related device 2504 necessarily need to know the data format of the SV. In some circumstances, the third audio related device 2506 may know the data format, or data type, of the SV. In such cases, the third audio-related device 2506 may specifically assign a changed value to the SV in the data format of the SV. In other examples, however, the third audio related device 2506 may not know the data format of the SV. In such examples, the third audio related device 2506 may discover the data format of the SV by querying the node structure of the first audio-related device 2502. Whether the first audio-related device attempts to determine the data format of the SV may depend upon the processing capability of the third audio-related device 2506 or other factors. If the data format of the SV is unknown to the third audio-related device 2506 (and the third audio-related device 2506 is unable to determine the data format), the third audio-related device may still change the value of the SV by setting the value of the SV by a relative percentage.

The third audio-related device 2506 may set the value of the SV by instructing the first audio-related device 2502 to change the value of the SV by a relative percentage. For example, the third audio-related device 2506 may instruct the first audio-related device to increase the value of the SV by 25 percent. In this matter, the third audio-related device 2506 need not know the data format of the SV to set the value of the SV. In response to the third audio-related device 2506 setting the SV, the first audio-related device 2502 may output a human readable string to the second audio-related device 2504 as a feedback indication. An example feedback indication is an output that changes in response to the percentage. Since, the human readable string may be understood by a user without further processing by the second audio-related device 2504, the second audio-related device 2504 may display or otherwise convey the changed value of the SV to a user, without knowing the data format of the SV. Alternatively, where the second audio-related device is configured with a predetermined data type of the feedback indication, the first audio-related device 2502 may output a value that is processed by the second audio-related device to obtain the feedback value in the appropriate units.

The previous example is described in terms of a setpoint control input SV in the third audio-related device 2506 used to change a setpoint SV in the first audio-related device 2502 using a subscription. In other examples, a subscription may be used to change a monitor value SV configured to be displayed with the first audio-related device 2502 that is an operational parameter SV of the third audio-related device 2506.

In still another example, a subscription may be used to adjust a setpoint control input SV in the third audio-related device that is mapped to, and adjusts, a setpoint SV in the first audio related device. In addition, an operational parameter SV in the first audio-related device 2502 that is responsive to the setpoint SV may be mapped to a monitor value SV in the third audio related device 2506. Accordingly, during operation, the third audio related device 2506 may adjust the setpoint SV of the first audio-related device 2502 and monitor an output (the operational parameter SV) of the first audio related device with the monitor value SV. As previously discussed, the operational parameter SV may also be mapped to the second audio-related device 2504.

XII. Thin Performance Equipment Manager ("PEM")

Figure 26:
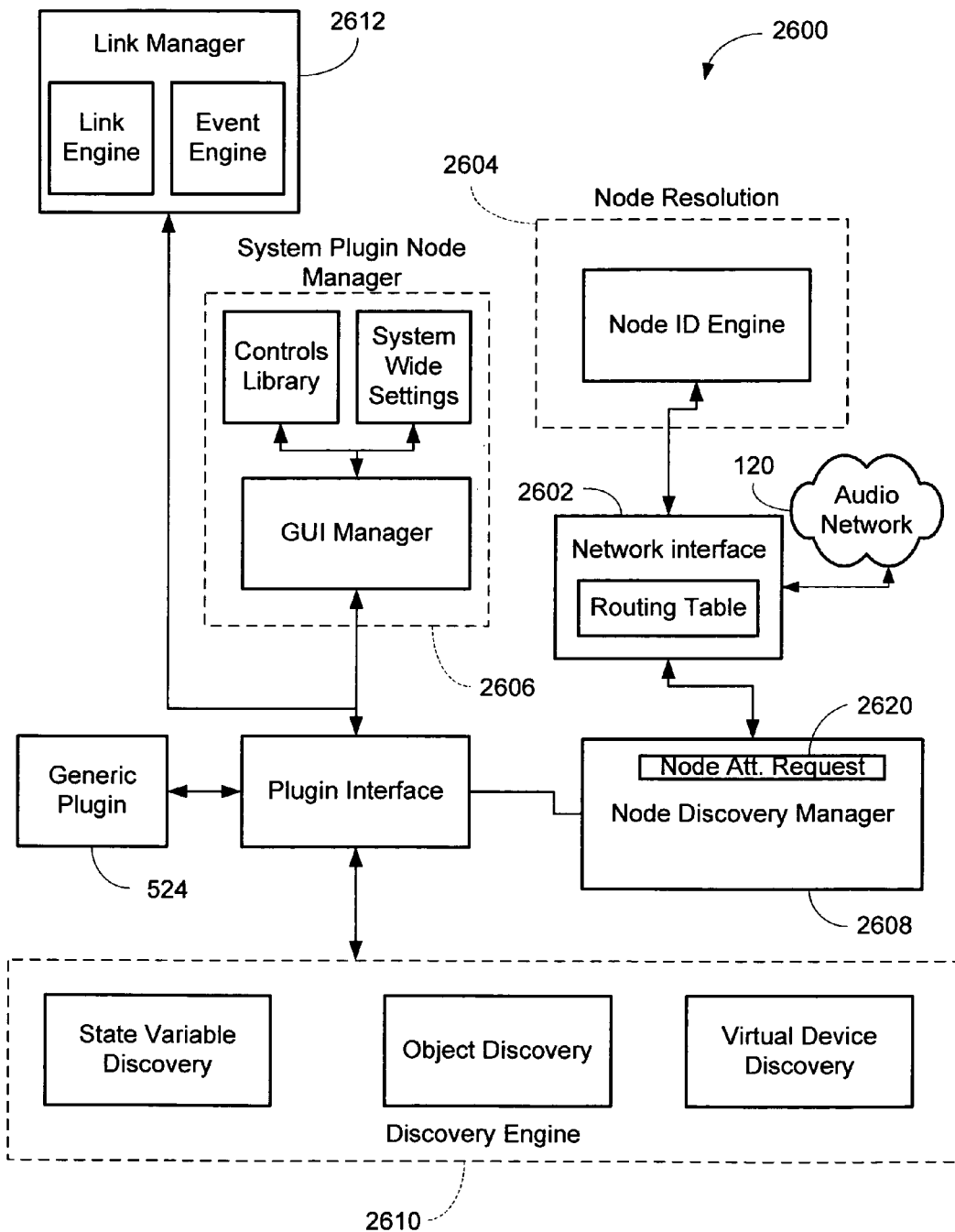
FIG. 26 is a detailed block diagram of another example GUI core portion of the PEM of FIG. 4.

FIG. 26 is a block diagram of a capability-based PEM 2600 that may be used in an audio system having an audio network 120. The capability-based PEM 2602 corresponds to the "Thin Application Layer" device shown in FIG. 5 and has many of the same components as the example PEM illustrated in FIG. 5. Accordingly, for purpose of brevity, the following discussion will focus on the differences between the "Thin" PEM of FIG. 26 and the "fat" PEM of FIG. 5.

The capability-based PEM 2600 may operate in a limited manner because of network traffic constraints or the capabilities of the device on which the PEM is operated. For example, the processor speed, memory storage and/or display capability of the device on which the PEM operates may limit the operation of the capability-based PEM 2600. As previously discussed, instead of instantiating control panel views for all virtual devices, objects and SVs for a node at one time, the capability-based PEM 2600 may do so in a piece-meal fashion as different portions of the audio node structure are requested to be displayed by a user. An example operation of the capability-based PEM to discover the node structure, and instantiate corresponding control panel views was previously described with reference to FIGS. 20-23.

In FIG. 26, the capability-based PEM 2600 includes a network interface 2602, a node resolution module 2604, a system plugin node manager 2606, a link manager discovery manager 2608, a discovery engine 2610 and a link manager 2612. In the illustrated example, the capability-based PEM 2602 may not include a plugin loader and may communicate only with the generic plugin 524 since the capability of the example capability-based PEM 2602 does not provide for product plugins. In addition, the node discovery manager 2608 includes only an attribute request engine 2620 since there will be no other product plugins to search in for unknown components and/or control panel views or aspects.

Upon requesting the attributes of an audio-related device, the attribute request engine may pass the attributes to the generic plugin 524. The generic plugin 524 may enable the API interface to setup a communication path to the audio-related device and request some portion of the components of the audio node structure of the audio-related device depending on the capability of the device on which the capability-based PEM 2600 is operating. The generic plugin may determine the corresponding control panel view for the portion of the audio node structure and instantiate a display. When additional audio node structure is requested to be viewed by a user, the current control panel view may be discarded and additional information requested from the audio-related device to support generation of another control panel view. Alternatively, the capability-based PEM 2600 may build a subset of the set of control panel views that may otherwise be built when sufficient computing power is available. The subset of control panel views may include one or more control panel views depending on the capability of the device on which the capability-based PEM 2600 is operating.

The capability-based PEM 2600 may consider the complexity of the control panel view that is generated. Where the display and or processing power is limited, the capability-based PEM 2600 may generate a control panel view that includes relatively simple GUI aspects. For example, a three-dimensional GUI aspect with automation may be converted to a two-dimensional box without automation. In addition, the capability-based PEM 2600 may adjust the size and/or the number of elements included in a control panel view based on the capability of the displaying device. Further, the amount of the audio node structure that is obtained from the audio-related device to generate a control panel view may be varied by the capability-based PEM 2600 based on the capability of the displaying device.

As previously discussed, the system is operable in an audio system having a plurality of audio components of varying functionality. The system provides a network independent protocol to seamlessly integrate across a plurality of different audio-related devices of varying complexity using any of a variety of physical networks and communication platforms. In addition, the system allows for upgrades, changes, and additions of audio-related devices within the system by providing messaging functionality to discover new audio-related devices and those aspects of a particular audio-related device that are not already known. The messaging functionality also allows audio data and related information to be transmitted between selected audio-related devices efficiently and with minimized network traffic.

The PEMs may determine if the audio node structure of an audio-related device is known. If any portion of the audio node structure is unknown, the PEM may obtain additional information to define the unknown portion. In addition, the PEM may retrieve and/or generate control panel views of the entire audio system. Further, the PEM(s) may retrieve and/or generate control panel views for each specific audio-related device within the audio system based on the corresponding audio node structure. The control panel views allow the coordinated management, control and monitoring of the audio-related devices within the audio system. The network independent communication protocol used within the system allows standardized communication between the performance equipment mangers and the audio-related devices, as well as device-to-device communication.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A device operable to interact with an audio-related device, the device comprising:
   a processor;
   a performance equipment manager stored in a memory of the device, the performance equipment manager executable with the processor to communicate with the audio-related device via a network interface over an audio network operable with a plurality of network layer protocols;
   the performance equipment manager configured to generate a message to the audio-related device, the message including a percentage due to a datatype of a state variable included in the audio related device being unknown by the performance equipment manager, the message configured to instruct the audio-related device to change a value of the state variable by the percentage included in the message, the message having a network address specific to one of the network layer protocols and compatible with the network interface, the message also having a common packet structure, the common packet structure being network layer protocol independent and comprising:
   a version component representing a type of protocol of the message;
   a length component representing a number of bits included in the common packet structure;
   a source node ID component representing a unique, network layer protocol independent identification of the audio-related device;
   a destination node ID component representing a unique, network layer protocol independent identification of the audio-related device;
   a message ID component representing a type of instruction included in the common packet structure;
   a flag component representing a characteristic associated with the common packet structure;
   a count component representing a hop count for the common packet structure; and
   a message component representing an application layer message to the audio-related device.

2. The device of claim 1, where, the length component comprises a header length and a message length of the common packet structure, the header length determined by sum of the number of bits associated with the version component, the length component, the source address component, the destination address component, the message ID component, the flag component, and the count component.

3. The device of claim 2, where the message length represents the number of bits associated with the message component.

4. The device of claim 1, where the source node ID component includes a region representing a virtual device associated with the device, the virtual device being part of an audio node structure representative of functionality included in the device.

5. The device of claim 4, where the source node ID component includes a region representing an object included in the virtual device.

6. The device of claim 5, where the virtual device is a first virtual device, the audio node structure is a first audio node structure and where the destination node ID component includes a region representing a second virtual device associated with the audio-related device, the second virtual device being part of a second audio node structure representative of functionality included in the audio-related device.

7. The device of claim 6, where the object is a first object, and where the destination node ID component includes a region representing a second object included in the second virtual device.

8. The device of claim 1, where the flag component is configured to provide an acknowledgment by the device that an action requested by the audio-related device has been completed.

9. The device of claim 1, where the flag component is configured to provide a request by the device for an acknowledgement when an action requested with the application layer message has been completed by the audio-related device.

10. The device of claim 1, where the flag component is configured to provide a response to a request received from the audio-related device.

11. The device of claim 1, further comprising a sequence number component operable to count each time a message is passed between the device and the audio-related device.

12. The device of claim 1, where the application layer message is an instruction from the device to the audio-related device to transmit changes in a changeable parameter included in the audio-related device to the device.

13. A method of interacting with an audio-related device operable in an audio system, the method comprising:
   providing a first audio-related device having a memory and a graphical user interface;
   executing a performance equipment manager stored in the memory of the first audio-related device;
   displaying a control panel view on the graphical user interface with the performance equipment manager, the control panel view representative of functionality of a second audio-related device;
   receiving entry of a change of a value displayed in the control panel view, the value resident in the second audio-related device;
   transforming the control panel view to reflect the change of the displayed value;
   generating a message instructing the second audio-related device to change the value resident in the second audio-related device by a predetermined percentage of the value, the message generated for transmission via a network interface included in the performance equipment manager, the message generated for transmission over an audio network operable with a plurality of network layer protocols;
   addressing the message with a network layer address specific to one of the network layer protocols and compatible with the network interface;
   configuring the message in a common packet structure; and
   receiving a confirmation message from the second audio-related device indicating that the value resident in the second audio-related device is changed;
   where the common packet structure is network layer protocol independent and comprises:
      a source node identification component including a first unique node identifier associated with the first audio-related device, the first unique node identifier being an independent identification of the first audio-related device that is independent of the network layer address and the network interface; and
      a destination node identification component including a second unique node identifier associated with the second audio-related device, the second unique node identifier being a network layer protocol independent and network interface independent identification of the second audio-related device.

14. The method of claim 13, where the confirmation message is configured in the common packet structure.

15. The method of claim 13, where the message is a first message, the method further comprising receiving a second message from the second audio-related device, the second message configured in the common packet structure and comprising an instruction to change the value displayed in the control panel view.

16. The method of claim 15, where the instruction to change the value displayed in the control panel view is in the form of an instruction to change the value by the predetermined percentage of the value.

17. The method of claim 13, where the source node identification component further comprises identification of a first virtual device included in the first audio-related device, and identification of a first object included in the first virtual device, the first virtual device and the first object representative of at least a portion of a first audio node structure of the first audio-related device.

18. The method of claim 17, where the destination node identification component further comprises identification of a second virtual device included in the second audio-related device, and identification of a second object included in the second virtual device, the second virtual device and the second object representative of at least a portion of a second audio node structure of the second audio-related device.

19. An audio-related device comprising:
   a memory configured to store settings of the audio-related device;
   a user interface configured to change the settings stored in memory;
   a communication port configured to transmit and receive messages over a network operable with a plurality of network layer protocols;
   a processor operatively coupled to the memory, the user interface, and the communication port;
   a communication manager stored in the memory and executable with the processor, the communication manager configured to generate a message having a network address specific to one of the network layer protocols, the message comprising a common packet structure that is independent of the network layer protocols, the common packet structure including:
      a length component representing a number of bits included in the common packet structure;
      a source node ID component representing a unique, network layer protocol independent identification of the audio-related device;

a destination node ID component representing a unique, network layer protocol independent identification of a destination audio-related device to which the message is directed;

a message ID component representing a descriptor of a type of instructions associated with the message;

a flag component representing a characteristic associated with the message;

a count component representing a hop count for the common packet structure; and a message component representing an application layer message to be processed by the destination audio-related device;

where a datatype of a state variable included in the destination audio-related device is unknown by the audio-related device, and the message component includes a message and a percentage value, the message configured to instruct the destination audio-related device to change a value of the state variable to correspond to the percentage value included in the message.

20. The audio-related device of claim 19, where the flag component represents an acknowledgment to the destination audio-related device with which the audio-related device is communicating that an action has been completed.

21. The audio-related device of claim 19, where the flag component represents a request for an acknowledgement when an action responsive to the application layer message has been completed by the destination audio-related device to which the message is directed.

22. The audio-related device of claim 21, where the memory includes a queue of messages generated by the communications manager, the communication port is configured to sequentially transmit messages in the queue in response to receipt of the acknowledgement.

23. The audio-relate device of claim 22, where the messages in the queue include instructions that are dependent upon completion of other instructions in the queue.

24. The audio-related device of claim 19, where the flag component represents a response to a request.

* * * * *